US 12,513,407 B2

United States Patent
Ouellet et al.

(10) Patent No.: US 12,513,407 B2
(45) Date of Patent: Dec. 30, 2025

(54) METHOD FOR AUTOMATIC EXPOSURE CONTROL OF A 3D SCANNING SYSTEM AND 3D SCANNING SYSTEM USING SAME

(71) Applicant: CREAFORM INC., Levis (CA)

(72) Inventors: Jean-Nicolas Ouellet, Saint-Augustin (CA); Felix Rochette, Quebec (CA); Simon Frechette, Levis (CA)

(73) Assignee: CREAFORM INC., Lévis (CA)

( * ) Notice: Subject to any disclaimer, the term of this patent is extended or adjusted under 35 U.S.C. 154(b) by 46 days.

(21) Appl. No.: 18/568,901

(22) PCT Filed: Jun. 21, 2023

(86) PCT No.: PCT/CA2023/050859
§ 371 (c)(1),
(2) Date: Dec. 11, 2023

(87) PCT Pub. No.: WO2024/259514
PCT Pub. Date: Dec. 26, 2024

(65) Prior Publication Data
US 2025/0088753 A1   Mar. 13, 2025

(51) Int. Cl.
*H04N 23/73* (2023.01)
*H04N 13/254* (2018.01)
(Continued)

(52) U.S. Cl.
CPC .......... *H04N 23/73* (2023.01); *H04N 13/254* (2018.05); *H04N 13/296* (2018.05); *H04N 23/71* (2023.01)

(58) Field of Classification Search
CPC .... H04N 23/73; H04N 13/254; H04N 13/296; H04N 23/71; G01B 11/2545
(Continued)

(56) References Cited

U.S. PATENT DOCUMENTS

| 6,141,047 A | 10/2000 | Kawai |
| 10,466,359 B2 | 11/2019 | Meir et al. |

(Continued)

FOREIGN PATENT DOCUMENTS

| CA | 3223372 | 5/2025 |
| CN | 109510948 A | 3/2019 |

(Continued)

OTHER PUBLICATIONS

International Search Report and Written Opinion for International (PCT) Patent Application No. PCT/CA2023/050859, dated Oct. 25, 2023, 6 pages.

(Continued)

*Primary Examiner* — Susan E. Hodges
(74) *Attorney, Agent, or Firm* — Sheridan Ross P.C.

(57) ABSTRACT

A scanning system for the 3D measurement of a surface of an object includes a 3D scanner and a computing system. The 3D scanner includes a scanner frame, a set of imaging modules and a communication module. The imaging modules include a light projector unit for projecting a structured light pattern onto the surface of the object, at least one camera for capturing image data, and at least one image data compression module that compresses the image data using a nonlinear conversion that compresses a dynamic range of intensity values in the compressed image data such that lower intensity values are amplified and mapped to a larger portion of the compressed dynamic range while amplification of higher intensity values is limited. The computing system controls an exposure setting of the 3D scanner based on background intensity values for images in the compressed image data. Related methods are also described.

36 Claims, 21 Drawing Sheets

(51) Int. Cl.
*H04N 13/296* (2018.01)
*H04N 23/71* (2023.01)

(58) Field of Classification Search
USPC .......................................... 348/46
See application file for complete search history.

(56) References Cited

U.S. PATENT DOCUMENTS

| | | |
|---|---|---|
| 2006/0132618 A1 | 6/2006 | Fujita et al. |
| 2008/0094493 A1* | 4/2008 | Igarashi ................ H04N 23/72 |
| | | 348/254 |
| 2015/0189201 A1 | 7/2015 | Bridges |
| 2017/0180622 A1* | 6/2017 | Zabatani ............... F16K 31/363 |

FOREIGN PATENT DOCUMENTS

| | | |
|---|---|---|
| CN | 113496542 A | 10/2021 |
| CN | 116124033 A | 5/2023 |
| JP | 200629238 A | 10/2006 |
| WO | 2017024869 A1 | 2/2017 |
| WO | 2022048460 A1 | 3/2022 |
| WO | 2024259514 | 12/2024 |

OTHER PUBLICATIONS

Examiner's Report issued on Feb. 5, 2024 in connection with Canadian Patent Application No. 3,223,372—4 pages.

\* cited by examiner

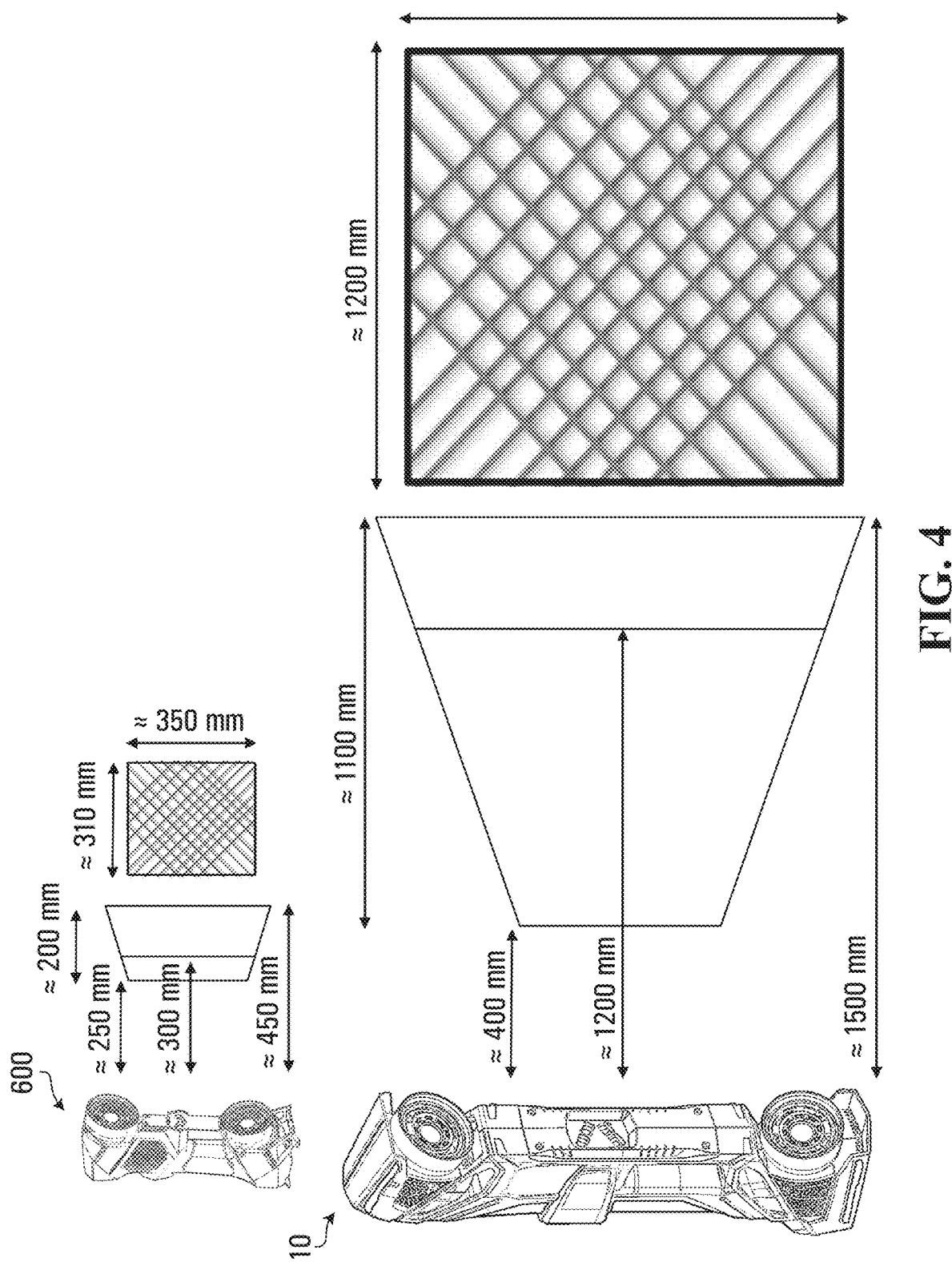

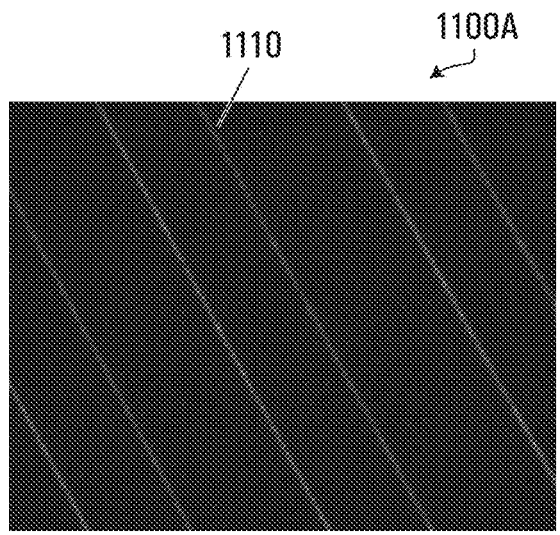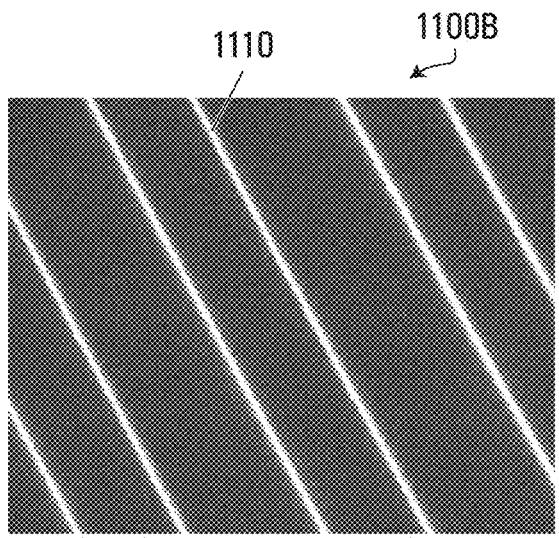
Image with shutter at 0.1 ms.
Background: 20 grayscale value
FIG. 10A
Image with shutter at 3 ms.
Background: 35 grayscale value
FIG. 10B

METHOD FOR AUTOMATIC EXPOSURE CONTROL OF A 3D SCANNING SYSTEM AND 3D SCANNING SYSTEM USING SAME

CROSS REFERENCE TO RELATED APPLICATIONS

This application is a national stage application under 35 U.S.C. 371 and claims the benefit of PCT Application No. PCT/CA2023/050859 having an international filing date of 21 Jun. 2023, which designated the United States, the disclosure of which is incorporated herein by reference in its entirety.

TECHNICAL FIELD

The present disclosure generally relates to the field of three-dimensional (3D) metrology, and, in particular examples, to automatic exposure control in 3D scanning systems using structured light stereovision to reconstruct a surface of an object.

BACKGROUND

Three-dimensional scanning and digitization of the surface geometry of objects is commonly used in many industries. Typically, the surface of an object is scanned and digitized using optical sensors that measure distances between the optical sensor and a set of points on the surface Triangulation-based sensors generally use at least two different known viewpoints (e.g., typically at least two cameras each oriented in a specific direction) that converge to a same point on the object surface, wherein the two different viewpoints are separated by a specific baseline distance.

When two different viewpoints are used, by knowing the baseline distance and the orientations of the two different viewpoints, a relative position of an observed point can be derived using principles of stereovision (triangulation). An important challenge in stereovision is how to accurately match which pixels of a stereo pair of images (composing a same frame) obtained from the two different viewpoints (e.g., two different cameras) correspond to each other.

An approach for simplifying the matching of the pixels of the stereo pair of images includes the use of a light projector that projects a set of light stripes oriented in known directions onto the surface of the object being scanned. In such a configuration, the surface of the object reflects the projected set of light stripes. The scanner sensors from the two different known viewpoints sense the reflected projected set of light stripes and this results in a stereo pair of images of the surface of the object that includes a reflection of the projected set of light stripes. By leveraging the known orientation and origin of the projected light stripes, in combination with the baseline distance and the orientation of the two different viewpoints, pixels belonging to stripes of the stereo pair of images can be more accurately matched to one another and the corresponding relative position of an observed point can be derived using principles of stereovision (triangulation). By increasing the number of light stripes projected onto the surface of the object being scanned, an increase in the scanning speed can be achieved. An example of such an approach is described in U.S. Pat. No. 10,271,039 issued on Apr. 23, 2019. The contents of this document are incorporated herein by reference.

The capability to make 3D measurements of a surface using a 3D scanner relies on the ability of the 3D scanner to capture images of the scene/object with sufficient definition and detail to enable the subsequent image data processing to determine accurate measurements of 3D points based on the captured image data (e.g., to detect and measure features of the structured light pattern projected onto the surface of the object). In order to capture image data of a sufficiently high quality to enable such 3D measurements, the exposure setting of the 3D scanner should be controlled to account for different lighting and/or reflectance of the surface of the object being scanned. Otherwise, the image data captured by the 3D scanner may be overexposed or underexposed, which can degrade the accuracy of subsequent measurements based on the overexposed or underexposed image data.

Many conventional 3D scanners are configured to operate at relatively short scanning distance (e.g., a few hundred millimeters) with a relatively shallow depth of field (e.g., a few hundred millimeters). On the other hand, there are many applications for 3D scanning in which it would be desirable to be able to scan a larger volume in each frame, i.e., to scan a larger area at a greater scanning distance over a greater depth of field. In addition, while some 3D scanners are configured to operate from a fixed position relative to the object being scanned, and thus can operate with relatively long acquisition times (e.g., some conventional 3D scanners operate from fixed position and the object being scanned is rotated on a turn table to keep the same distance between the 3D scanner and the object substantially constant/fixed), there are many applications for 3D scanning that require a portable 3D scanner that is moved relative to the object during the scanning operation, and thus must operate with relatively short acquisition times/high frame rates in order to support real time acquisition. However, one of the challenges of implementing a portable 3D scanner system that is capable of scanning a larger volume in real time with a high frame rate while the scanner is moving around at different scanning distances from the object is related to exposure control Manual control of system exposure is cumbersome and impractical, and conventional approaches to automatic exposure control that have been exploited for shorter scanning distances and shallower depths of field have proven to be impractical for larger scanning volumes.

Against the background described above, it is clear that there remains a need in the industry to provide improved 3D scanners that are capable of automatic exposure control for scanning that alleviate at least some of the deficiencies of conventional 3D scanners, particularly for scanning at longer scanning distances over greater depths of field.

SUMMARY

This Summary is provided to introduce a selection of concepts in a simplified form that are further described below in the Detailed Description. This Summary is not intended to identify all key aspects and/or essential aspects of the claimed subject matter.

The present disclosure presents methods, systems and apparatuses that automatically adjust the system exposure (e.g., camera's gain, shutter and projector exposure duration) of a 3D scanner that implements image data compression with a nonlinear function that creates a high dynamic range (HDR) compressed version of an image that allows the reflectance of the surface of a scanned object (e.g., the portions of the surface between reflections of a structured light pattern projected on to the surface of the object) to be conveyed with enough resolution to effectively control a value of the system exposure setting based on the compressed image data conveying the compressed version of the image without the need for an iterative method (adjusting blindly on multiple images). Using the nonlinear function compresses the dynamic range of the image data, but does so in a way that amplifies low intensity signals while preventing or at least limiting the saturation of high intensity signals. This allows features with low intensity in the images (e.g., projected laser lines and visual targets) to be detectable without overexposing the lighter, higher intensity regions in the image. The use of a nonlinear function for image data compression effectively allows the information of a higher resolution image (e.g., a 12 bits/pixel grayscale image) that is important for the purposes of automatic exposure control and 3D measurements (e.g., low and high intensity image data) to be contained in a lower resolution image (e.g., an 8 bits/pixel grayscale image). The consequence of this is that a greater resolution is retained for lower intensity values, which means that there are some gradations in the low intensity gray scale values that would not have been there otherwise. This allows a 3D scanning system to see the object to scan in the image at lower intensities and over a broader scanning distance. This increased resolution in the low intensity values can then be used to determine the reflectivity of the surface (light through dark) as a basis for controlling the automatic exposure setting of the 3D scanner. With this method, the 3D scanning system is capable of automatically controlling its system exposure setting based on the surface reflectance of the scanned scene without the need for the user to manually change the exposure parameters. Furthermore, the nonlinear compression facilitates real time acquisition with a portable 3D scanner by enabling a high frame with a limited bandwidth while the automatic exposure control effectively controls the exposure settings of the 3D scanner as it is moved around at different scanning distances from the object.

According to a first broad aspect, the present disclosure provides a method for the 3D measurement of a surface of an object. A method in accordance with the first broad aspect of the present disclosure may include projecting a structured light pattern onto the surface of the object using a light projector of a 3D scanner. Image data may be captured using a camera of the 3D scanner, the image data conveying an image including reflections of the structured light pattern projected onto the surface of the object. The image conveying the image may be compressed using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited. A background intensity value for the compressed version of the image may be determined at least in part by processing the compressed image data for the image. An automatic exposure setting of the 3D scanner may be controlled at least in part by processing the determined background intensity value.

According to a second broad aspect, the present disclosure provides a scanning system for the 3D measurement of a surface of an object. A scanning system in accordance with the second broad aspect of the present disclosure may include a 3D scanner and a computing system in communication with said 3D scanner. The 3D scanner may have a scanner frame on which is mounted a set of imaging modules and a communication module in communication with the set of imaging modules. The set of imaging modules may include: 1) a light projector unit for projecting a structured light pattern onto the surface of the object; 2) a set of at least one camera positioned alongside the light projector unit for capturing image data conveying a set of images including reflections of the structured light pattern projected onto the surface of the object; and 3) at least one image data compression module in communication with the set of at least one camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited. The communication module may be configured for transmitting the compressed image data conveying the compressed versions of the images in the set of images to external devices for processing. The computing system may be configured for: i. receiving the compressed image data conveying the compressed versions of the images in the set of images including the reflections of the structured light pattern; ii. extracting, from the compressed image data conveying the compressed versions of the images in the set of images, the compressed image data conveying a compressed version of a first image from a first camera of the set of at least one camera of the 3D scanner; iii. determining a background intensity value for the compressed version of the first image at least in part by processing the compressed image data conveying the compressed version of the first image; and iv. controlling an automatic exposure setting of at least a subset of the set of imaging modules of the 3D scanner at least in part by processing the determined background intensity value.

According to a third broad aspect, the present disclosure provides an apparatus for the 3D measurement of a surface of an object. An apparatus in accordance with the third broad aspect of the present disclosure may include a scanner frame, a set of imaging modules mounted on the scanner frame, and at least one processing module in communication with the set of imaging modules. The set of imaging modules may include: i) a light projector unit for projecting a structured light pattern onto the surface of the object; ii) a set of at least one camera positioned alongside the light projector unit for capturing image data conveying a set of images including reflections of the structured light pattern projected onto the surface of the object; and iii) a set of at least one image data compression module in communication with the set of at least one camera, the set of at least one image data compression module being configured for compressing the image data conveying the set of images using a nonlinear conversion to generate compressed image data conveying the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited. The at least one processing module may be configured for: extracting, from the compressed image data conveying the set of images, the compressed image data for a first image from a first camera of the set of imaging modules; determining a background intensity value for the first image at least in part by processing the compressed image data for the first image; and controlling an automatic exposure setting of at least a subset of the set of imaging modules at least in part by processing the determined background intensity value. In some embodiments, one or more of the processing module(s) may be mounted on the scanner frame such that the set of at least one processing module is integrated into the 3D scanner. In other embodiments, one or more of the processing module(s) may be separate from the 3D scanner and in communication with the 3D scanner over a communication link.

According to a fourth broad aspect, the present disclosure provides an apparatus for the 3D measurement of a surface of an object. An apparatus in accordance with the fourth broad aspect of the present disclosure may include: an input for receiving compressed image data conveying a set of images including reflections of a structured light pattern projected onto the surface of the object; and a processing module in communication with said input. The compressed image data may have been generated by using a nonlinear conversion to compress image data captured by a set of imaging modules of the 3D scanner, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited. The processing module may be configured for: i. extracting, from the compressed image data conveying the set of images, the compressed image data for an image from a camera of the set of imaging modules of the 3D scanner; ii. determining, at least in part by processing the compressed image data for the image, a background intensity value for the image; and iii. controlling an automatic exposure setting of at least a subset of the set of imaging modules of the 3D scanner at least in part by processing the background intensity value. In some embodiments, an apparatus in accordance with the fourth broad aspect of the present disclosure may further include a display device in communication with said processing module for generating a graphical representation of a reconstructed surface for the object.

In various practical implementations of the scanners of the types described above, the scanner may be equipped with the suitable hardware and software components, including one or more processors in communication with the set of imaging modules (including the cameras and the light projector unit), for receiving and processing data generated by the set of imaging modules. The one or more processors may be operationally coupled to the set of imaging modules as well as to user controls, which may be positioned on the scanner or remotely therefrom. The scanner may be further equipped with suitable hardware and/or software components for allowing the scanner to exchange data and control signals with external components for the purpose of controlling the scanner and/or manipulating the data collected by the scanner.

All features of exemplary embodiments which are described in this disclosure and are not mutually exclusive can be combined with one another. Elements of one embodiment or aspect can be utilized in the other embodiments/aspects without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

The above-mentioned features and objects of the present disclosure will become more apparent with reference to the following description taken in conjunction with the accompanying drawings, wherein like reference numerals denote like elements and in which:

FIG. 4 depicts an example of the increased scanning distance and depth of field over which the scanner of FIG. 1A may be configured to scan a target object relative to a conventional handheld 3D scanner;

FIGS. 10A and 10B depict examples of images captured with different exposure settings and the corresponding background intensity values for the two images;

Figure 1A:
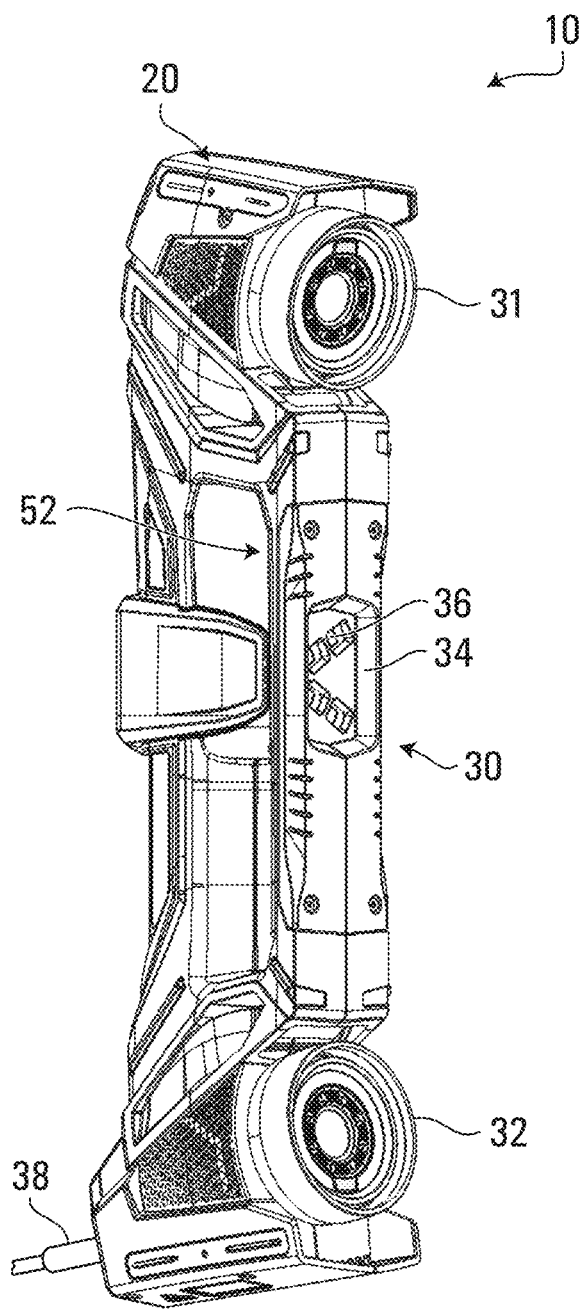
FIG. 1A is a perspective view of a scanner for generating 3D data relating to a surface of a target object in accordance with a specific embodiment.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION OF EMBODIMENTS

A detailed description of one or more specific embodiments of the invention is provided below along with accompanying Figures that illustrate principles of the invention. The invention is described in connection with such embodiments, but the invention is not limited to any specific embodiment described. The scope of the invention is limited only by the claims. Numerous specific details are set forth in the following description in order to provide a thorough understanding of the invention. These details are provided for the purpose of describing non-limiting examples and the invention may be practiced according to the claims without some or all of these specific details. For the purpose of clarity, technical material that is known in the technical fields related to the invention has not been described in great detail so that the invention is not unnecessarily obscured.

3D Measurements of a Surface

Figure 1B:
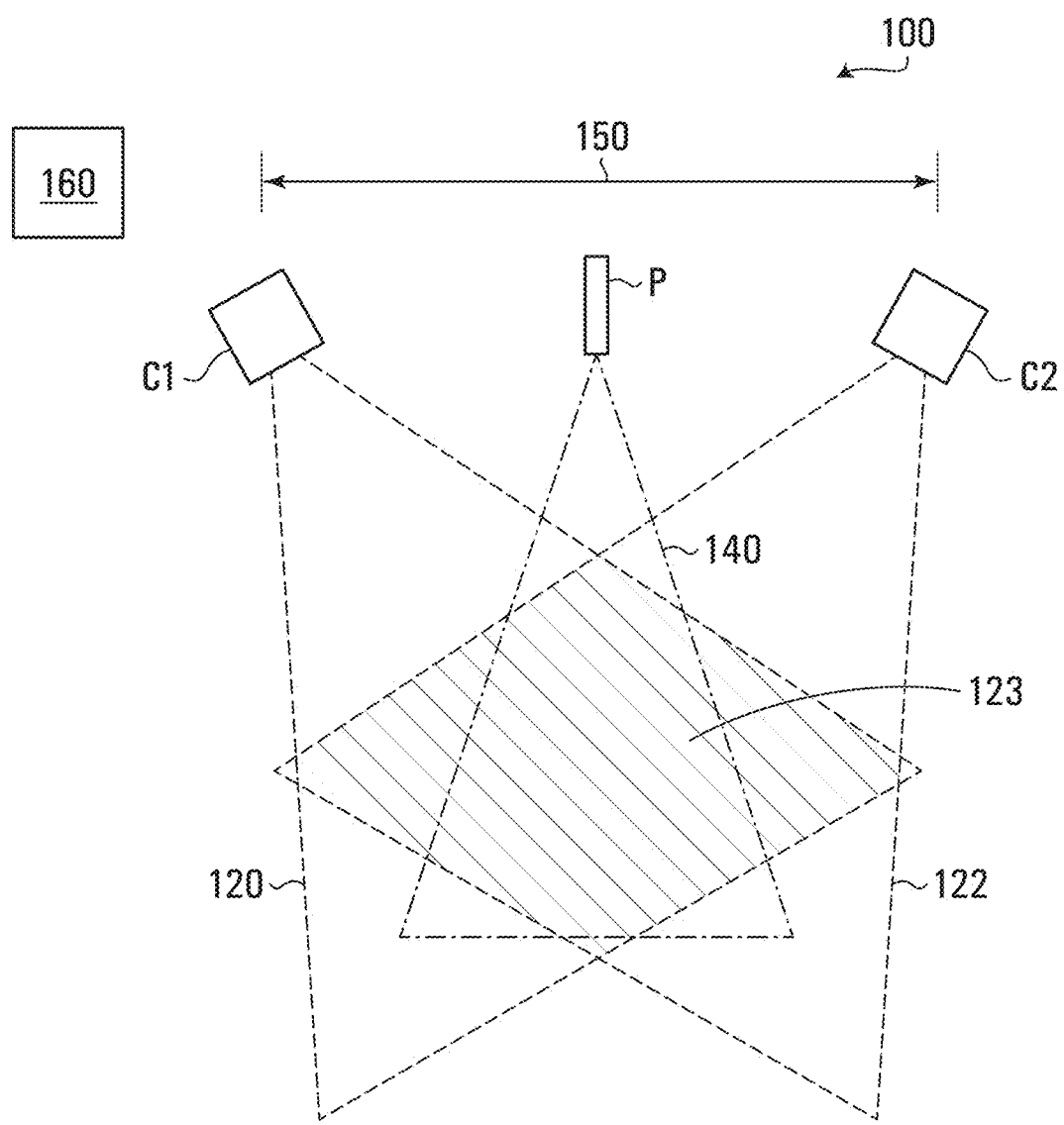
FIG. 1B is a block diagram illustrating a system configuration of the scanner of FIG. 1A.

FIG. 1A shows an embodiment of a 3D scanner implemented as a handheld 3D scanner 10 and FIG. 1B illustrates the function of some of the components of such a 3D scanner in accordance with a specific implementation. In the embodiment depicted, the scanner 10 includes a set of imaging modules 30 that are mounted to a main member 52 of a frame structure 20 of the scanner 10. The set of imaging modules 30 may be arranged alongside one another so that the fields of view of each of the imaging modules at least partially overlap. In the embodiment shown, the set of imaging modules 30 comprises two cameras, namely a first camera 31 (equivalent to camera C1 in FIG. 1B), a second camera 32 (equivalent to camera C2 in FIG. 1B). The set of imaging modules 30 also includes a light projector unit 34 comprising a light source and a pattern generator (equivalent to light projector unit P in FIG. 1B). In some other embodiments, the light projector unit 34 may include a single light source, e.g., a light source emitting one of an infrared light, a white light, a blue light or other visible monochrome light. In some other embodiments, the light projector unit P is configured to emit light having wavelengths between 405 nm and 1100 nm. In some other embodiments, the light projector unit 34 may include two different light sources, e.g., a first light source emitting light having wavelengths in a first wavelength band (e.g., blue light) and a second light source emitting light having wavelengths in a second wavelength band (e.g., red light). The two different light sources may be part of the same light projector unit 34 or can be embodied as separate units (e.g., in an additional light projector unit). In some embodiments, the set of imaging modules 30 may include a second light projector unit (not shown in the Figures) positioning on the main member 52 of a frame structure 20 of the scanner 10. In some embodiments, the light projector unit 34 is a diffractive optics-based laser projector, or an image projector such as a digital micromirror device or liquid crystal display projector.

In some specific practical implementations, the light source of the light projector unit 34 may include one or more LEDs 36 configured to all emit the same type of light or configured to emit different types of light (e.g., IR and/or white light and/or blue light).

The type of cameras used for the first and second cameras 31, 32 are typically monochrome cameras and will depend on the type of the light source(s) used in the light projector unit 34. In some embodiments, the first and second cameras 31, 32 may be monochrome, visible color spectrum, or near infrared cameras and the light projector unit 34 is an infrared light projector or near-infrared light projector The cameras 31, 32 may implement any suitable shutter technology, including but not limited to: rolling shutters, global shutters, mechanical shutters and optical liquid crystal display (LCD) shutters and the like. In some implementations, the imaging modules 30 may further include a third camera (not shown in FIG. 1A). In such implementations, the third camera may be a color camera (also called a texture camera) and may implement any suitable shutter technology, including but not limited to, rolling shutters, global shutters, mechanical shutters and optical liquid crystal display (LCD) shutters and the like. In other such implementations, the third camera may be of similar configuration to the first and second cameras 31, 32 and used to improve matching confidence and speed. In such embodiments, a fourth camera may be included, so that the scanner includes three monochrome cameras and a color camera (in one example configuration). In further embodiments, a single camera can be used, and the second (and third and/or fourth) camera omitted.

As depicted in FIG. 1A, the first camera 31 may be positioned on the main member 52 of the frame structure 20 alongside the light projector unit 34. The first camera 31 is generally oriented in a first camera direction and configured to have a first camera field of view (120 in FIG. 1B) at least partially overlapping with the field of projection 140 (of FIG. 1B) of the light projector unit 34. The second camera 32 is also positioned on the main member 52 of the frame structure 20 and may be spaced from the first camera 31 (by baseline distance 150) and from the light projector unit 34. The second camera 32 is oriented in a second camera direction and is configured to have a second camera field of view (122 in FIG. 1B) at least partially overlapping with the field of projection of the light projector unit 34 and at least partially overlapping with the first field of view 120. The overlap 123 of the fields of view is depicted in FIG. 1B.

As noted above, in some implementations a texture camera (not shown) may also be positioned on the main member 52 of the frame structure 20 and may be positioned alongside the first camera 31, the second camera 32 and the light projector unit 34. In such implementations, the texture camera may be oriented in a third camera direction and be configured to have a third camera field of view at least partially overlapping with the field of projection 140, with the first field of view 120, and with the second field of view 122.

A data connection 38 (such as a USB connection) between the scanner 10 and one or more computer processors 160 (shown in FIG. 1B) can allow for the transfer of data collected by the first camera 31 and the second camera 32 (and other camera(s) if included) so that it may be processed to derived 3D measurements of the surface being scanned.

The one or more computer processors 160 may be embodied in a remote computing system or, alternatively, may be part of the scanner 10 itself.

FIG. 1B is a functional block diagram showing components of a set of imaging modules 100 of the scanner 10. As depicted, set of imaging modules 100 may include a light projector unit P and two cameras, wherein the light projector unit P is mounted between the two cameras C1, C2, which in turn are separated by a baseline distance 150. Each camera C1, C2 has a respective field of view 120, 122. The light projector unit P projects a pattern within a respective span 140. In FIG. 1B, the light projector unit P includes a single light projector, although embodiments having two or more light projector units can also be contemplated. The light projector unit P may be configured to project visible or non-visible light, coherent or non-coherent light. In practical implementations, the light projector unit P may include one or more light sources comprised of a laser (such as a vertical-cavity surface-emitting laser or VCSEL, a solid-state laser, and a semiconductor laser) and/or one or more LEDs, for example.

The light projector unit P may be configured to project a structured light pattern comprised of a plurality of sheets of light that are arranged alongside one another. The sheets of light may appear as elongated light stripes when projected onto a surface of an object. The elongated light stripes may be non-intersecting elongated light stripes and, in some implementations, may be substantially parallel to each other. In some embodiments, the light projector unit P can be a programmable light projector unit that can project more than one pattern of light. For example, the light projector unit P can be configured to project different structured line pattern configurations. In some embodiments, the light projector unit P can emit light having wavelengths between 405 nm and 1100 nm.

The cameras C1, C2 and the light projector unit P are calibrated in a common coordinate system using methods known in the art. In some practical implementations, films performing bandpass filter functions may be affixed on the camera lenses to match the wavelength(s) of the projector P. Such films performing bandpass filter functions may help reduce interferences from ambient light and other sources.

Using the set of imaging modules 100 with at least one computer processor 160 (shown in 1B), measurements of 3D points can be obtained after applying a triangulation-based computer-implemented method. In a typical process, two images of a frame are captured using the two cameras C1, C2. The two images are captured simultaneously, with either no relative displacement (or negligible relative displacement) between the object being scanned (or sense) and the set of imaging modules 100 occurring during the acquisition of the images. The cameras C1 and C2 may be synchronized to either capture the images at the same time or sequentially during a period of time in which the relative position of the set of imaging modules 100 with respect to the scene remains the same or varies within a predetermined negligible range. Both of these cases are considered to be a simultaneous capture of the images by the set of imaging modules 100.

Once the two images of a frame have been captured by C1 and C2, image processing may be applied to the images to derive 3D measurements of the surface of the object being scanned. The two images generated from the two respective viewpoints of the cameras C1, C2 contain reflection of the structured light pattern projected by the light projector unit P onto the object being scanned (the scene). The reflected structured light pattern may appear as a set of continuous segments of light reflection (sometimes referred to as "blobs") in each image rather than as continuous light stripes. Herein, light "blobs" refer to continuous segments of light on the images reflected from a surface of an object. As the projected light stripes can be partially or wholly obfuscated and/or deformed depending on the shape of the object's surface, the cameras will detect these continuous segments of light (blobs) rather than elongated lines. Moreover, segments of light (blobs) that correspond to same light stripe of the structured light pattern may or may not be connected to each other and thus more than one segment of light (blob) may be matched to a same light stripe from the plurality of light stripes projected by the projector. These segments (blobs) in the images appear lighter than the background and can be segmented using any suitable approach known in the art techniques, such as thresholding the image signal and applying segmentation validation. To reduce an impact of noise in the image, a minimum length of a segment (blob) may be set to a predetermined number of pixels, such as 2 pixels, for example. The pixels that are part of the same continuous segments of light reflection may be indexed with a label.

Figure 2:
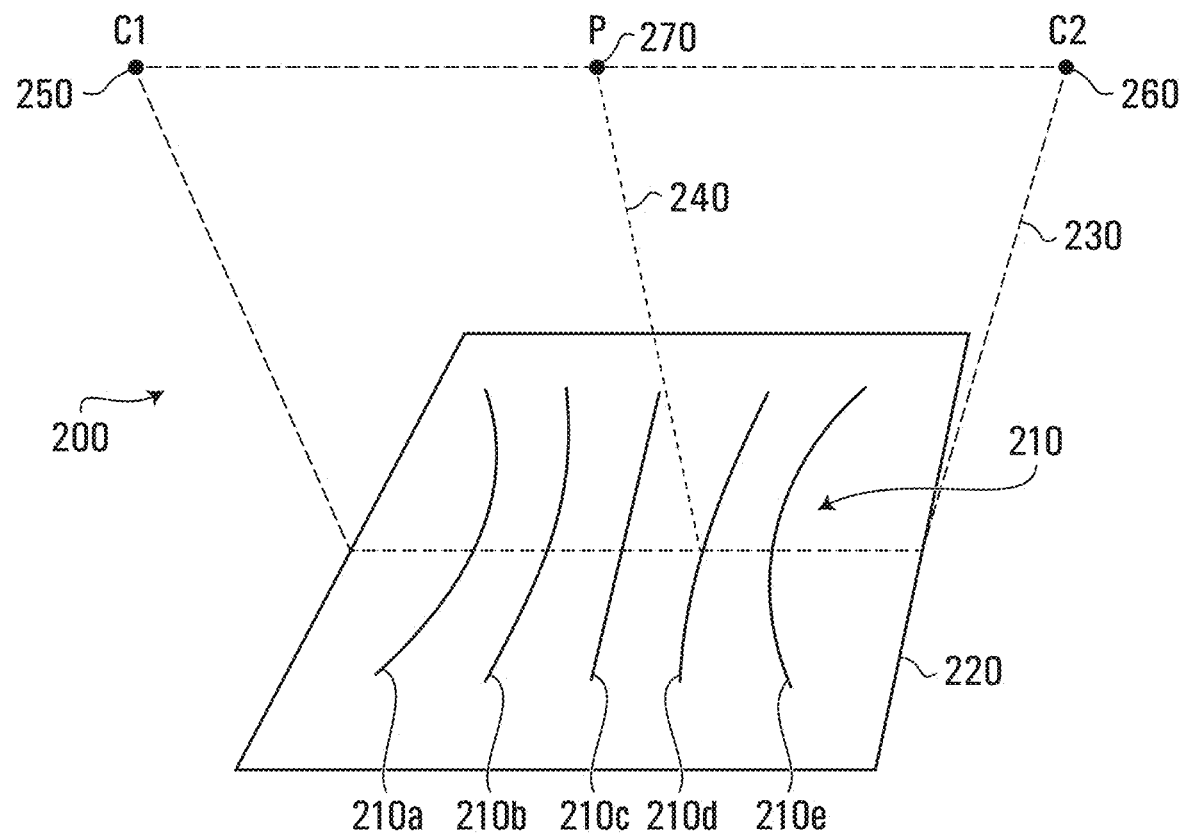
FIG. 2 is a representation of an epipolar plane overlaid on a scene in accordance with a specific embodiment.

Once continuous segments of light reflections have been identified in the two images of a frame captured by cameras C1 and C2, an epipolar plane may be selected in the next processing step FIG. 2 is an illustration 200 showing an example epipolar plane 230 overlaid on an image 220. As depicted, the epipolar plane shares a common line segment between the centers of projection 250 and 260 corresponding to the two cameras C1 and C2. The line segment C1-C2 acts as a rotational axis for defining multiple epipolar planes. Thus, a set of epipolar planes can be indexed using a parameter angle relative to the line segment C1-C2 or, equivalently, using a pixel coordinate in one of the images captures by C1 and C2. A specific epipolar plane intersects the two image planes and thus defines two conjugate epipolar lines. Without loss of generality, assuming a rectified stereo pair of images captured by C1 and C2, each image line can be considered to be an index of an epipolar plane.

In the case illustrated in FIG. 2, the scene 220 is planar. A ray 240 arising from the center of projection 270 of the light projector unit P is shown in dotted line. The curved light segments 210 of the structured light pattern projected by the light projector unit P and reflected from the scene in the image 220 are labelled 210a, 210b, 210c, 210d and 210e.

Figure 3:
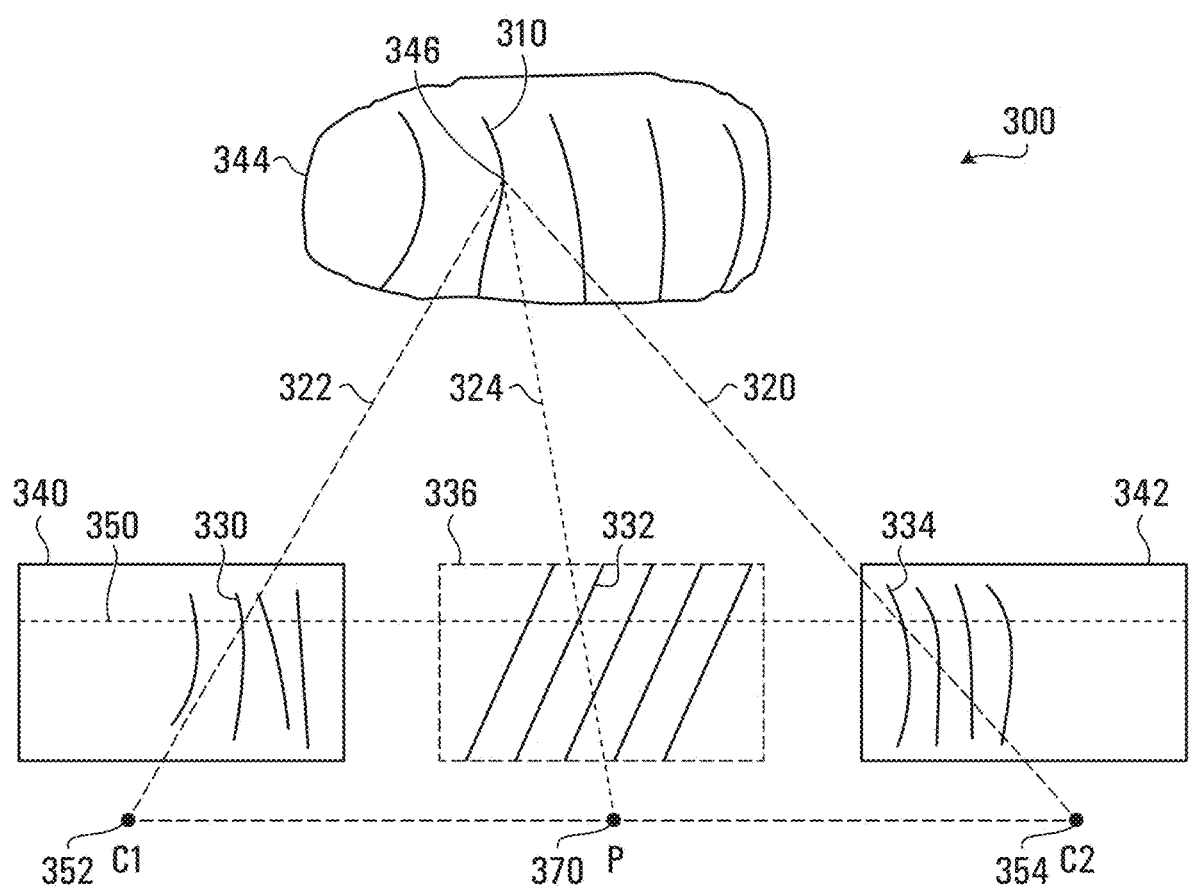
FIG. 3 depicts a view of two images, a projected pattern, and its reflection on an object in accordance with a specific embodiment.

FIG. 3 depicts a view 300 of a scene with a structured light pattern being projected from a light projector unit P onto an object 344 and the reflected contiguous light segments 310 on the object 344 that result being captured in images 340 and 342 by the two cameras C1, C2 in a frame. For each epipolar plane, which in FIG. 3 corresponds to a specific line of pixels in the images, the continuous light segments crossing the same specific line in both images are identified to generate a list of continuous segment indices or identifiers for each image. In FIG. 3, the first camera C1 is represented by its center of projection 352 and its image plane 340. The second camera C2 is represented by its center of projection 354 and its image plane 342. The light projector unit P is illustrated by a center of projection 370 and an image plane 336. It is not necessary that the center of projection 370 of the projector be located on the baseline between the centers of projection 352, 354 of the cameras although it is the case in the example embodiment of FIG. 3.

In FIG. 3, the intersection 350 between the image planes and a specific epipolar plane is shown using a dotted line. Rays 322, 324 and 320 belong to the same epipolar plane.

The light projector unit P projects at least one light stripe 332 onto the object 344, thus producing a reflected curve 310. This reflected curve 310 is then imaged in the first image captured by the first camera C1 (imaged curve 330) while it is also imaged in the second image captured by the second camera C2 (imaged curve 334). Point 346 on reflected curve 310 is then present on imaged curves 330, 334 and should be properly identified and matched in those images to allow finding its 3D coordinates. The imaged curves 330, 334 intersect the illustrated epipolar plane on intersection 350 along rays 322 and 320, originating from the reflected curve 310 on the object 344. The rays 322 and 320 entering the cameras and the ray 324 of the specific light stripe 332 all lie on the same epipolar plane and intersect at point 346.

The one or more computer processors 160 (shown in FIG. 1B) of the set of imaging modules 100 may be programmed for matching the curves 330 and 334 in the images with projected light stripe 332 as having the common point of intersection at point 346 on the object 344. The projected light stripe 332 as well as the additional light stripes in the structured light pattern projected by light projector unit P are intersected by the intersection 350. The cameras C1, C2 and projector unit P are arranged so that the projected light stripes of the structured light pattern extend transversely, and in some cases orthogonally, to the intersection 350 and to the epipolar planes.

Since the light projector unit P and the cameras C1, C2 are calibrated in a same coordinate system, it is possible to derive triplets of indices where a triplet (I1, I2, IP) is composed of (i) the index of the curve in the first image I1 captured by camera C1; (ii) the index of a candidate corresponding curve in the second image I2 captured by camera C2; and (iii) the index of the elongated light stripe in the structured light pattern projected by light projector unit P. The triplets of indices can then be processed using known techniques to match points in the images captured by cameras C1 and C2 for a given frame.

After completion of the matching step for images captured by cameras C1 and C2 for a given frame, measurements of 3D points may be calculated by processing the triplets. For that purpose, one may minimize the distance between the 3D point and each of the three rays in space. It is then assumed that the projected light sheets are very well calibrated, either parametrically or using a look-up table (LUT) to eventually obtain more accurate measurements. In practical applications, the projected light sheet produced through commercial optic components may not correspond exactly to a plane. For this reason, the use of a LUT may be more appropriate. Another possible approach consists in only exploiting the images from the two cameras for the final calculation of the 3D points.

The capability to make 3D measurements of a surface using a 3D scanner, such as the example techniques described above, are contingent on the ability of the 3D scanner to capture images of the scene/object with sufficient definition and detail to enable the subsequent image data processing to determine accurate measurements of 3D points based on the captured image data (e.g., to detect and measure features of the structured light pattern projected onto the surface of the object). In order to capture image data of a sufficiently high quality to enable such 3D measurements, the exposure setting of the 3D scanner should be controlled to account for different lighting and/or reflectance of the surface of the object being scanned. Otherwise, the image data captured by the 3D scanner may be overexposed or underexposed, which can degrade the accuracy of subsequent measurements based on the overexposed or underexposed image data. For example, an exposure setting that is too low results in the image data being underexposed. As a result the reflections of the structured light pattern projected onto the surface of the object being scanned may be perceived only very weakly, or possibly not at all, in the image data captured by the cameras of the 3D scanner (such as the cameras C1, C2), which may prevent the subsequent image processing from being able to calculate and build a 3D mesh based on the underexposed image data. On the other hand, if the exposure is too high, resulting in overexposed image data, the reflections of the structured light pattern may be so intense that the pixels of the image sensors of the cameras of the 3D scanner are saturated (i.e., the pixels record their maximum saturated values). As a result, information is lost for intensity values higher than the saturated value of the image sensor, which means that the features of the structured light pattern may not be clearly defined and may lead to an improper surface reconstruction and/or an unusual amount of noise in the 3D measurement data. In contrast, when the exposure setting is optimal or near-optimal, the features of the structured light pattern projected onto the surface of the object appear as clearly contrasted elements with respect to the remainder of the surface of the object/scene in the captured image data, and therefore can be used to make accurate 3D measurements for surface reconstruction as described above.

Many conventional 3D scanners are configured to operate at a scanning distance of a few hundred millimeters from the surface of the object being scanned and are configured to capture a generally rectangular area of a few hundred millimeters on a side with a depth of field of no more than a few hundred millimeters. An example of such a conventional 3D scanner 600 is shown in FIG. 4. In this example, conventional 3D scanner 600 is configured to operate at a scanning distance of approximately 300 millimeters/11.81 inches to capture a generally rectangular area of approximately 310 millimeters×350 millimeters (approximately 0.1085 square meters or 168.18 square inches) with a depth of field of approximately 200 millimeters/7.87 inches covering approximately 250 millimeters/9.84 inches from 3D scanner 600 to 450 millimeters/17.72 inches from 3D scanner 600.

There are many applications for 3D scanning in which it would be desirable to scan a larger volume in each frame, i.e., to scan a larger area at a greater scanning distance over a greater depth of field. Non-limiting examples of such applications may include scanning of larger objects or parts (e.g., having dimensions of several meters or larger) in industries such as energy, transport, mining, heavy industry, and architecture, to support quality control monitoring and/or product development/reverse engineering. For example, as shown in FIG. 4, 3D scanner 10 may be configured to operate at a scanning distance of approximately 1200 millimeters/47.24 inches to capture a generally rectangular area of approximately 1200 millimeters×1200 millimeters (approximately 1.44 square meters or 2232 square inches) with a depth of field of approximately 1100 millimeters/43.3 inches covering approximately 400 millimeters/15.75 inches from 3D scanner 10 to 1500 millimeters/59.06 inches from 3D scanner 10. As a result, the depth of field of 3D scanner 10 is approximately 5.5 times greater than that of 3D scanner 600 and 3D scanner 10 is operates at a scanning distance that is approximately 4 times that of scanner 600.

However, 3D scanning with a larger depth of field at a larger distance from the object being scanned poses several challenges. One such challenge relates to controlling the exposure of the 3D scanner. In some conventional 3D scanners control of the exposure is performed manually by the user, but manual exposure control is cumbersome and generally undesirable from a user-experience perspective. On the other hand, techniques for automatic exposure control that have been successfully employed on conventional 3D scanners configured to scan at relatively short scanning distances with relatively shallow depths of field have proven to be ineffective or impractical for longer scanning distances and greater depths of field. For example, one conventional technique for automatic exposure control relies on the use of a color camera and a white light source to illuminate the surface of the object being scanned. Color image data captured by the color camera while the object is illuminated by the white light source is processed to determine an optimal exposure setting to be used to control the exposure of the monochrome geometry cameras, such as the cameras C1, C2. However, in addition to increasing the cost and complexity of the 3D scanner by requiring the addition of the color camera and white light source, this technique has proven to be impractical for 3D scanning at larger distances over greater depths of field. One reason for this is that illuminating a larger surface at a greater distance and over a larger depth of field generally requires a more powerful light source and/or an extremely long exposure time and there are practical limits on the power of a light source and the maximum exposure time that can be accommodated on a handheld 3D scanner. Another conventional technique for automatic exposure control for a 3D scanner utilizes image data captured by the monochrome geometry cameras, such as the cameras C1, C2, but utilizes an iterative process whereby the exposure parameters of the 3D scanner are adjusted blindly over the course of multiple images captured by one or more of the geometry cameras and an optimal exposure setting is identified based on the multiple images. However, the iterative nature of this technique can slow down scanning speed.

Another challenge to automatic exposure control for a 3D scanner, particularly for 3D scanning at larger distances over greater depths of field, relates to the use of image compression. For example, as discussed above, in many implementations image data captured by a handheld 3D scanner is transmitted to a remote computer processing system that is configured to perform the subsequent processing of the image data for the final calculation of the 3D points for surface reconstruction (e.g., the one or more processors 160 of FIG. 1B). However, a data rate limitation of the communication link between the 3D scanner and the remote computer processing system may require the image data captured by the 3D scanner to be compressed In such implementations, communication between the 3D scanner and the computer processing system may be done over a communication link, such as a Universal Serial Bus 3.0 (USB 3.0) cable, that imposes some finite limitation on the data rate of the communication between the 3D scanner and the computing system. As a result, some form of lossy image compression may be used to compress the image data captured by the 3D scanner before it is communicated to the remote computer processing system over the communication link in order to accommodate the data rate limitation of the communication link between the 3D scanner and the remote computing system while still maintaining some minimum frame rate for the 3D scanning application. For example, the theoretical transfer speed of a USB 3.0 connection is 4.8 Gigabits/second. As a non-limiting illustrative example, if the image sensor (e.g. complimentary metal-oxide-semiconductor (CMOS) sensor or charge coupled device (CCD) sensors) of each of the cameras C1, C2 is a 5 Megapixel sensor (e.g., 2432 pixels×2048 pixels) that natively generates 12-bits per pixel image data, then the theoretical framerate limit would be approximately 40 Hz, with each of the cameras C1, C2 producing approximately 2.4 Gigabits/second of image data for a combined total of approximately 4.8 Gigabits/second for the two cameras. Using a compression scheme on the 3D scanner to convert the native 12-bits/pixel image data generated by the two cameras to 8-bits/pixel compressed image data would allow the system to operate at a theoretical framerate of 60 Hz or 60 frames per second, which would allow the system to make more 3D measurements per second. Another advantage of using 8-bits/pixel images is to allow performance optimization using Single Instruction Multiple Data (SIMD) instructions that are available on modern CPUs. Using such instructions when processing images allows the system to operate at greater speed by processing more pixels in the same amount of time than if 12-bits/pixel images were used.

Figure 5A:
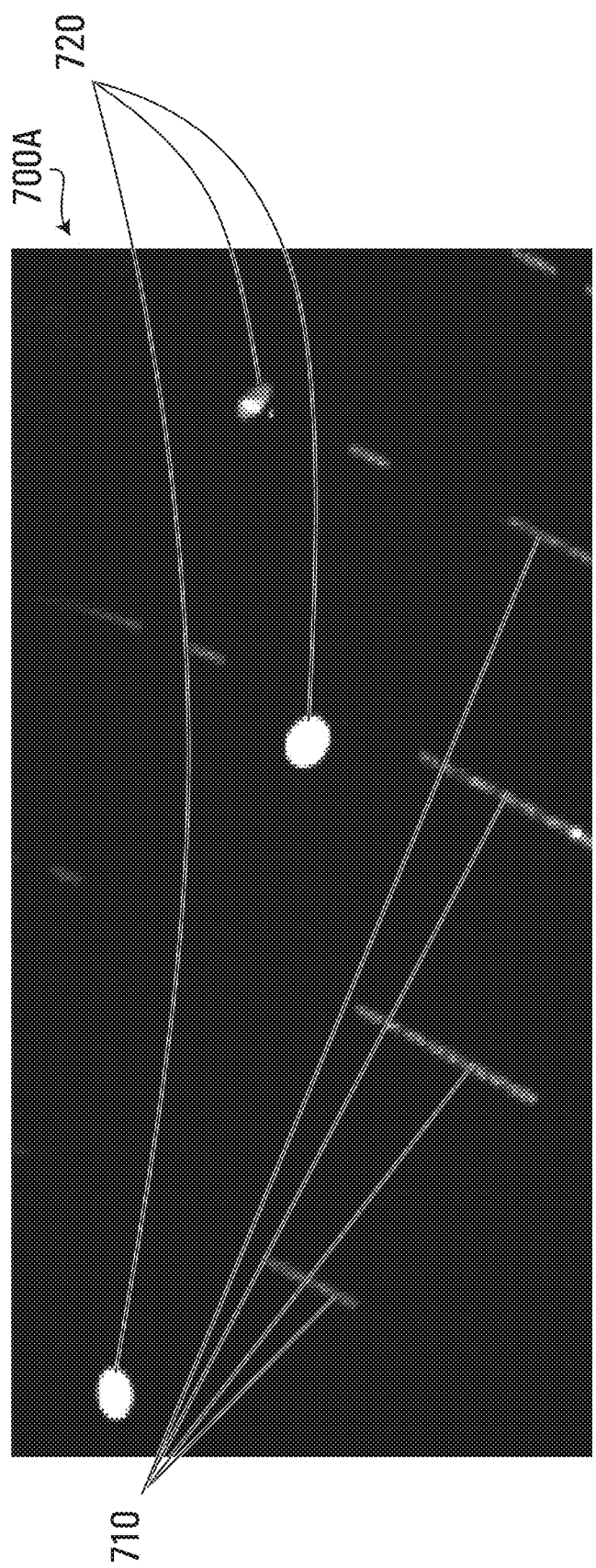
FIG. 5A depicts a compressed version of an image captured by a 3D scanner, including a reflection of a structured light pattern projected onto the surface of a target object, wherein the compressed version of the image was generated by compressing the image data of the image using a linear conversion.

However, although compressing the image data can allow higher frame rates for a given data rate limitation of the communication link between the 3D scanner and a remote computer processing system, a conventional linear compression scheme can make accurate detection and measurement based on the compressed image data difficult or even impossible. One reason for this is that the information lost through a conventional linear compression scheme (e.g., that linearly converts 12-bits/pixel image data to 8-bits/pixel image data) may be information that is critical to accurately controlling an automatic exposure setting and/or information that is critical to detecting and/or measuring features of a structured light pattern projected onto the surface of the object being scanned. For example, one technique for automatic exposure control for a 3D scanner relies on accurately determining an intensity value for an image captured by a camera of the 3D scanner, wherein the characteristic intensity value indicates a general reflectivity of the surface of the object being scanned, such that an optimal exposure setting for the 3D scanner can be determined on the basis of the determined intensity value for the image. However, the loss of information resulting from the use of a conventional linear compression scheme may not allow for accurate automatic exposure control using this technique. For example, FIG. 5A depicts a compressed version of an image 700A captured by a monochrome geometry camera of a 3D scanner, including a reflection of a structured light pattern projected onto the surface of a target object, wherein the compressed version of the image depicted in FIG. 5A was generated by compressing the image data of the image using a linear conversion.

Figure 5B:
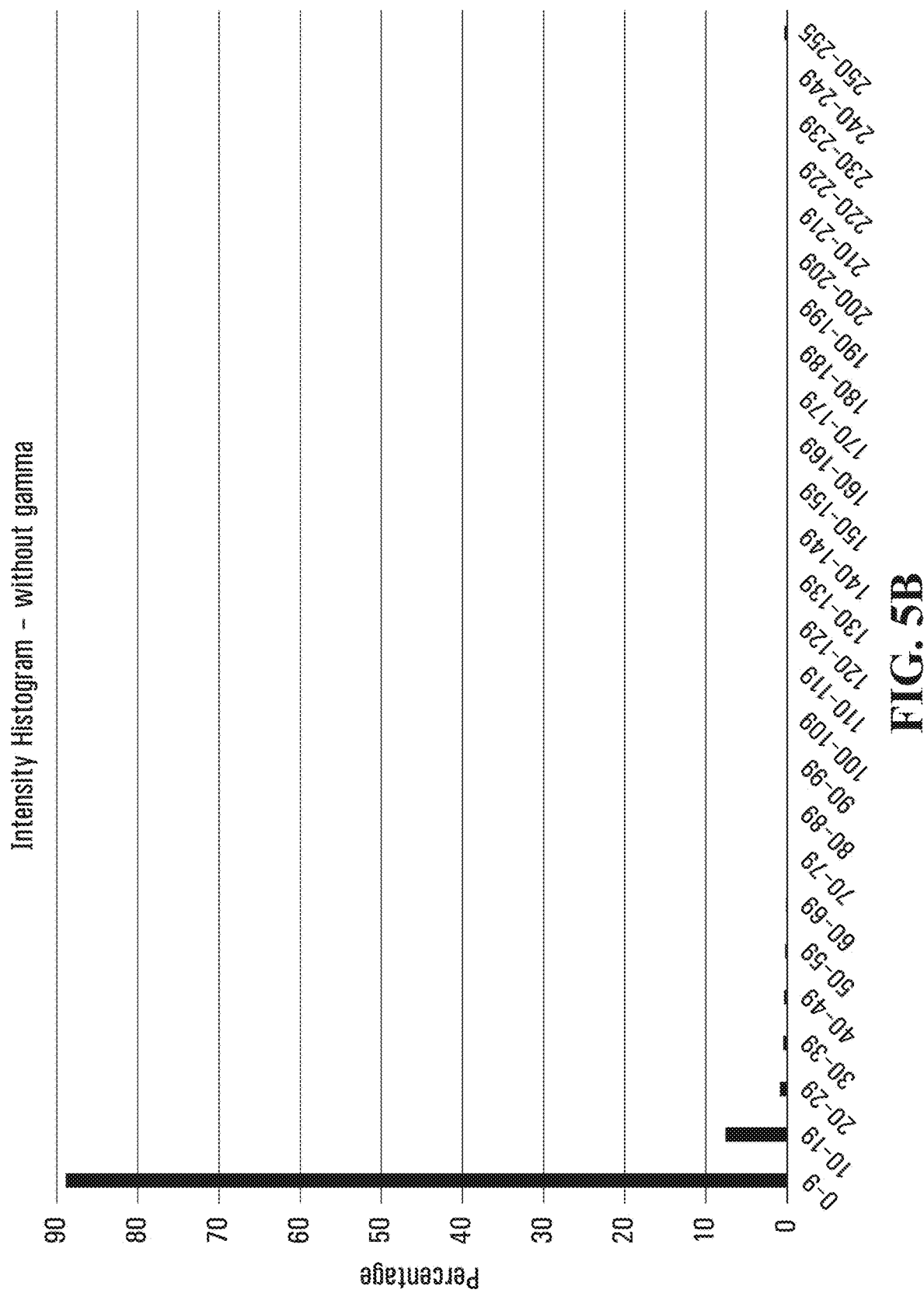
FIG. 5B depicts intensity histogram data for the compressed versions of the image depicted in FIG. 5A.

Three visual targets 720 used to help to position the scanner in the 3d space are also visible in the compressed version of the image 700A. Many applications of 3D metrology require highly precise measurements, on the order of a few tens of microns, in some cases within working volumes of several cubic meters. Measurements of such precision can be affected by even small displacements between the object and the 3D scanner, such as displacements caused by vibrations in the environment where the object is located. To compensate for such variations in the measurement process, photogrammetric systems (also referred to as positioning systems in the present application) have been developed that use visual targets that are affixed to the object and/or to a rigid surface that is still with reference to the object. The visual targets are generally in the form of adhesive units with a surface that is retroreflective with respect to light emitted from the 3D scanner, such as Lambertian surfaces, retroreflective paper, and/or light emissive targets. The visual targets are accumulated in a target positioning model for which the handheld 3d scanner position itself upon and this allows for either the 3d scanner to scan while it moves around the object and/or for the object to move while the scanner remain fixed during scan and/or for both the 3d scanner and the object to move relative to each other while scanning. However, the use of visual targets, such as the three visual targets 720 in the example depicted in FIG. 5A is not required and may be omitted in some practical implementations as shown in structured light pattern 1110 in FIGS. 10A and 10B, for example. Referring again to FIG. 5A, in this example the target object is a multi-colored hockey helmet and the native image data captured by the image sensor of the camera is 12-bits/pixel grayscale image data (values between 0 and 4095) that has been compressed to 8-bits/pixel grayscale image data (values between 0 and 255) using a linear compression scheme according to the following equation:

$$p_o = \frac{p_i}{2^N - 1} * (2^M - 1) \quad \text{(equation 1)}$$

where $p_o$ is an output pixel value with an M-bit resolution, $p_i$ is an input pixel value with an N-bit resolution, where N=12 and M=8. In this example, the structured light pattern projected onto the surface of the helmet includes four generally parallel light stripes collectively identified as 710, each of which is only partially detectable in the compressed version of the image 700A. This is because the majority of the pixels in the compressed version of the image 700A appear to be almost uniformly black in gray scale (i.e., having 8-bit gray scale intensity values in the range of 0-9) due to the larger depth of field and the greater distance between the 3D scanner and the object being scanned (i.e., the helmet in this example). More specifically, because of the larger depth of field and greater scanning distance, the 3D scanner may not illuminate the object being scanned as brightly and/or as uniformly as would otherwise be possible at a closer scanning distance over a shallower depth of field. As a result, many of the pixels in the native 12-bit grayscale image data captured by the camera have 12-bit gray scale intensity values in the range of 0-144, which are converted to 8-bit gray scale intensity values in the range of 0-9 by the linear conversion scheme used in this example). For example, FIG. 5B depicts intensity histogram data for the compressed version of the image 700A, which shows that over 90% of the pixels in the compressed version of the image 700A having 8-bit gray scale intensity values in the range of 0-9. As a result, in the compressed version of the image 700A only some higher intensity portions of the reflection of the structured light pattern 710 and the three visual targets 720 disposed on the surface of the helmet are discernible from the otherwise generally black background. As such, with almost no variation in the background intensity values (corresponding to the properties (e.g., reflectance and distance) of the object being scanned) it is generally not possible to effectively control the exposure of the 3D scanner using an intensity value derived from such linearly compressed image data.

One aspect of the present disclosure provides methods, systems and apparatuses for 3D scanning that utilize nonlinear image data compression that generates a high dynamic range (HDR) compressed version of an image that allows the subsequent image processing to "see" the reflectance of the surface to scan between the reflections of the structured light pattern with enough resolution (in grayscale) to determine an effective value for the system exposure setting without the need for an iterative method (adjusting blindly on multiple images). For example, FIG. 5B depicts a compressed version of an image 700B captured by the same monochrome geometry camera as FIG. 5A, including a reflection of a structured light pattern projected onto the surface of the same object (i.e., the same multi-colored hockey helmet), but in this case the compressed version of the image 700B was generated by compressing the image data of the image using a nonlinear conversion that amplifies the low intensity values and limits saturation of the high intensity values. This allows the information (low and high intensity) of a 12 bits/pixel image to be contained in an 8 bits/pixel image. For example, FIG. 6B depicts intensity histogram data for the compressed version of the image 700B, which shows that, in contrast to the linearly compressed version of the image 700A in which over 90% of the pixels with low intensity values in the original 12-bit image data were converted to 8-bit grayscale intensity values in the range of 0-9, those same lower intensity values in the original 12-bit image data are instead converted to 8-bit grayscale intensity values that are distributed across multiple ranges of 8-bit grayscale intensity values that can be visually distinguished.

The consequence of this is that there are now some differences between areas of low intensity gray scale that were lost in the linearly compressed version of the image 700A, which allows the object to be scanned at lower intensities, which facilitates scanning over a broader depth of field at a greater scanning distance.

These low intensity values that otherwise would have been lost can be used to determine the reflectivity of the surface (light through dark) which can be used for the automatic control of the 3D scanner's exposure setting (cameras' shutter timing, projector timing and/or camera image sensor gain), as discussed in further detail below. With this innovation, a 3D scanning system can change its system exposure setting automatically based on the surface reflectance scanned without the need for the user to manually change the exposure parameters.

In addition, the compressed version of the image 700B that was generated using a nonlinear conversion allows the subsequent image processing (e.g., at the computer processors 160) to detect the reflections of the structured light pattern at lower intensities (in particular at the image edges and in regions of the helmet with lower reflectance, such as in darker colored regions 730 of the multi-colored helmet), whereas in the linearly compressed version of the image 700A only the higher intensity portions of the reflections of the structured light pattern in the lighter colored regions 740 were generally discernible.

Referring again to FIGS. 6A and 6B, it is noted that in this specific example, the nonlinear compression of the image data was done using a nonlinear conversion function of the form:

$$p_o = \left(\frac{p_i}{2^N - 1}\right)^{1/gamma} * (2^M - 1) \quad \text{(equation 2)}$$

where $p_o$ is an output pixel value with an M-bit resolution, $p_i$ is an input pixel value with an N-bit resolution, and gamma >1. In particular, in this specific example, N=12, M=8 and gamma=3.0.

Figure 6A:
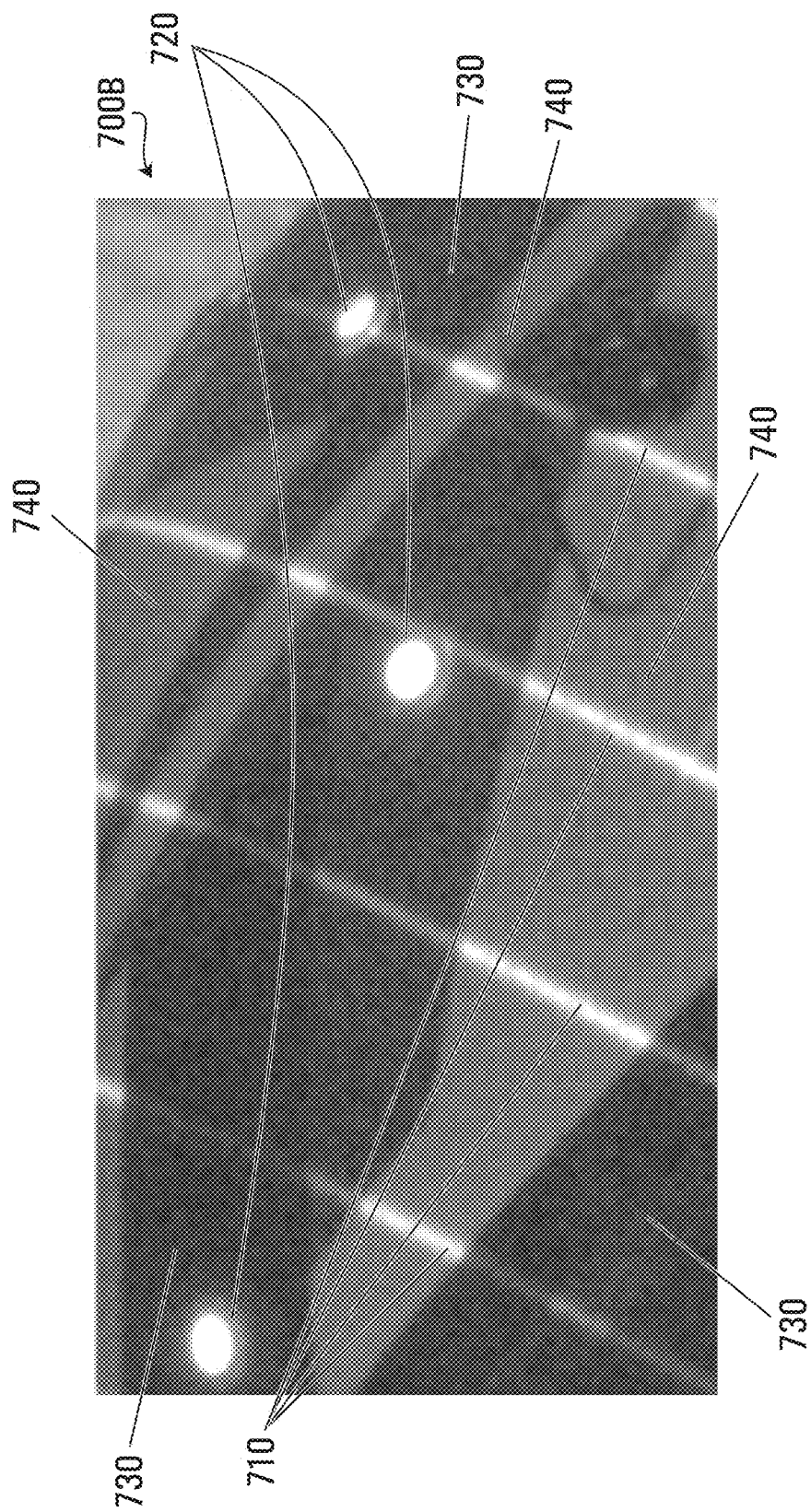
FIG. 6A depicts a compressed version of an image captured by a 3D scanner, including a reflection of a structured light pattern projected onto the surface of a target object, wherein the compressed version of the image was generated by compressing the image data of the image using a nonlinear conversion in accordance with a specific embodiment.
Figure 6B:
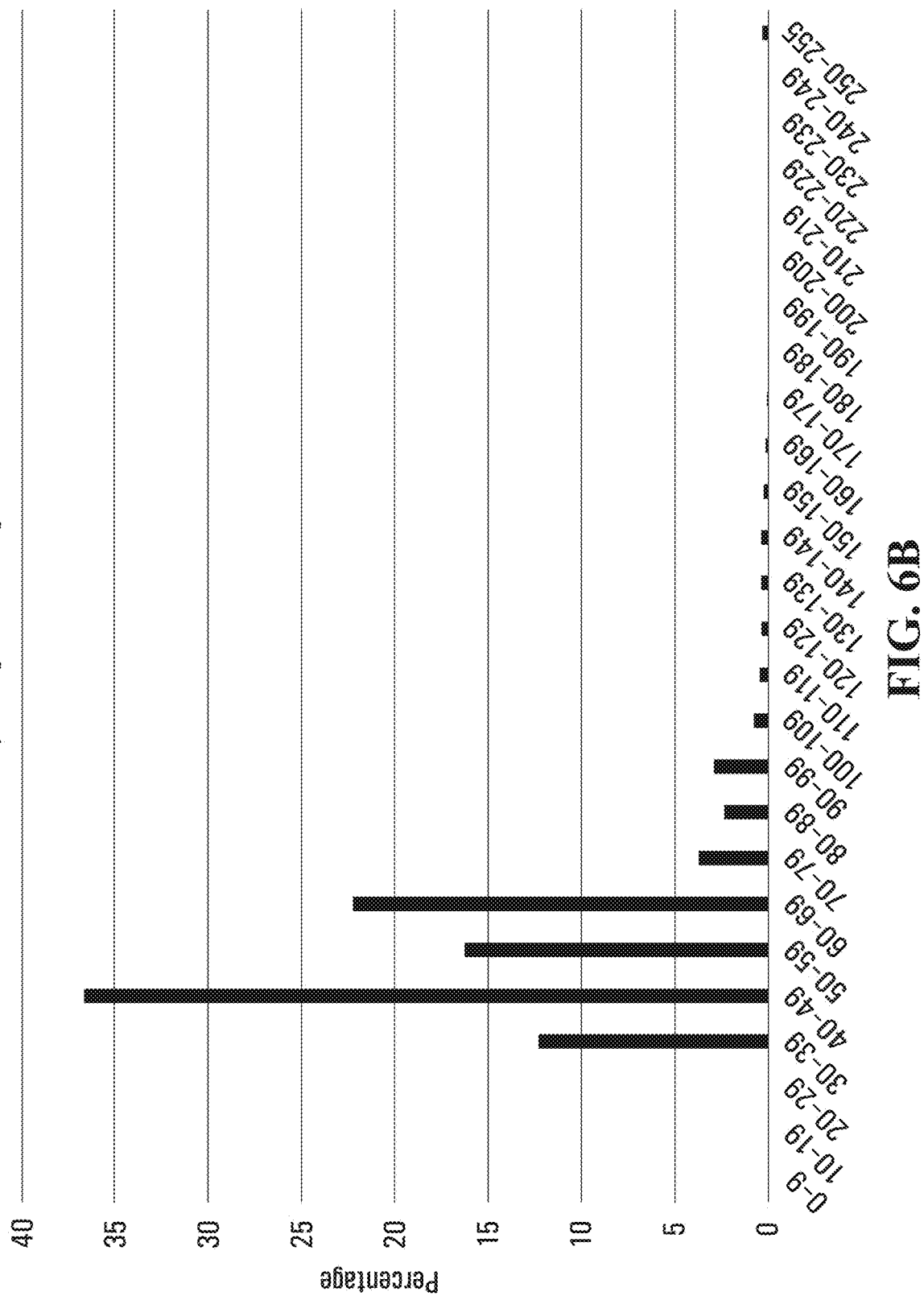
FIG. 6B depicts intensity histogram data for the compressed versions of the image depicted in FIG. 6A.
Figure 8A:
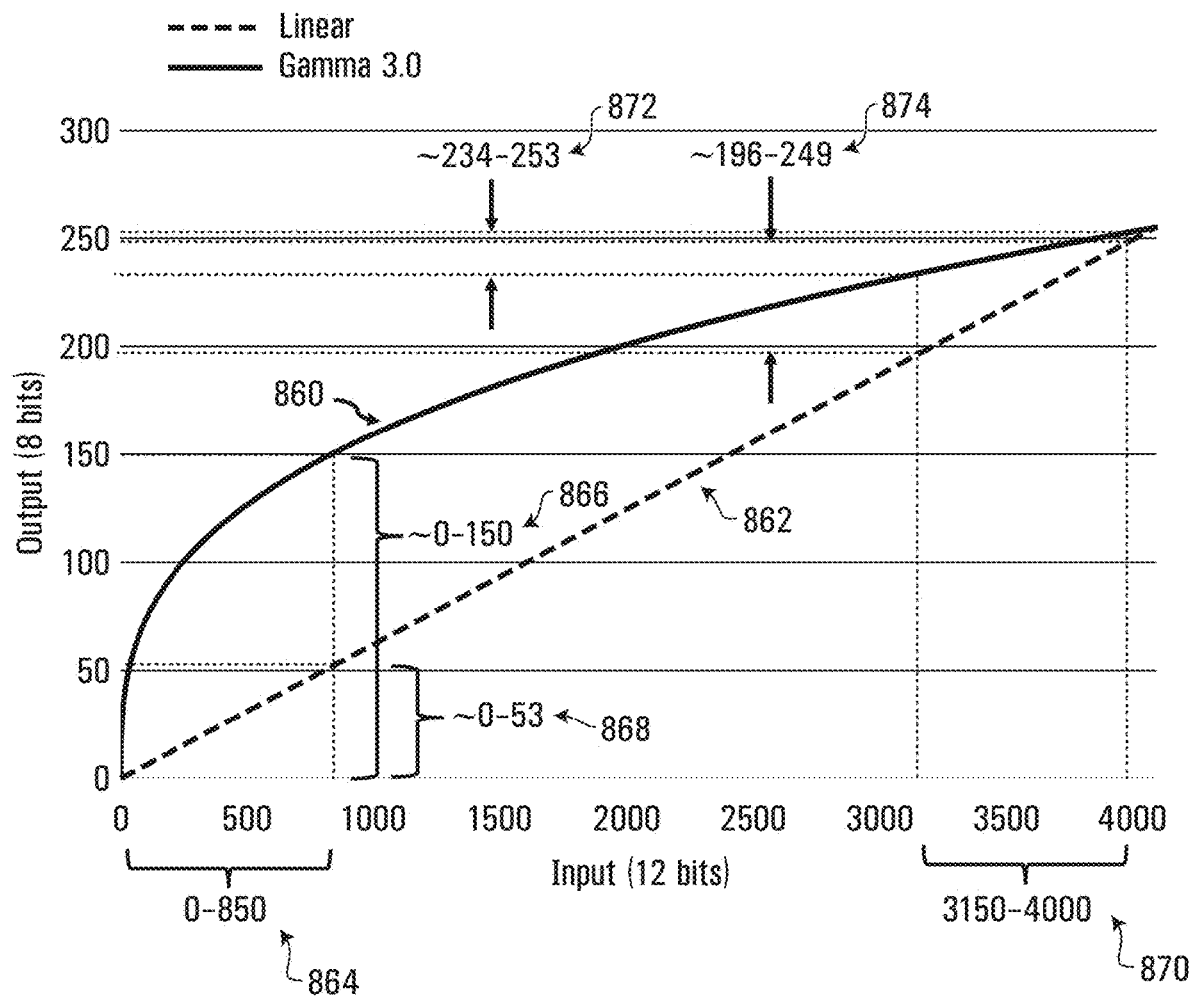
FIGS. 8A and 8B depicts non-limiting examples of non-linear conversion functions that may be used for image data compression in some embodiments.

FIG. 8A depicts a plot 860 showing the specific nonlinear gamma function (gamma=3.0) used in the specific example depicted in FIGS. 6A and 6B. FIG. 8A also includes a plot 862 of a conventional linear 12-bit-to-8-bit conversion function, which corresponds to equation 1 above. As shown in FIG. 8A, a nonlinear conversion of 12-bit image data to 8-bit compressed image data using the gamma function indicated at 860 compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited. This serves to limit saturation in the higher intensity levels and limit the loss of information through the nonlinear conversion. For example, as shown in FIG. 8A, lower intensity values, such as those in the 0-850 range in the 12-bit uncompressed image data (indicated at 864), that are nonlinearly converted using the gamma function indicated at 860 are amplified and mapped to intensity values in the range of 0-150 in the 8-bit compressed image data (indicated at 866). In other words, although the full dynamic range of the 8-bit image data (i.e., 0-255) is compressed relative to the full dynamic range of the 12-bit image data (i.e., 0-4095), the compression is such that lower intensity values are mapped to a larger portion of the compressed dynamic range of the compressed image data (e.g., the 0-850 range in 12-bit uncompressed image data, which represents approximately 20% of the full dynamic range that is possible in 12-bit image data, is amplified and mapped to the 0-150 range in the 8-bit compressed image data, which represents approximately 60% of the full dynamic range that is possible in 8-bit image data). In contrast, a linear conversion using the linear function indicated at 862 maps the lower intensity values in the 0-850 range in 12-bit uncompressed image data to values in the 0-53 range in 8-bit compressed image data (indicated at 868), which represents approximately 20% of the full dynamic range that is possible in 8-bit image data. In other words, the linear conversion function indicated at 862 does not map lower intensity levels to a larger portion of the compressed dynamic range of the compressed image data. Furthermore, as also shown in FIG. 8A, amplification of higher intensity values is limited by the nonlinear conversion provided by the gamma function indicated at 860. For example, as shown in FIG. 8A, higher intensity values, such as those in the 3150-4000 range in the 12-bit uncompressed image data (indicated at 870), that are nonlinearly converted using the gamma function indicated at 860 are amplified and mapped to intensity values in the range of 234-253 in the 8-bit compressed image data (indicated at 872). In other words, although the full dynamic range of the 8-bit image data (i.e., 0-255) is compressed relative to the full dynamic range of the 12-bit image data (i.e., 0-4095), the compression is such that the amplification is limited. For example, in the example depicted in FIG. 8A, higher intensity values are mapped to a smaller portion of the compressed dynamic range of the compressed image data (e.g., the 3150-4000 range in 12-bit uncompressed image data, which represents approximately 20% of the full dynamic range that is possible in 12-bit image data, is amplified and mapped to the 234-253 range in the 8-bit compressed image data, which represents approximately 7.5% of the full dynamic range that is possible in 8-bit image data). In contrast, a linear conversion using the linear function indicated at 862 maps the higher intensity values in the 3150-4000 range in 12-bit uncompressed image data to values in the 196-249 range in 8-bit compressed image data (indicated at 874), which represents approximately 20% of the full dynamic range that is possible in 8-bit image data.

Figure 8B:
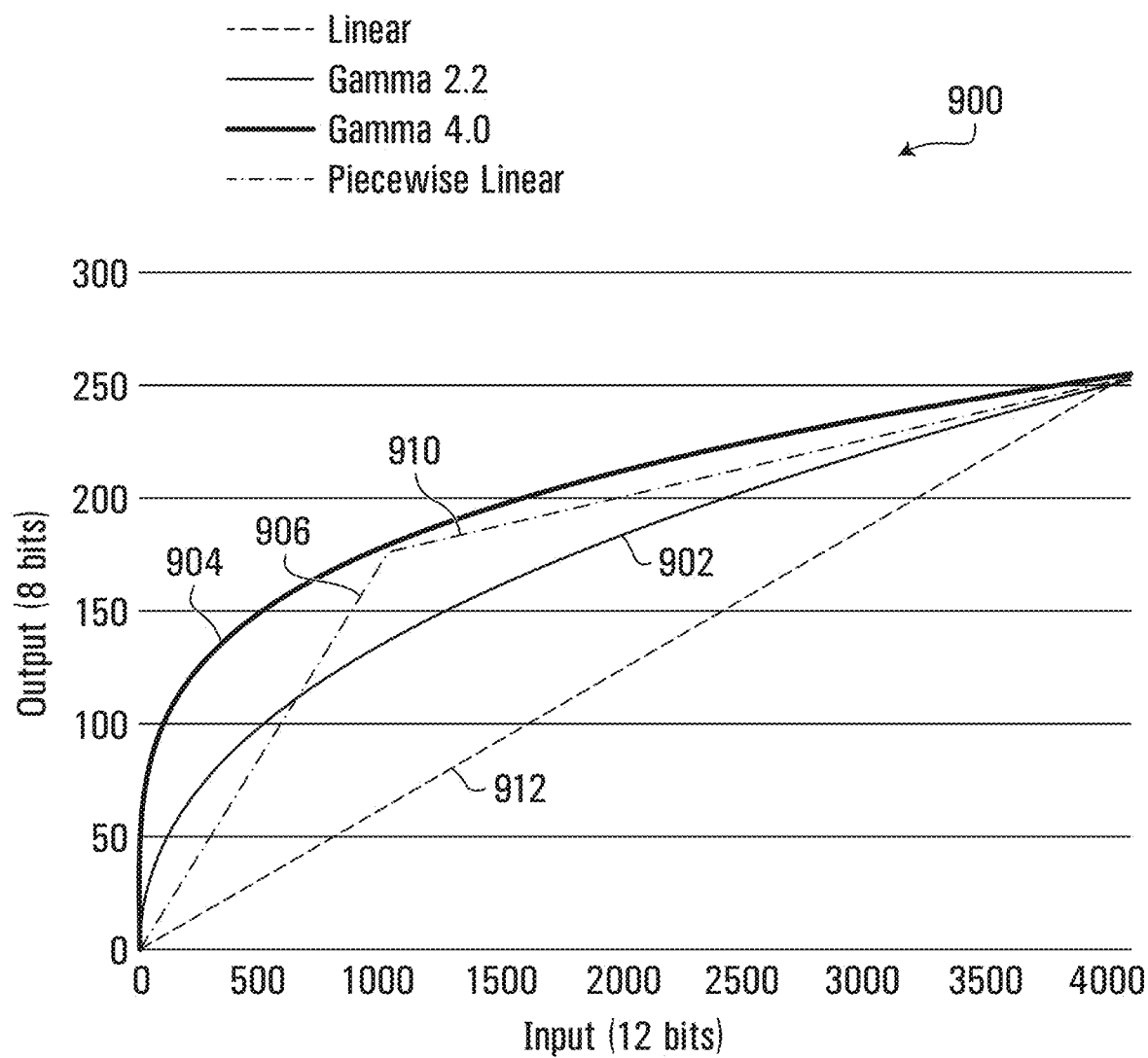

FIG. 8B depicts plots (collectively indicated at 900) showing a few other non-limiting examples of nonlinear functions that may be used in specific embodiments. The other examples shown in FIG. 8B include plots (indicated at 902 and 904) of similar gamma functions (gamma=2.2 and gamma=4.0) and a plot of a piecewise linear function in which a slope of a linear portion of the piecewise linear function for conversion of lower intensity values (indicated at 906) is greater than a slope of a linear portion of the piecewise linear function for conversion of higher intensity values (indicated at 910). FIG. 8B also includes a plot (indicated at 912) of a conventional linear 12-bit-to-8-bit conversion function, which corresponds to equation 1 above.

As noted above, the use of a nonlinear conversion that amplifies lower intensity values and limits saturation of higher intensity values facilitates the detection of features with low intensity in an image (e.g., projected laser lines and visual targets) without overexposing the lighter (higher intensity) regions in the image. For example, if a conventional linear 12-bit-to-8-bit conversion is used to convert 12-bit grayscale image data to 8-bit grayscale image data, it is difficult to find a system exposure setting that allows the reflections of projected lasers lines to be seen on an object that has multiple regions of high contrast, such as a black and white chessboard. In that scenario, the result is that either the reflections of the laser lines are visible on the white squares and nothing is visible on the black squares (e.g., the portions of the reflections of the structured light pattern 710 that are visible on the lighter colored regions 740 of the helmet in FIG. SA) or the reflections of the laser lines on the black squares are visible but the white squares are completely saturated. A similar situation arises for visual targets, such as the visual targets 720 shown in the linearly compressed version of the image 700A, in which the visual targets that are closer appear more distinctly/brightly, whereas the visual target that is further and more inclined relative to the camera is less readily detectable.

Figure 9B:
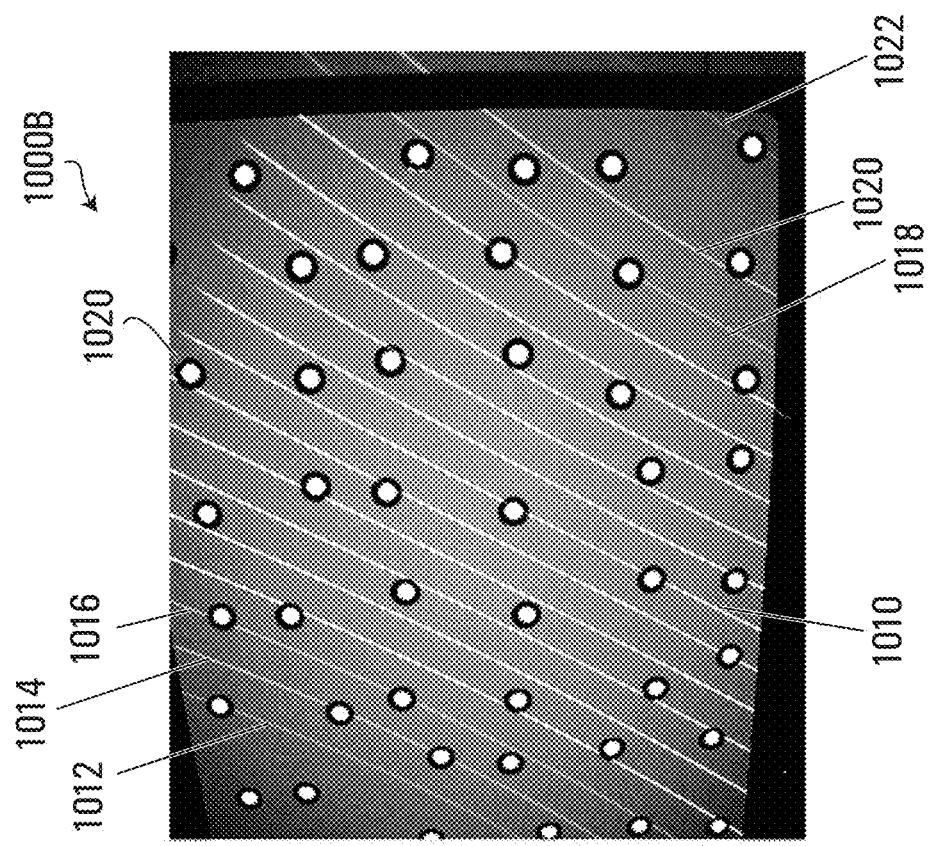
FIGS. 9A and 9B depict another example of compressed versions of images captured by a 3D scanner in which the compressed version of the image depicted in FIG. 9A was generated by compressing the image data of the image using a linear conversion and the compressed version of the image depicted in FIG. 9B was generated by compressing the image data of the image using a nonlinear conversion in accordance with a specific embodiment.
Figure 9A:
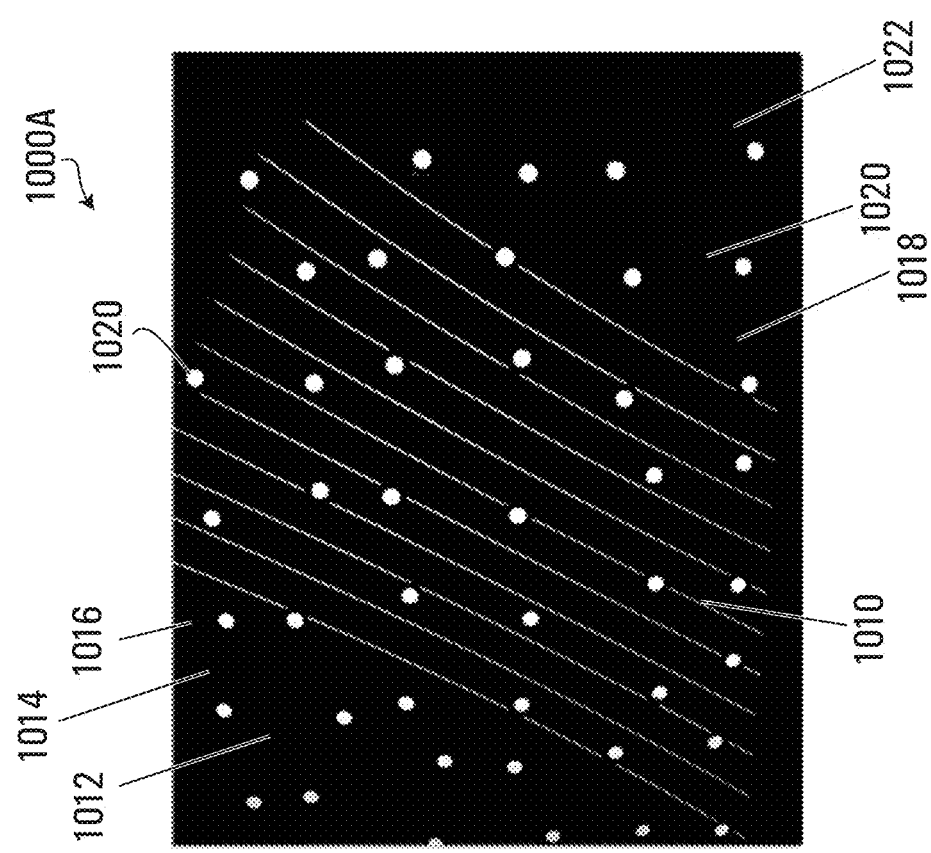

FIGS. 9A and 9B depict another example illustrating the potential benefits of utilizing nonlinear image compression in accordance with the present disclosure. In particular, FIGS. 9A and 9B depict another example of compressed versions of images captured by a 3D scanner in which the compressed version of the image depicted in FIG. 9A was generated by compressing the image data of the image using a linear conversion and the compressed version of the image depicted in FIG. 9B was generated by compressing the image data of the image using a nonlinear conversion in accordance with a specific embodiment. In this specific example, the linear compression of the image data to generate the linearly compressed version of the image 1000A depicted in FIG. 9A was done using a linear conversion function according to equation 1, while the nonlinear compression of the image data to generate the nonlinearly compressed version of the image 1000B depicted in FIG. 9B was done using a linear conversion function according to equation 2, in which N=12, M=8 and gamma=3.0. In this example, the structured light pattern projected onto the surface of the object being scanned includes multiple generally parallel light stripes collectively identified as 1010. Here again it can be seen that in the compressed version of the image 1000B that was generated using a nonlinear conversion several of the light stripes that are reflected at lower grayscale intensity values, such as light stripes 1012, 1014, 1016, 1018, 1020 and 1022 are still discernible, whereas those light stripes are either not discernible or only very weakly discernible in the linearly compressed version of the image 1000A. Furthermore, it can be seen that there is a greater variation in the grayscale intensity values in the "background" portions of the image corresponding to the portions of the surface of the object between the light stripes 1010 of the structured light pattern. As noted above, the low intensity values that otherwise would have been lost can be used as a basis for automatically controlling an exposure setting of the 3D scanner.

System Exposure Control

As noted above, using a nonlinear conversion for image compression so that lower intensity values are amplified and saturation of higher intensity values is limited results in a greater range of low intensity values in the compressed image data, which allows a better background determination (corresponding to properties, such as reflectance of the surface being scanned) and allows a better determination of the automatic system exposure setting. This is because there are value of gray scale in the background that otherwise would not be there without the nonlinear conversion. For example, one technique for controlling an automatic exposure setting is based on processing the compressed image data to identify a background intensity value of a compressed version of an image conveyed in the compressed image data. The background intensity value identified for the compressed version of the image may then be used to adjust the 3D scanner's exposure setting (e.g., the shutter timing of one or more cameras on the 3D scanner, and the corresponding projection timing of one or more light projectors on the 3D scanner and/or a gain of the one or more cameras) based on a function that will provide an optimal value of the automatic exposure setting. One non-limiting example of such a function is a decreasing exponential function, as discussed in further detail below.

Figure 7:
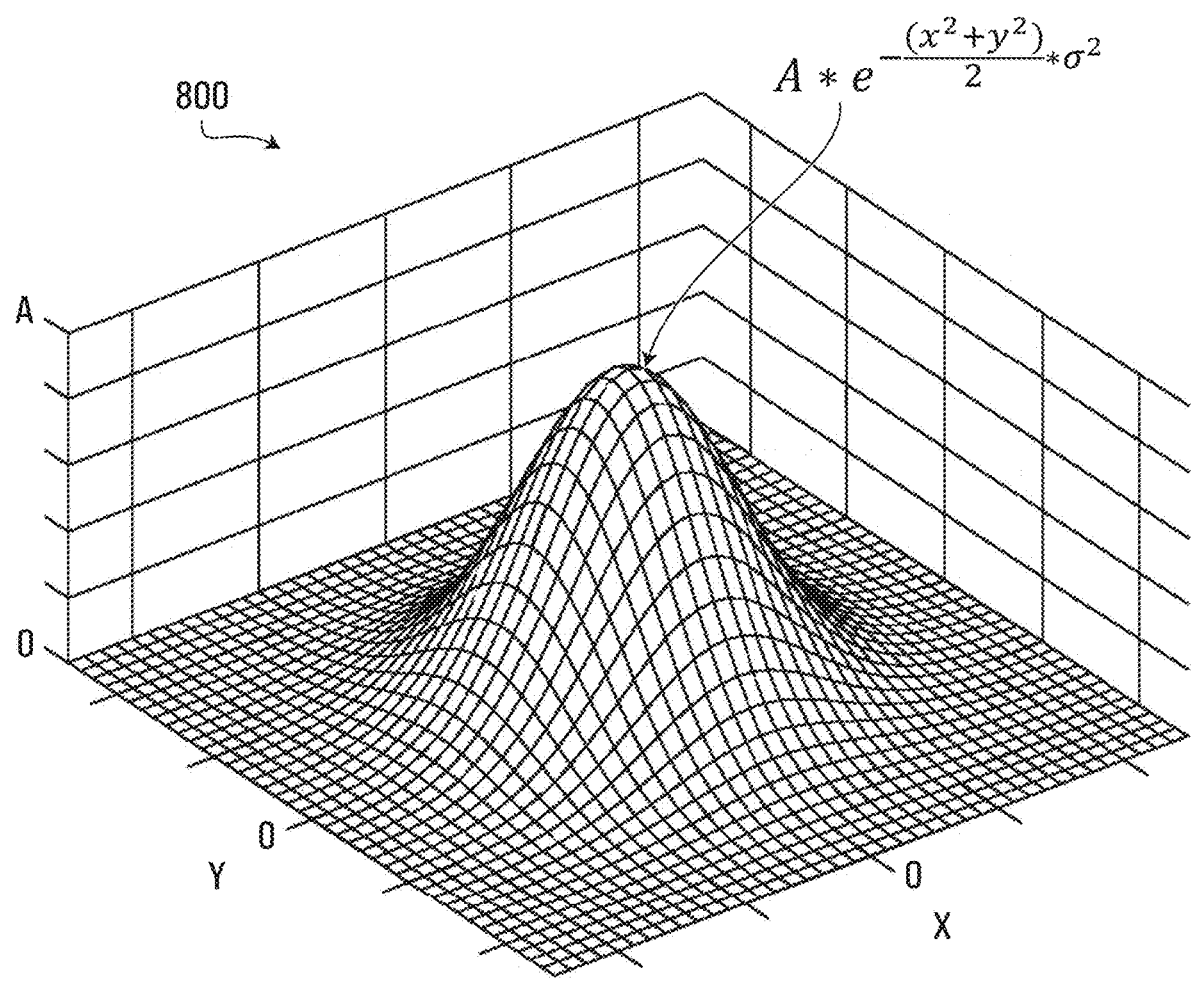
FIG. 7 depicts an example of a Gaussian function that may be used to weight the intensity histogram data based on pixel position in accordance with a specific embodiment.

In some embodiments, the background intensity value for the compressed version of the image may be identified by processing the compressed image data to identify a specific intensity value or a specific range of intensity values common in the compressed image data. For example, the specific intensity value or the specific range of intensity values that is identified may appear more frequently than other intensity values or ranges of intensity values in the compressed image data. In some cases, identifying the specific intensity value or the specific range of intensity values for the compressed version of the image may be based on a weighting of pixels in the compressed version of the image, whereby intensity values for pixels closer to a region of interest (e.g., a center region) of the compressed version of the image are weighted more heavily than intensity values for pixels further from the region of interest. For example, the weighting may be based on a Gaussian function at the center region of the compressed version of the image. FIG. 7 depicts a plot 800 of one non-limiting example of a Gaussian function that may be used to weight the intensity values for pixels closer to a center region of the compressed version of the image more heavily than intensity values for pixels further from the center region. In particular, in this example, the weighting is done in accordance with a Gaussian function of the form:

$$\text{Weight} = A * e^{-\frac{(x^2+y^2)}{2} * \sigma^2} \qquad \text{(equation 3)}$$

where Weight is the weighting value, A is an amplitude scaling factor, x and y are the coordinates of a pixel at position (x,y), and σ is the standard deviation. For example, in one non-limiting embodiment, A=1 and σ=300.

In some embodiments, processing the compressed image data to identify a specific intensity value or a specific range of intensity values common in the compressed image data involves processing the compressed image data to generate a histogram of intensity data for the compressed version of the image (such as the histogram of intensity data depicted in FIG. 6B for the compressed version of the image 710B depicted in FIG. 6A), and determining the background intensity value for the compressed version of the image based on the histogram of intensity data. For example, referring again to FIGS. 6A and 6B, the specific range of intensity values from 30-39 may be identified as being indicative of the background intensity value of the compressed version of the image 710B, because this is the specific range of intensity values that is most common in the compressed version of the image. In this example, the background intensity value for the compressed version of the image 710B may be identified as being 35, as this is generally midway in the specific range from 30-39. Alternatively, a specific intensity value within the identified range may be selected based on how commonly each specific intensity value appears within the specific range. For example, within the most common specific range from 30-39, the specific intensity value of 36 may appear most commonly, and therefore the background intensity value for the compressed version of the image may be identified as being a 36 grayscale intensity value.

In some embodiments, the background intensity value for a compressed version of an image may be determined based on a sampled subset of less than all the pixels in the compressed version of the image. This may yield a result that is similarly accurate to the result that would be achieved by considering every pixel but can significantly reduce the computational overhead.

As discussed earlier, in some cases controlling the automatic exposure setting of the 3D scanner may involve controlling multiple exposure parameters of the imaging modules of the 3D scanner, such as the shutter timing/duration of the camera(s), such as the cameras C1, C2 or 31, 32 and the corresponding projection timing/duration of the light projector unit, such as the projector unit P or 34, and/or the gain of the camera(s). For example, the light projector unit may have a maximum projection time of 2 milliseconds (e.g., to comply with a regulated laser class limit), in which case a system exposure setting of 4 milliseconds may be achieved by setting the cameras' shutter duration and the light projector unit's projection duration to 2 ms and the cameras' gain could be doubled (e.g., from 1.0 to 2.0) to match the desired exposure setting of 4 ms.

In some cases, increasing the gain of the camera(s) can create an oscillation in the automatic system exposure setting. For example, FIGS. 10A and 10B depict examples of images 1100A and 1100B, respectively, that were captured with different exposure settings and the corresponding background intensity values for the two images.

In this example, a white sheet of paper onto which a structured light pattern 1110 was projected was scanned at a distance of 1 meter/39.37 inches, and the system exposure setting was increased from 0.1 milliseconds (ms) for the image 1100A depicted in FIG. 10A to 3 ms for the image 1100B depicted in FIG. 10B. As a result of the increased system exposure, the background intensity value of the image 1100B is higher than that of the image 1100A (an increase from a grayscale value of 20 to a grayscale value of 35). If this new, higher, background intensity value was then directly used as a basis for determining a new system exposure setting, the system would assume the reflectance of the object scanned has changed and may determine a new, lower, value for the system exposure setting. In this scenario, an oscillation in the system exposure setting can occur if the difference between the lower and higher system exposure setting values is too high.

In some embodiments, in order to avoid or at least mitigate the possibility of such an oscillation, the background intensity value determined for the compressed version of an image may be normalized before being used as a basis for determining a new system exposure setting. In particular, the background intensity value determined for the compressed version of an image captured by a camera on the 3D scanner may be normalized to compensate for the exposure setting used when the image data conveying the image was captured. A new automatic exposure setting for the 3D scanner may then be determined based on the normalized background intensity value. In some cases, normalizing the intensity value for the compressed version of the image may be done by subtracting a correction factor from the background intensity value determined for the compressed version of the image. In some embodiments the correction factor may be an increasing function of the value of the exposure setting used when the image data was captured by the camera. For example, in some embodiments the normalized background intensity value may be determined in accordance with an equation of the form:

$$\text{Intensity}_{Normalized} = \text{Intensity} - \sqrt{C * \text{Exposure}} \quad \text{(equation 4)}$$

where $\text{Intensity}_{Normalized}$ is the normalized background intensity value, Intensity is the background intensity value determined based on the compressed image data conveying the compressed version of the image (e.g., determined on the basis of histogram intensity data such as such as the histogram of intensity data depicted in FIG. 6B for the compressed version of the image 710B depicted in FIG. 6A), Exposure is the value, expressed in units of milliseconds, of the automatic exposure setting used when the image data was captured by the camera, and C is a scaling factor. The value for C may be determined experimentally. In one non-limiting example, the value for C is 85. In general, the value for C is implementation specific. For example, a suitable value for a specific 3D scanner may be determined experimentally by placing an object in front of the scanner, incrementally increasing the exposure setting of the scanner and recording the resulting increase in the background intensity value for each increment of the exposure value. This process may then be repeated for multiple different objects at different scanning distances to build a data set, and then a radical function, or some other form of increasing function, may be used to best fit the data.

Figure 11:
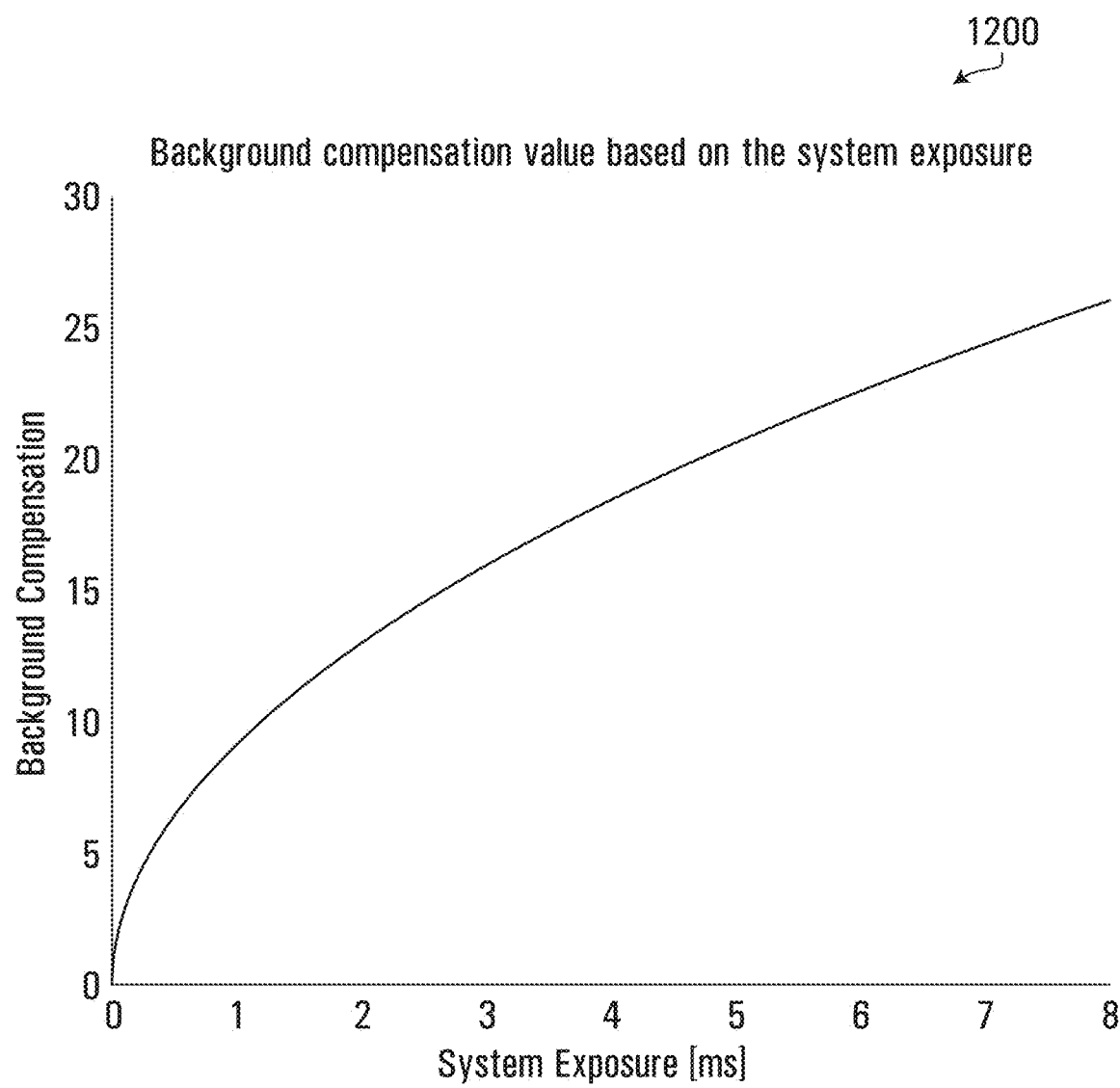
FIG. 11 depicts a non-limiting example of an intensity compensation value as a function of a system exposure value that may be used to normalize the intensity value determined for an image in accordance with a specific embodiment.

FIG. 11 depicts a plot 1200 of an example of an intensity compensation value as a function of a system exposure value that may be used to normalize the intensity value determined for an image in accordance with a specific embodiment. In particular, the intensity compensation value depicted in the plot 1200 corresponds to the non-linear correction factor (i.e., $\sqrt{C*\text{Exposure}}$, where C=85 in this example) of equation 4.

A new value for the system exposure setting may then be determined based on the normalized background intensity value determined for the compressed version of the image (or based on the background intensity value if normalization is not done). In some embodiments, the new value for the system exposure setting may be determined using an exponentially decreasing function of the normalized background intensity value. For example, in a specific embodiment, the new value for the system exposure setting may be determined in accordance with an equation of the form:

$$\text{System Exposure} = \text{System Exposure}(0) \cdot e^{-B \cdot \text{Intensity}_{Normalized}} \quad \text{(equation 5)}$$

where System Exposure is the value of the automatic exposure setting, $\text{Intensity}_{Normalized}$ is the normalized background intensity value, System Exposure(0) is the System Exposure value when $\text{Intensity}_{Normalized}=0$, and B is a scaling factor. The values for System Exposure(0) and B may be determined experimentally. In one non-limiting example, the values for System Exposure(0) and B are 12 and 0.09, respectively. In general, the values for System Exposure(0) and B are implementation specific. For example, suitable values may be determined experimentally by experimenting to determine suitable system exposure values for different types of objects with the 3D scanner and then interpolating a curve based on the experimentally determined values (i.e., using curve fitting techniques).

Figure 12:
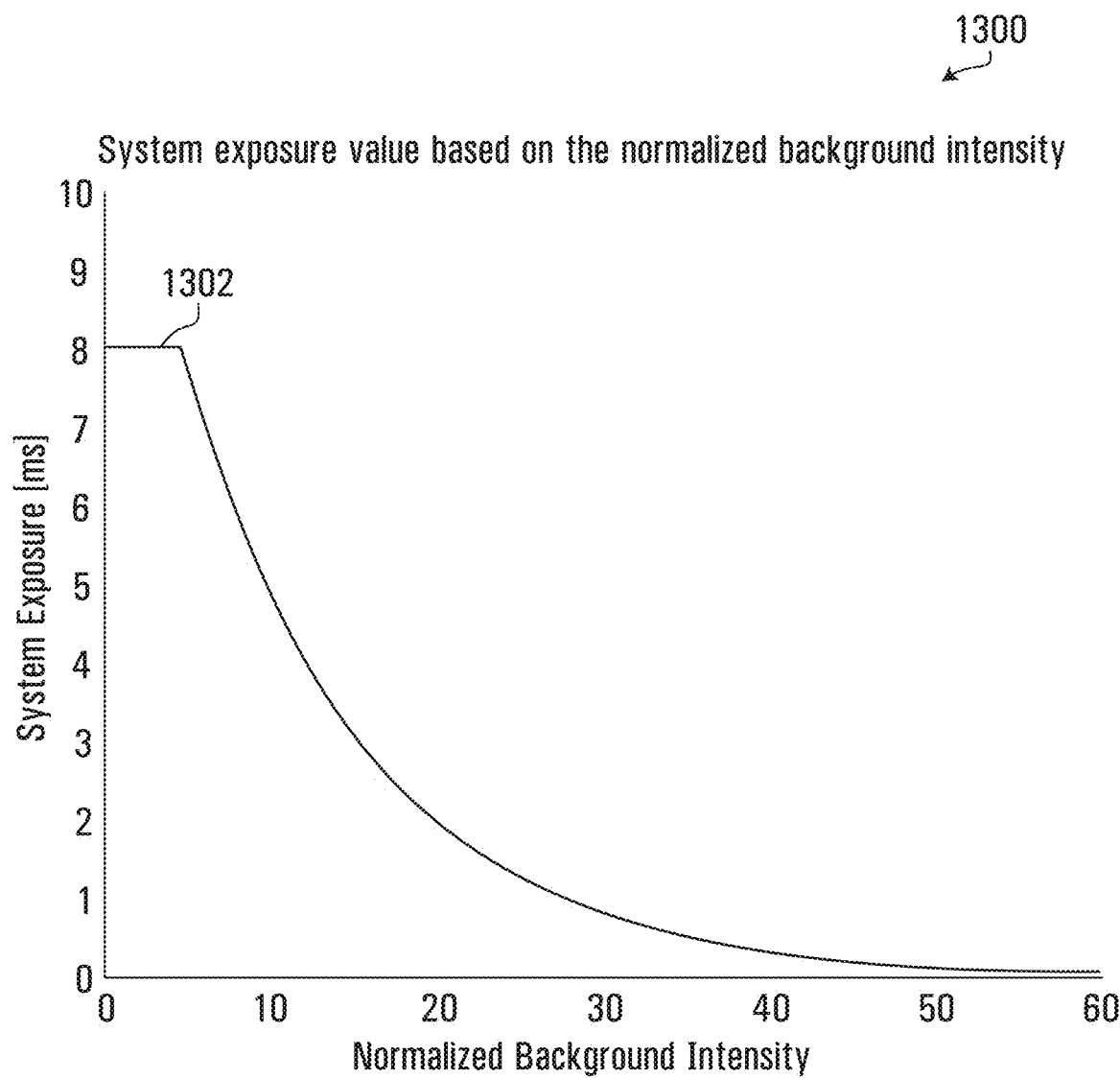
FIG. 12 depicts a non-limiting example of a system exposure value as a function of a normalized background intensity value in accordance with a specific embodiment.

FIG. 12 depicts a plot 1300 of an example of a system exposure value as a function of a normalized background intensity value in accordance with a specific embodiment. In particular, the system exposure setting value depicted in the plot 1300 by curve 1302 corresponds to a system exposure calculated in accordance with equation 5, wherein System Exposure (0)=12 and B=0.09. It is noted that in this non-limiting example the system exposure setting value has been restricted to the range of 0.1 ms to 8 ms, which is why the system exposure setting value remains at 8 ms for intensity values below about 4.5.

Figure 13:
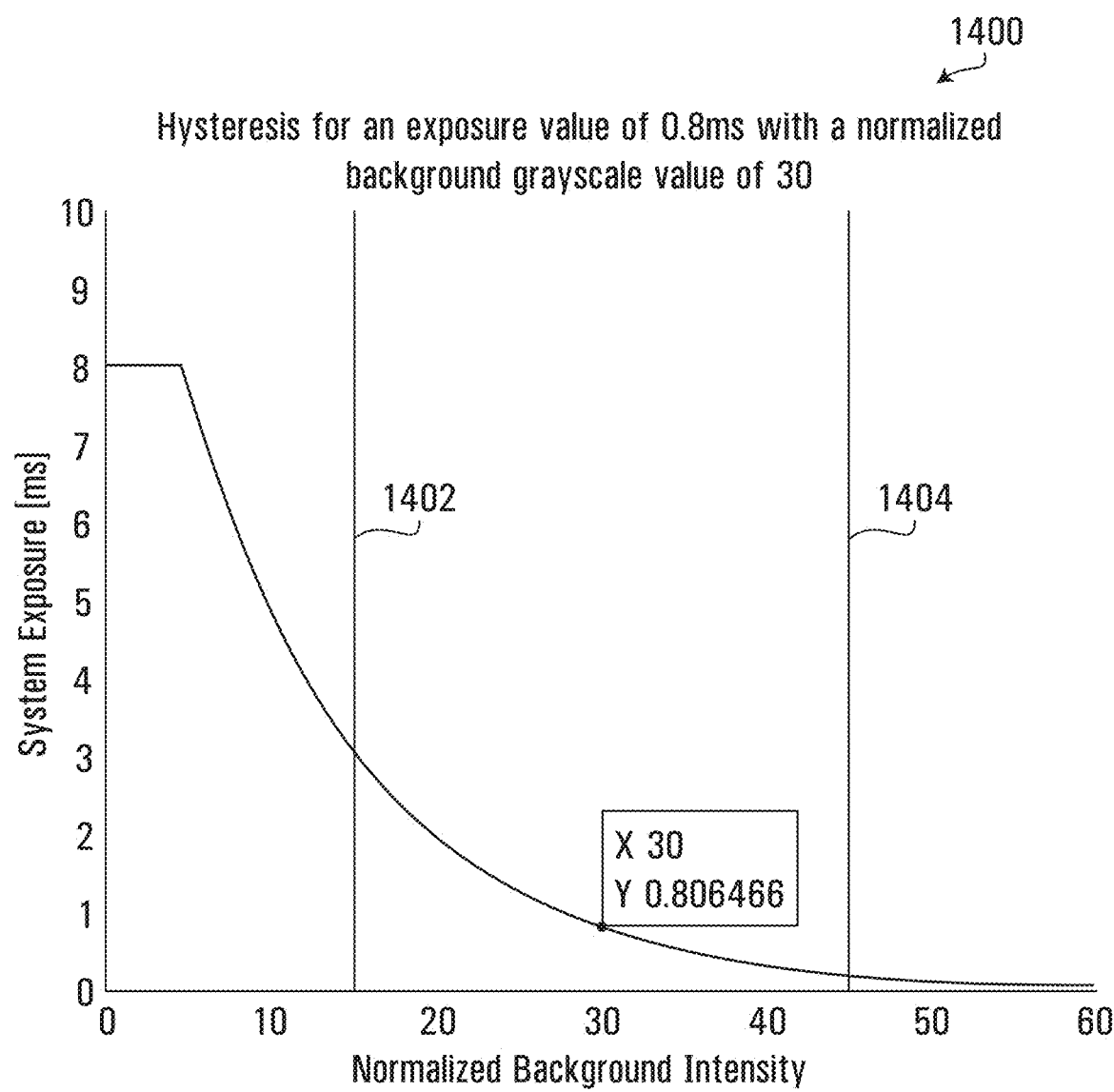
FIG. 13 depicts a non-limiting example of upper and lower thresholds for a current normalized background intensity value, wherein the upper and lower thresholds define a minimum change in the background intensity value to trigger an update to the system exposure value in accordance with a specific embodiment.

Although a new system exposure setting value could potentially be updated for every new image captured by a camera, in practice this is generally unnecessary. In some embodiments, a new system exposure setting value may be updated at a predetermined interval (e.g., based on an elapsed time or based on a number of captured images) and/or in response to an observed change in background intensity value beyond a predetermined threshold. For example, in one non-limiting embodiment the system exposure setting of the 3D scanner may be switched from a current value to a new updated value after a number of images captured using the current system exposure setting value has reached a predetermined threshold value (e.g., after 50 images have been captured using the current system exposure setting value). In addition, or instead, the current system exposure setting value may be switched to a new updated value if the background intensity value determined for a captured image differs by more than a threshold amount from the background intensity value upon which the current system exposure setting value was based. For example, FIG. 13 depicts a plot 1400 of a system exposure value as a function of a normalized background intensity value that includes a lower threshold 1402 and an upper threshold 1404 for a current normalized background intensity value of 30 (corresponding to a current system exposure setting of 0.8 in this example), wherein the lower and upper thresholds 1402, 1404 define a minimum change in the normalized background intensity value to trigger an update to the system exposure setting value in accordance with a specific embodiment. In particular, in this example the lower and upper thresholds 1402, 1404 are set at −15 and +15 grayscale values relative to the current normalized background intensity value. In other embodiments, the threshold values may be less than or greater than +/−15 grayscale. For example, in some embodiments the threshold may be +/−10 grayscale, +/−5 grayscale or even smaller. In other embodiments, the threshold may be at least +/−10 grayscale, e.g., +/−15 grayscale (as depicted in FIG. 13), +/−20 grayscale or even larger.

Figure 14:
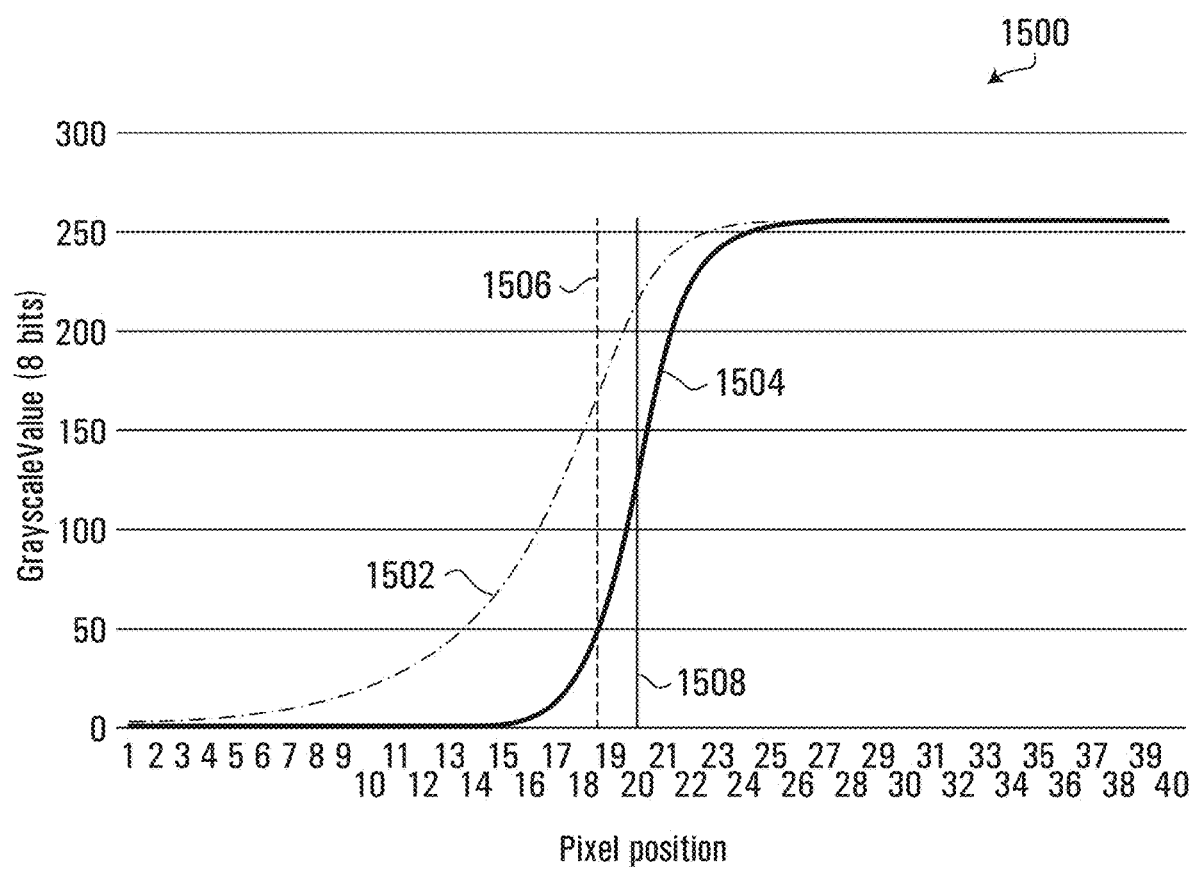
FIG. 14 depicts an example of a difference in the edge position location calculated based on a nonlinearly compressed version of image data representing an edge (a transition from black to white) in an image compared to the edge position location calculated based on a linearly compressed version of the same image data.

As noted earlier, the compressed versions of images generated using a nonlinear conversion in accordance with the present disclosure allows the reflections of the structured light patterns projected onto the surface of the scanned object to be detected at lower intensity levels (in particular at the image edges) than would otherwise be possible with conventional linear image compression. However, the non-linearity introduced in the compressed image data by the nonlinear conversion may introduce errors in some precision measurements that may be made using the compressed image data, and particularly the reflections of the structured light patterns in the compressed versions of the images conveyed in the compressed image data. One such precision measurement relates to the determination of the location of an edge position. For example, FIG. 14 depicts an example of a difference in the edge position location calculated based on a nonlinearly compressed version of image data representing an edge (a transition from black to white) in an image compared to the edge position location calculated based on a linearly compressed version of the same image data. In particular, FIG. 14 depicts a plot 1500 that shows a nonlinearly compressed version of image data 1502 and a linearly compressed version of the image data 1504

In FIG. 14, the nonlinear and linear versions of the compressed image data are indicated at 1502 and 1504, respectively. The location of an edge position for a transition from black to white may be defined as the location at which the maximum gradient/slope of the image intensity values occurs. In this case, if the position of the edge is calculated by determining the position of the maximum gradient value of the linearly compressed image data 1504, the position indicated at 1508 would be correctly identified (the correct position). On the other hand, if the position of the edge is calculated by determining the position of the maximum gradient value of the nonlinearly compressed image data 1502 (which was generated using a nonlinear conversion function of the form provided in equation 2 with gamma=4.0), the position indicated at 1506 would be identified, which is not the correct position.

In order to mitigate this type of error at least partially, the compressed image data may be relinearized to at least partially undo the non-linearity introduced by the non-linear conversion used to compress the image data. The goal of the relinearization is to transform the compressed image data to obtain the image data that would have been obtained through a linear compression of the image data, (e.g., to transform the nonlinearly compressed version of the image data 1502 to obtain the linearly compressed version of the image data 1504 in the example depicted in FIG. 14). For example, if the nonlinearly compressed image data was generated using a gamma function of the form provided in equation 2, then relinearizing the compressed image data may be done using a nonlinear conversion function based on a gamma function of the form:

$$p_n = \left(\frac{p_o}{2^M - 1}\right)^{gamma} * (2^M - 1) \quad \text{(equation 6)}$$

where $p_o$ is an output pixel value with an M-bit resolution, $p_n$ is an input pixel value with an M-bit resolution, wherein the value of gamma matches the value of gamma in the gamma function used to compress the image data.

Relinearizing compressed image data conveying compressed versions of a set of images in this manner generates relinearized compressed image data conveying relinearized compressed versions of the images in the set of images. The relinearized compressed image data conveying the relinearized compressed versions of the images may then be used for the precision measurement, such as determining the maximum intensity/center of the features of the projected pattern (e.g., laser lines) and/or for visual target contour determination. It is noted that these measurements are under/sub-pixel level precision measurements based on the relinearized compressed image data conveying the relinearized compressed versions of the 2D images captured by the camera(s) of the 3D scanner.

Method

Figure 15:
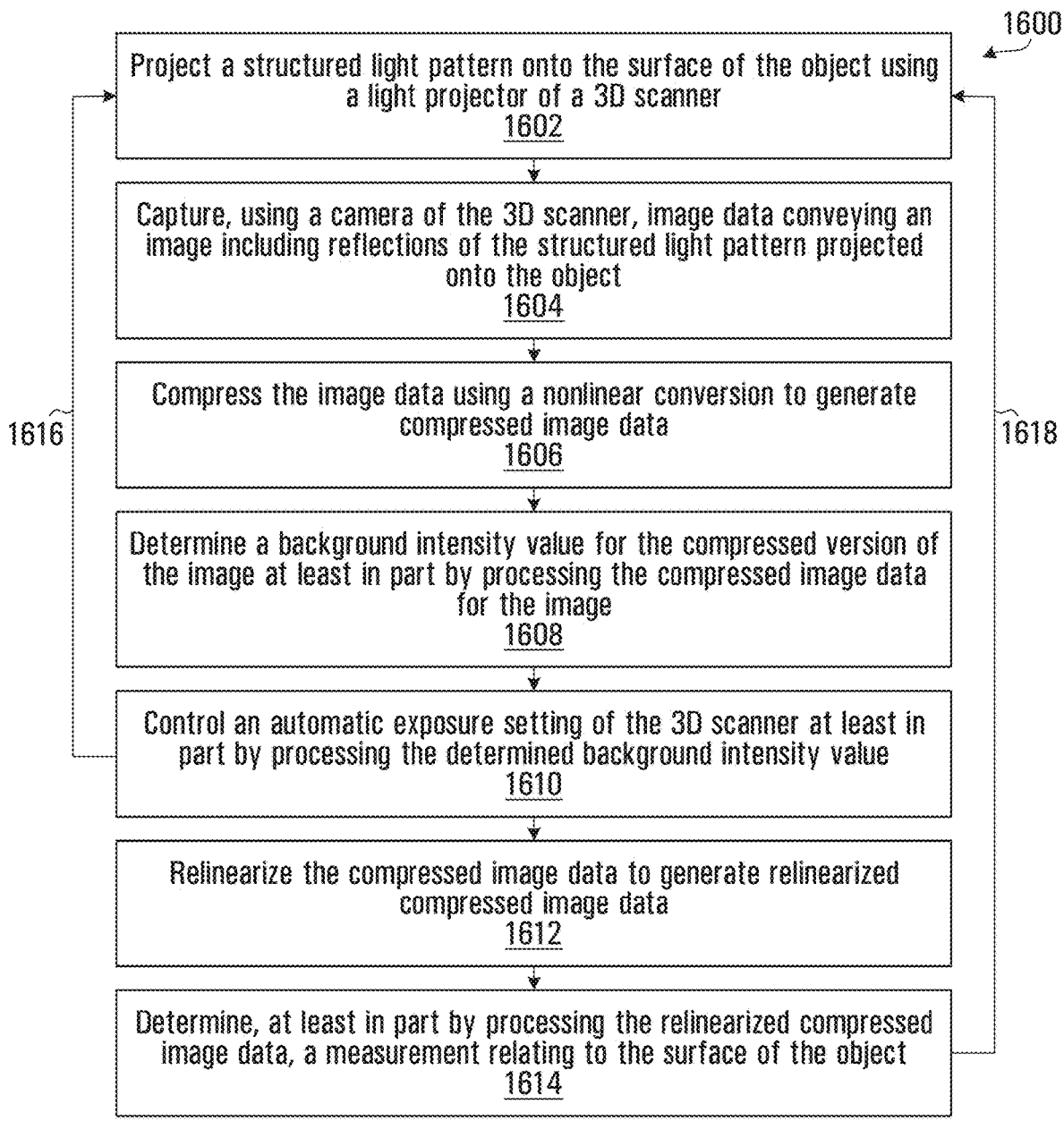
FIG. 15 is a flowchart of an example method the 3D measurement of a surface of an object in accordance with a specific embodiment.

FIG. 15 is a flowchart of an example method 1600 for the 3D measurement of a surface of an object in accordance with a specific embodiment. At step 1602, a structured light pattern is projected onto the surface of the object using a light projected of a 3D scanner. Image data conveying an image, including reflections of the structured light pattern projected onto the object, is captured using a camera of the 3D scanner, at step 1604. The image data conveying the image is compressed using a nonlinear conversion to generate compressed image data conveying a compressed version of the image, at step 1606. A background intensity value for the compressed version of the image is determined at step 1608. The determination is done at least in part by processing the compressed image data conveying the compressed version of the image. At step 1610, an automatic exposure setting of the 3D scanner is controlled at least in part by processing the determined background intensity value for the compressed version of the image. In some embodiments, the method 1600 may then return to step 1602, as indicated at 1616, in order to repeat steps 1602 to 1610, e.g., as part of a real time acquisition scanning process while the 3D scanner is moved over the object being scanned. In other embodiments, the method 1600 may further include a relinearizing step 1612, in which the compressed image data conveying the compressed version of the image is relinearized by at least partially undoing the nonlinearity that was introduced by the nonlinear compression in step 1606, to generate relinearized compressed image data convey a relinearized compressed version of the image. In some embodiments, after the relinearizing step 1612, a measurement relating to the surface of the object may be determined, at least in part by processing the relinearized compressed image data, at step 1614. In such embodiments, the method 1600 may then return to step 1602, as indicated at 1618, in order to repeat steps 1602 to 1614, e.g., as part of a process to reconstruct a surface of the scanned object.

It should be apparent to the person skilled in the art that some of the steps in FIG. 15 may be performed in a different order than depicted here. For example, steps 1612 and 1614 may be performed before or in parallel with step 1608 and/or step 1610.

Hardware

Figure 16:
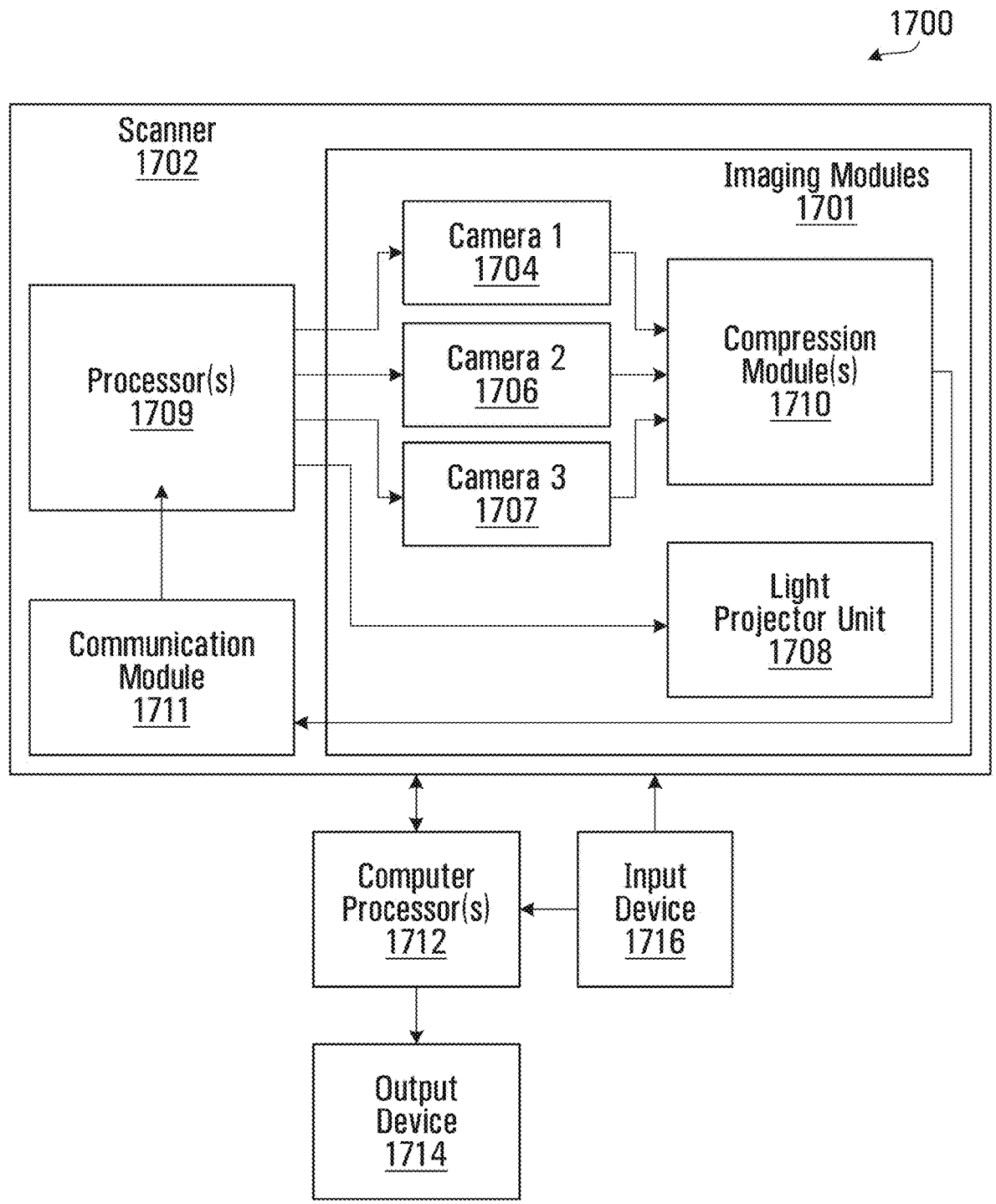
FIG. 16 is a block diagram of a system for generating 3D data relating to a surface of a target object in accordance with a specific embodiment.

FIG. 16 is a block diagram of a system 1700 for generating 3D data relating to a surface of a target object in accordance with a specific embodiment. The system includes a scanner 1702 that includes a set of imaging modules 1701. The set of imaging modules 1701 includes a first camera 1704 and a second camera 1706 as well as a light projector unit 988 including at least one light projector capable of projecting light that could be laser, white or infrared, and at least one image data compression module 1710. In some embodiments the set of imaging module 1701 may include additional cameras, such as a third camera 1707. In some embodiments, the set of imaging modules 1701 may include even a greater number of cameras (not shown). The first camera 1704 and the second camera 1706 may be monochrome geometry cameras as described earlier. The third camera 1707, if present, may be a color camera for capturing color image data conveying color and/or texture information about the surface of a scanned object. The at least one image data compression module 1710 is in electronic communication with each of the cameras 1704, 1706, 1707. The at least one image data compression module 1710 is configured for compressing image data conveying the images captured by each camera using a non-linear conversion to generate compressed image data conveying compressed versions of the images. In accordance with the previous discussed embodiments, the non-linear conversion may be done such that lower intensity values are amplified and saturation of higher intensity values is limited in the compressed image data. In some embodiments, the functionality of the compression module(s) 1710 may be implemented using a look-up table (LUT). The scanner 1702 further includes a processor 1709 or some other form of controller in electronic communication with the cameras 1704, 1706, 1707 and the light projector unit 1708, may be used to synchronize the images captured by the cameras in a single frame. The scanner 1702 further includes a communication module 1711 in electronic communication with the processor(s) 1709 and the set of imaging modules 1701 (e.g., directly and/or through the processor(s) 1709). In some embodiments, the communication module 1711 is configured for transmitting the compressed image data conveying compressed versions of images captured by the cameras to external devices for processing.

The scanner 1702 is in communication with at least one computer processor 1712 (e.g., the computer processor 160 of FIG. 1B) for implementing the processing steps to control an automatic exposure setting of at least a subset of the imaging modules of the scanner 1702 based on the compressed image data received from the scanner 1702 and/or for implementing the processing steps determine measurements relating to the surface of the object based on the compressed image data, as described herein. The at least one computer processor 1712 is in electronic communication with an output device 1714 to output data conveying measurement related to a reconstructed surface for a scanned object, such as matched points and/or any additional or intermediary outputs. As will be readily understood, it may be necessary to input data for use by the processor(s) 1712 and/or the sensor 1702. Input device(s) 1716 can be provided for this purpose.

In other embodiments, at least some of the image data processing steps to control the automatic exposure setting and/or to determine measurements relating to the surface of the object may be done on the scanner 1702, e.g., by the processor(s) 1709. For example, in some embodiments, the processor(s) 1709 may be configured to perform at least part of the processing associated with processing the compressed image data to determine a background intensity value for the compressed version of an image conveyed in the compressed image data and/or to perform at least part of the processing associated with controlling an automatic exposure setting of at least a subset of the set of imaging modules at least in part by processing the determined background intensity value.

Figure 17:
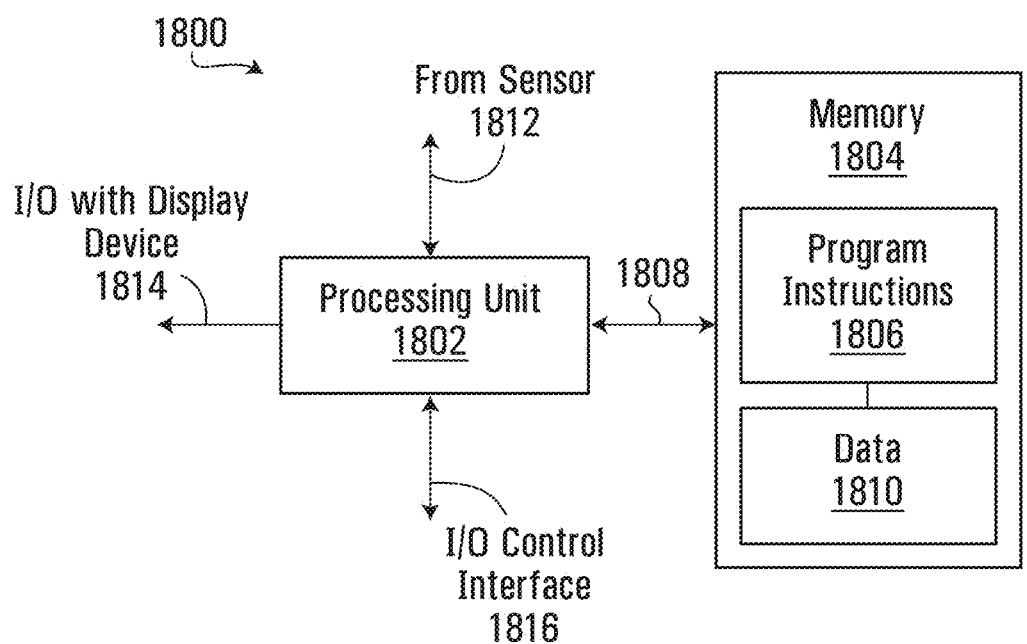
FIG. 17 is a block diagram showing components of a processing module in accordance with a specific example of implementation.

FIG. 17 is a block diagram showing components of a processing module in accordance with a specific example of implementation. In a non-limiting example, some or all the functionality of the computer processor 1702 (e.g., the computer processor 160 of FIG. 1B) and/or some or all the functionality of the computer processor(s) may be implemented on a suitable microprocessor 1800 of the type depicted in FIG. 18. Such a microprocessor 1800 typically includes a processing unit 1802 and a memory 1804 that is connected by a communication bus 1808. The memory 1804 includes program instructions 1806 and data 1810. The processing unit 1802 is adapted to process the data 1810 and the program instructions 1806 in order to implement the functionality described and depicted in the drawings with reference to the 3D imaging system. The processor 1800 may also comprise one or more I/O interfaces for receiving or sending data elements to external modules. In particular, the processor 1800 may comprise an I/O interface 1812 with the sensor (the camera), an I/O interface 1814 for exchanging signals with an output device (such as a display device) and an I/O interface 1816 for exchanging signals with a control interface (not shown). The output device and the control interface may be shown on the same interface.

As will be readily understood, although the method described herein is carried out with two images thereby forming triplet combinations, in alternative implementations more than two images could be acquired per frame using addition cameras positioned at additional different known viewpoints (such as 1 camera, 2 cameras, 3 cameras, 4 cameras or even more) and the combinations could contain more than three elements. Alternatively or additionally, if more than two images are acquired per frame, the triplet combinations for two of these images could be used to match the points and the additional image(s) could be used to validate the match.

Those skilled in the art should appreciate that in some non-limiting embodiments, all or part of the functionality previously described herein with respect to the processing system of the system for displaying indications of uncertainty as described throughout this specification, may be implemented using pre-programmed hardware or firmware elements (e.g., microprocessors, FPGAs, application specific integrated circuits (ASICs), electrically erasable programmable read-only memories (EEPROMs), etc.), or other related components.

In other non-limiting embodiments, all or part of the functionality previously described herein with respect to a computer processor 160 of the set of imaging modules 100 of the scanner 10 may be implemented as software consisting of a series of program instructions for execution by one or more computing units. The series of program instructions can be tangibly stored on one or more tangible computer readable storage media, or the instructions can be tangibly stored remotely but transmittable to the one or more computing unit via a modem or other interface device (e.g., a communications adapter) connected to a computer network over a transmission medium. The transmission medium may be either a tangible medium (e.g., optical or analog communications lines) or a medium implemented using wireless techniques (e.g., microwave, infrared or other transmission schemes).

The methods described above for generating 3D data relating to a surface of a target object, may be implemented, for example, in hardware, software tangibly stored on a computer-readable medium, firmware, or any combination thereof. For example, the techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices, such as a display screen.

Those skilled in the art should further appreciate that the program instructions may be written in a number of suitable programming languages for use with many computer architectures or operating systems.

Example Embodiments

The following provides a non-limiting list of additional Example Embodiments of the present disclosure:

Example Embodiment 1. A method for the three-dimensional (3D) measurement of a surface of an object, the method comprising:
- projecting a structured light pattern onto the surface of the object using a light projector of a 3D scanner;
- capturing image data using a camera of the 3D scanner, the image data conveying an image including reflections of the structured light pattern projected onto the surface of the object;
- compressing the image data conveying the image using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
- determining a background intensity value for the compressed version of the image at least in part by processing the compressed image data for the image; and
- controlling an automatic exposure setting of the 3D scanner at least in part by processing the determined background intensity value.

Example Embodiment 2. A method according to Example Embodiment 1, wherein determining the background intensity value for the compressed version of the image comprises:
- processing the compressed image data to identify a specific intensity value or a specific range of intensity values common in the compressed image data.

Example Embodiment 3. A method according to Example Embodiment 2, wherein the specific intensity value or the specific range of intensity values appear more frequently than other intensity values or ranges of intensity values in the compressed image data.

Example Embodiment 4. A method according to Example Embodiment 2, wherein identifying the specific intensity value or the specific range of intensity values is based on a weighting of pixels in the compressed version of the image, whereby intensity values for pixels closer to a center region of the compressed version of the image are weighted more heavily than intensity values for pixels further from the center region of the compressed version of the image.

Example Embodiment 5. A method according to Example Embodiment 1, wherein determining a background intensity value for the compressed version of the image comprises:
- processing the compressed image data to generate a histogram of intensity data for the compressed version of the image; and
- determining the background intensity value for the compressed version of the image based on the histogram of intensity data for the compressed version of the image.

Example Embodiment 6. A method according to Example Embodiment 5, wherein processing the compressed image data to generate a histogram of intensity data for the compressed version of the image comprises weighting the histogram based on pixel position within the compressed version of the image, wherein pixels closer to a region of interest in the compressed version of the image are weighted more heavily than pixels further from the region of interest.

Example Embodiment 7. A method according to Example Embodiment 6, wherein the region of interest is a center region of the compressed version of the image.

Example Embodiment 8. A method according to Example Embodiment 7, wherein weighting the histogram based on pixel position within the compressed version of the image comprises weighting the histogram according to a Gaussian function at the center region of the compressed version of the image.

Example Embodiment 9. A method according to any one of Example Embodiments 5 to 8, wherein processing the compressed image data to generate a histogram of intensity data for the compressed version of the image comprises:
- sampling a subset of less than all pixels within the compressed version of the image; and
- generating the histogram of intensity data for the compressed version of the image at least in part by processing the compressed image data for the sampled subset of pixels in the compressed version of the image.

Example Embodiment 10. A method according to any one of Example Embodiments 5 to 8, wherein determining the background intensity value for the compressed version of the image based on the histogram of intensity data comprises identifying the background intensity value for the compressed version of the image as being an intensity value corresponding to a range of intensity values that appears more frequently than another range of intensity values identified in the histogram of intensity data.

Example Embodiment 11. A method according to any one of Example Embodiments 1 to 10, wherein controlling an automatic exposure setting of the 3D scanner at least in part by processing the determined background intensity value comprises:
- normalizing the background intensity value to compensate for the exposure setting used when the image data conveying the image was captured by the camera; and
- controlling the automatic exposure setting of the 3D scanner based on the normalized background intensity value.

Example Embodiment 12. A method according to Example Embodiment 11, wherein normalizing the background intensity value comprises:
- determining the normalized background intensity value for the compressed version of the image at least in part by processing: 1) the determined background intensity value; and 2) a value of the automatic exposure setting used when the image data was captured by the camera.

Example Embodiment 13. A method according to Example Embodiment 12, wherein determining the normalized background intensity value for the compressed version of the image comprises subtracting a correction factor from the determined background intensity value, wherein the correction factor is an increasing function of the value of the automatic exposure setting used when the image data was captured by the camera.

Example Embodiment 14. A method according to Example Embodiment 13 when dependent on Example Embodiment 5, wherein the normalized background intensity value is determined in accordance with:

$$\text{Intensity}_{Normalized} = \text{Intensity}_{Histogram} - \sqrt{C * \text{Exposure}}$$

where $\text{Intensity}_{Normalized}$ is the normalized background intensity value, $\text{Intensity}_{Histogram}$ is the background intensity value determined based on the histogram of intensity data, Exposure is the value, expressed in units of milliseconds, of the exposure setting used when the image data was captured by the camera, and C is a scaling factor.

Example Embodiment 15. A method according to any one of Example Embodiments 12 to 14, wherein the value of the exposure setting used when the image data was captured by the camera is a first value, and wherein controlling the automatic exposure setting of the 3D scanner at least in part by processing the normalized background intensity value comprises determining a second value for the automatic exposure setting for the camera based on the normalized background intensity value.

Example Embodiment 16. A method according to Example Embodiment 15, wherein controlling the automatic exposure setting of the 3D scanner based on the normalized background intensity value further comprises:
switching the automatic exposure setting of the 3D scanner to the second value after a number of images captured by the camera using the first value for the automatic exposure setting has reached a predetermined threshold value.

Example Embodiment 17. A method according to Example Embodiment 15, wherein controlling the automatic exposure setting of the 3D scanner based on the normalized background intensity value further comprises:
determining whether the second value for the automatic exposure setting differs from the first value for the automatic exposure setting by more than a predetermined amount; and
switching the automatic exposure setting of the 3D scanner to the second value after determining that the second value for the automatic exposure setting differs from the first value for the automatic exposure setting by more than the predetermined amount.

Example Embodiment 18. A method according to Example Embodiment 17, wherein the predetermined amount corresponds to a change of at least +/−10 grayscale in the determined background intensity value.

Example Embodiment 19. A method according to any one of Example Embodiments 15 to 18, wherein determining a second value for the automatic exposure setting based on the normalized background intensity value comprises determining the second value using an exponentially decreasing function of the normalized background intensity value.

Example Embodiment 20. A method according to Example Embodiment 19, wherein determining the second value using an exponentially decreasing function of the normalized background intensity value comprises determining the second value in accordance with:

$$\text{System Exposure} = \text{System Exposure}(0) \cdot e^{-B \cdot \text{intensity}_{Normalized}}$$

where System Exposure is the value of the automatic exposure setting of the 3D scanner, $\text{Intensity}_{Normalized}$ is the normalized background intensity value, System Exposure(0) is the System Exposure value when $\text{Intensity}_{Normalized}=0$, and B is a scaling factor.

Example Embodiment 21. A method according to any one of Example Embodiments 12 to 20, wherein the value of the automatic exposure setting of the 3D scanner is a function of at least one of shutter timing of the camera, a projection timing of the light projector and a gain of an imaging sensor of the camera, wherein controlling the automatic exposure setting of the 3D scanner comprises:
controlling at least one of: the shutter timing of the camera; the gain of the imaging sensor of the camera; or the projection timing of the light projector.

Example Embodiment 22. A method according to any one of Example Embodiments 1 to 21, wherein the camera is a first camera of the 3D scanner, wherein the 3D scanner comprises one or more other cameras for capturing images of the object, the method further comprising:
controlling an automatic exposure setting of at least one of the one or more other cameras of the 3D scanner at least in part by processing the determined background intensity value that was determined at least in part by processing the compressed image data conveying the compressed version of the image captured by the first camera of the 3D scanner.

Example Embodiment 23. A method according to any one of Example Embodiments 1 to 22, further comprising:
detecting at least one feature of the structured light pattern projected onto the surface of the object at least in part by processing the compressed image data conveying the compressed version of the image, including a compressed version of the reflections of the structured light pattern projected onto the surface of the object, wherein lower intensity values are amplified and saturation of higher intensity values is limited in the compressed version of the reflections of the structured light pattern included in the compressed version of the image.

Example Embodiment 24. A method according to any one of Example Embodiments 1 to 23, further comprising:
relinearizing the compressed image data, by at least partially undoing the nonlinearity introduced by the nonlinear conversion used to compress the image data, to generate relinearized compressed image data conveying a relinearized compressed version of the image; and
determining, at least in part by processing the relinearized compressed image data, a measurement relating to the surface of the object.

Example Embodiment 25. A method according to Example Embodiment 24, wherein determining the measurement relating to the surface of the object at least in part by processing the relinearized compressed image data comprises determining the measurement relating to the surface of the object based on a relinearized compressed version of the reflections of the structured light pattern conveyed in the relinearized compressed version of the image.

Example Embodiment 26. A method according to Example Embodiment 24 or Example Embodiment 25, wherein determining the measurement relating to the surface of the object comprises at least one of:

determining, at least in part by processing the relinearized compressed image data, a location of maximum intensity of at least one feature of the structured light pattern projected onto the surface of the object; or determining, at least in part by processing the relinearized compressed image data, a contour of at least one visual target disposed on the surface of the object.

Example Embodiment 27. A method according to Example Embodiment 26 when dependent on Example Embodiment 23, wherein determining the measurement relating to the surface of the object comprises:

determining, at least in part by processing the relinearized compressed image data, a location of maximum intensity of the at least one of the features of the structured light pattern that was detected at least in part by processing the compressed image data.

Example Embodiment 28. A method according to Example Embodiment 23 or Example Embodiment 27, further comprising:

detecting, at least in part by processing the compressed image data, at least one visual target disposed on the surface of the object.

Example Embodiment 29. A method according to Example Embodiment 28, wherein determining the measurement relating to the surface of the object further comprises:

determining, at least in part by processing the relinearized compressed image data, a contour of the at least one visual target that was detected at least in part by processing the compressed image data.

Example Embodiment 30. A method according to any one of Example Embodiments 1 to 29, wherein:

the image data conveying the image comprises N-bit resolution image data captured by the camera of the 3D scanner;

the compressed image data conveying the compressed version of the image comprises M-bit resolution image data; and compressing the image data to generate the compressed image data comprises compressing the N-bit resolution image data using a nonlinear N-bit-to-M-bit resolution conversion to generate the M-bit resolution image data, wherein M is less than N.

Example Embodiment 31. A method according to Example Embodiment 30, wherein N=12 and M=8.

Example Embodiment 32. A method according to any one of Example Embodiments 1 to 31, wherein the nonlinear conversion is based on a nonlinear conversion function that amplifies lower intensity values and limits saturation of higher intensity values in the compressed image data.

Example Embodiment 33. A method according to Example Embodiment 32, wherein compressing the image data conveying the image comprises compressing the image data using a look-up table stored on the 3D scanner, the look-up table being configured to implement the nonlinear conversion function.

Example Embodiment 34. A method according to Example Embodiment 32 or Example Embodiment 33, wherein the nonlinear conversion function is based on a gamma function in which the value of gamma is greater than one.

Example Embodiment 35. A method according to Example Embodiment 34 when dependent on Example Embodiment 30, wherein the gamma function is of the form:

$$p_o = \left(\frac{p_i}{2^N - 1}\right)^{1/gamma} * (2^M - 1)$$

where $p_o$ is an output pixel value with an M-bit resolution, $p_i$ is an input pixel value with an N-bit resolution; and gamma >1.

Example Embodiment 36. A method according to Example Embodiment 32 or Example Embodiment 33, wherein the nonlinear conversion function is based on a piecewise linear function, wherein a slope of a linear portion of the piecewise linear function for conversion of lower intensity values is greater than a slope of a linear portion of the piecewise linear function for conversion of higher intensity values.

Example Embodiment 37. A method according to Example Embodiment 30 when dependent on Example Embodiment 24, wherein relinearizing the compressed image data is done using a nonlinear M-bit to M-bit conversion function configured to relinearize the M-bit resolution image data by at least partially undoing the nonlinearization introduced by the nonlinear conversion used to compress the image data.

Example Embodiment 38. A method according to Example Embodiment 35 when dependent on Example Embodiment 24, wherein relinearizing the compressed image data is done using a nonlinear conversion function based on a gamma function of the form:

$$p_n = \left(\frac{p_o}{2^M - 1}\right)^{gamma} * (2^M - 1)$$

where $p_o$ is an output pixel value with an M-bit resolution, $p_n$ is an input pixel value with an M-bit resolution; and gamma >1, wherein a value of gamma matches a value of gamma in the gamma function used to compress the image data.

Example Embodiment 39. A method according to any of Example Embodiments 1 to 38, wherein:

the 3D scanner is portable; and projecting the structured light pattern onto the surface of the object and capturing image data including reflections of the structured light pattern projected onto the surface of the object are done in real-time as the 3D scanner is moved over the surface of the object.

Example Embodiment 40. A scanning system for the three-dimensional (3D) measurement of a surface of an object, the scanning system comprising:

a. a 3D scanner having
  i. a scanner frame on which is mounted a set of imaging modules including:
   1) a light projector unit for projecting a structured light pattern onto the surface of the object;
   2) a set of least one camera positioned alongside the light projector unit for capturing image data conveying a set of images including reflections of the structured light pattern projected onto the surface of the object;
   3) at least one image data compression module in communication with the set of at least one camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;

ii. a communication module in communication with the set of imaging modules, said communication module being configured for transmitting the compressed image data conveying the compressed versions of the images in the set of images to external devices for processing; and b. a computing system in communication with said 3D scanner, the computing system being configured for:

i. receiving the compressed image data conveying the compressed versions of the images in the set of images including the reflections of the structured light pattern;

ii. extracting, from the compressed image data conveying the compressed versions of the images in the set of images, the compressed image data conveying a compressed version of a first image from a first camera of the set of at least one camera of the 3D scanner;

iii. determining a background intensity value for the compressed version of the first image at least in part by processing the compressed image data conveying the compressed version of the first image; and iv. controlling an automatic exposure setting of at least a subset of the set of imaging modules of the 3D scanner at least in part by processing the determined background intensity value.

Example Embodiment 41. A system according to Example Embodiment 40, wherein determining the background intensity value for the compressed version of the first image comprises:

processing the compressed image data to identify a specific intensity value or a specific range of intensity values common in the compressed image data conveying the compressed version of the first image.

Example Embodiment 42. A system according to Example Embodiment 41, wherein the specific intensity value or the specific range of intensity values appear more frequently than other intensity values or ranges of intensity values in the compressed image data conveying the compressed version of the first image.

Example Embodiment 43. A system according to Example Embodiment 41, wherein identifying the specific intensity value or the specific range of intensity values is based on a weighting of pixels in the compressed version of the first image, whereby intensity values for pixels closer to a center region of the compressed version of the first image are weighted more heavily than intensity values for pixels further from the center region of the compressed version of the first image.

Example Embodiment 44. A system according to Example Embodiment 40, wherein determining a background intensity value for the compressed version of the first image comprises:

processing the compressed image data conveying the compressed version of the first image to generate a histogram of intensity data for the compressed version of the first image; and determining the background intensity value for the compressed version of the first image based on the histogram of intensity data for the compressed version of the first image.

Example Embodiment 45. A system according to Example Embodiment 44, wherein processing the compressed image data conveying the compressed version of the first image to generate a histogram of intensity data for the compressed version of the first image comprises weighting the histogram based on pixel position within the compressed version of the first image, wherein pixels closer to a region of interest in the compressed version of the image are weighted more heavily than pixels further from the region of interest.

Example Embodiment 46. A system according to Example Embodiment 45, wherein the region of interest is a center region of the compressed version of the first image.

Example Embodiment 47. A system according to Example Embodiment 46, wherein weighting the histogram based on pixel position within the compressed version of the first image comprises weighting the histogram according to a Gaussian function at the center region of the compressed version of the first image.

Example Embodiment 48. A system according to any one of Example Embodiments 44 to 47, wherein processing the compressed image data to generate a histogram of intensity data for the compressed version of the first image comprises:

sampling a subset of less than all pixels within the compressed version of the first image; and generating the histogram of intensity data for the compressed version of the first image at least in part by processing the compressed image data for the sampled subset of pixels in the compressed version of the first image.

Example Embodiment 49. A system according to any one of Example Embodiments 44 to 47, wherein determining the background intensity value for the compressed version of the image based on the histogram of intensity data comprises identifying the background intensity value for the compressed version of the image as being an intensity value corresponding to a range of intensity values that appears more frequently than another range of intensity values identified in the histogram of intensity data.

Example Embodiment 50. A system according to any one of Example Embodiments 40 to 49, wherein controlling an automatic exposure setting of at least a subset of the set of imaging modules of the 3D scanner at least in part by processing the determined background intensity value comprises:

normalizing the determined background intensity value to compensate for the exposure setting used when the image data conveying the first image was captured by the first camera; and controlling the automatic exposure setting of at least the subset of imaging modules at least in part by processing the normalized background intensity value.

Example Embodiment 51. A system according to Example Embodiment 50, wherein normalizing the determined background intensity value comprises:

determining the normalized background intensity value for the compressed version of the first image at least in part by processing: 1) the determined background intensity value; and 2) a value of the exposure setting used when the image data conveying the first image was captured by the first camera.

Example Embodiment 52. A system according to Example Embodiment 51, wherein determining the normalized background intensity value for the compressed version of the first image comprises subtracting a correction factor from the determined background intensity value, wherein the correction factor is an increasing function of the value of the exposure setting used when the image data conveying the first image was captured by the first camera.

Example Embodiment 53. A system according to Example Embodiment 52 when dependent on Example Embodiment 44, wherein the normalized background intensity value is determined in accordance with:

$$\text{Intensity}_{Normalized} = \text{Inensity}_{Histogram} - \sqrt{C * \text{Exposure}}$$

where $\text{Intensity}_{Normalized}$ is the normalized background intensity value, $\text{Intensity}_{Histogram}$ is the background intensity value determined based on the histogram of intensity data, Exposure is the value, expressed in units of milliseconds, of the exposure setting used when the image data conveying the first image was captured by the first camera, and C is a scaling factor.

Example Embodiment 54. A system according to any one of Example Embodiments 51 to 53, wherein the value of the exposure setting used when the image data conveying the first image was captured by the first camera is a first value, and wherein controlling the automatic exposure setting of at least the subset of imaging modules of the 3D scanner at least in party by processing the normalized background intensity value comprises determining a second value for the automatic exposure setting for at least the subset of the imaging modules based on the normalized background intensity value.

Example Embodiment 55. A system according to Example Embodiment 54, wherein controlling the automatic exposure setting of at least the subset of imaging modules of the 3D scanner at least in party by processing the normalized background intensity value further comprises:
switching the automatic exposure setting of at least the subset of imaging modules to the second value after a number of images captured using the first value for the automatic exposure setting has reached a predetermined threshold value.

Example Embodiment 56. A system according to Example Embodiment 54, wherein controlling the automatic exposure setting of at least the subset of imaging modules of the 3D scanner at least in party by processing the normalized background intensity value further comprises:
determining whether the second value for the automatic exposure setting differs from the first value for the automatic exposure setting by more than a predetermined amount; and
switching the automatic exposure setting of at least the subset of imaging modules to the second value after determining that the second value for the automatic exposure setting differs from the first value for the automatic exposure setting by more than the predetermined amount.

Example Embodiment 57. A system according to Example Embodiment 56, wherein the predetermined amount corresponds to a change of at least +/−10 grayscale in the determined background intensity value.

Example Embodiment 58. A system according to any one of Example Embodiments 54 to 57, wherein determining a second value for the automatic exposure setting for at least the subset of the imaging modules based on the normalized background intensity value comprises determining the second value using an exponentially decreasing function of the normalized background intensity value.

Example Embodiment 59. A system according to Example Embodiment 58, wherein determining the second value using an exponentially decreasing function of the normalized background intensity value comprises determining the second value in accordance with:

$$\text{System Exposure} = \text{System Exposure}(0) \cdot e^{-B \cdot \text{intensity}_{Normalized}}$$

where System Exposure is the value of the automatic exposure setting of at least the subset of imaging modules, $\text{Intensity}_{Normalized}$ is the normalized background intensity value, System Exposure(0) is the System Exposure value when $\text{Intensity}_{Normalized}=0$, and B are scaling factors.

Example Embodiment 60. A system according to any one of Example Embodiments 51 to 59, wherein the value of the automatic exposure setting is a function of at least one of shutter timing of the first camera, a matching projector timing of the light projector unit and a gain of an imaging sensor of the first camera, wherein controlling the automatic exposure setting of at least the subset of imaging modules of the 3D scanner comprises:
controlling at least one of: the shutter timing of the first camera; or the gain of the imaging sensor of the first camera, and
controlling a projection timing of the light projector unit matching the shutter timing of the first camera.
wherein the set of at least one camera includes at least the first camera and a second camera, and wherein controlling the automatic exposure setting of at least the subset of imaging modules of the 3D scanner at least in party by processing the determined background intensity value comprises:
controlling an automatic exposure setting of at least the first camera and the second camera at least in party by processing the determined background intensity value that was determined at least in part by processing the compressed image data conveying the compressed version of the first image data captured by the first camera.

Example Embodiment 62. A system according to any one of Example Embodiments 40 to 61, wherein the computing system is further configured for:
detecting at least one feature of the structured light pattern projected onto the surface of the object at least in part by processing the compressed image data conveying the compressed versions of the images in the set of images, including compressed versions of the reflections of the structured light pattern projected onto the surface of the object, wherein lower intensity values are amplified and saturation of higher intensity values is limited in the compressed versions of the reflections of the structured light pattern included in the compressed versions of the images conveyed in the compressed image data.

Example Embodiment 63. A system according to any one of Example Embodiments 40 to 62, wherein the computing system is further configured for:
relinearizing the compressed image data conveying the compressed versions of the images in the set of images, by at least partially undoing the nonlinearity introduced by the nonlinear conversion used to compress the image data conveying the set of images, to generate relinearized compressed image data conveying relinearized compressed versions of the images in the set of images; and
determining, at least in part by processing the relinearized compressed image data, a measurement relating to the surface of the object.

Example Embodiment 64. A system according to Example Embodiment 63, wherein determining the measurement relating to the surface of the object at least in part by processing the relinearized compressed image data comprises determining the measurement relating to the surface of the object based on relinearized compressed versions of the reflections of the structured light pattern included in the relinearized compressed versions of the images conveyed in the relinearized compressed image data.

Example Embodiment 65. A system according to Example Embodiment 63 or Example Embodiment 64, wherein determining the measurement relating to the surface of the object comprises at least one of:
  determining, at least in part by processing the relinearized compressed image data, a location of maximum intensity of at least one feature of the structured light pattern projected onto the surface of the object; or
  determining, at least in part by processing the relinearized compressed image data, a contour of at least one visual target disposed on the surface of the object.

Example Embodiment 66. A system according to Example Embodiment 65 when dependent on Example Embodiment 62, wherein determining the measurement relating to the surface of the object comprises:
  determining, at least in part by processing the relinearized compressed image data, a location of maximum intensity of the at least one of the features of the structured light pattern that was detected at least in part by processing the compressed image data.

Example Embodiment 67. A system according to Example Embodiment 62 or Example Embodiment 66, wherein the computing system is further configured for:
  detecting, at least in part by processing the compressed image data, at least one visual target disposed on the surface of the object.

Example Embodiment 68. A system according to Example Embodiment 67, wherein determining the measurement relating to the surface of the object further comprises:
  Determining, at least in part by processing the relinearized compressed image data, a contour of the at least one visual target that was detected at least in part by processing the compressed image data.

Example Embodiment 69. A system according to any one of Example Embodiments 40 to 68, wherein:
  the image data conveying the set of images comprises N-bit resolution image data captured by the set of at least one camera;
  the compressed image data conveying the compressed versions of the images in the set of images comprises M-bit resolution image data; and
  compressing the image data to generate the compressed image data comprises compressing the N-bit resolution image data using a nonlinear N-bit-to-M-bit resolution conversion to generate the M-bit resolution image data, wherein M is less than N.

Example Embodiment 70. A system according to Example Embodiment 69, wherein N=12 and M==8.

Example Embodiment 71. A system according to any one of Example Embodiments 40 to 70, wherein the nonlinear conversion is based on a nonlinear conversion function that amplifies lower intensity values and limits saturation of higher intensity values in the compressed image data.

Example Embodiment 72. A system according to Example Embodiment 71, wherein compressing the image data conveying the set of images comprises compressing the image data using a look-up table stored on the 3D scanner, the look-up table being configured to implement the nonlinear conversion function.

Example Embodiment 73. A system according to Example Embodiment 71 or Example Embodiment 72, wherein the nonlinear conversion function is based on a gamma function in which the value of gamma is greater than one.

Example Embodiment 74. A system according to Example Embodiment 73 when dependent on Example Embodiment 69, wherein the gamma function is of the form:

$$p_o = \left(\frac{p_i}{2^N - 1}\right)^{1/gamma} * (2^M - 1)$$

where $p_o$ is an output pixel value with an M-bit resolution, $p_i$ is an input pixel value with an N-bit resolution; and gamma $>1$.

Example Embodiment 75. A system according to Example Embodiment 71 or Example Embodiment 72, wherein the nonlinear conversion function is based on a piecewise linear function, wherein a slope of a linear portion of the piecewise linear function for conversion of lower intensity values is greater than a slope of a linear portion of the piecewise linear function for conversion of higher intensity values.

Example Embodiment 76. A system according to Example Embodiment 69 when dependent on Example Embodiment 63, wherein relinearizing the compressed image data is done using a nonlinear M-bit to M-bit conversion function configured to relinearize the M-bit resolution image data by at least partially undoing the nonlinearization introduced by the nonlinear conversion used to compress the image data.

Example Embodiment 77. A system according to Example Embodiment 74 when dependent on Example Embodiment 63, wherein relinearizing the compressed image data is done using a nonlinear conversion function based on a gamma function of the form:

$$p_n = \left(\frac{p_o}{2^M - 1}\right)^{gamma} * (2^M - 1)$$

where $p_o$ is an output pixel value with an M-bit resolution, $p_i$ is an input pixel value with an M-bit resolution; and gamma $>1$, wherein a value of gamma matches a value of gamma in the gamma function used to compress the image data.

Example Embodiment 78. A system according to any of Example Embodiments 40 to 77, wherein:
  the 3D scanner is portable; and
  the set of image modules are configured to project the structured light pattern onto the surface of the object and capture image data including reflections of the structured light pattern projected onto the surface of the object in real-time as the 3D scanner is moved over the surface of the object.

Example Embodiment 79. An apparatus for the three-dimensional (3D) measurement of a surface of an object, the apparatus comprising:
  a. a scanner frame;
  b. a set of imaging modules mounted on the scanner frame, the set of imaging modules including:

i) a light projector unit for projecting a structured light pattern onto the surface of the object;
ii) a set of least one camera positioned alongside the light projector unit for capturing image data conveying a set of images including reflections of the structured light pattern projected onto the surface of the object; and
iii) a set of at least one image data compression module in communication with the set of at least one camera, the set of at least one image data compression module being configured for compressing the image data conveying the set of images using a nonlinear conversion to generate compressed image data conveying the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
c. at least one processing module in communication with the set of imaging modules, the at least one processing module being configured for:
extracting, from the compressed image data conveying the set of images, the compressed image data for a first image from a first camera of the set of imaging modules;
determining a background intensity value for the first image at least in part by processing the compressed image data for the first image;
controlling an automatic exposure setting of at least a subset of the set of imaging modules at least in part by processing the determined background intensity value.

Example Embodiment 80. An apparatus according to Example Embodiment 79, wherein the at least one processing module is mounted on the scanner frame such that the set of at least one processing module is integrated into the 3D scanner.

Example Embodiment 81. An apparatus according to Example Embodiment 79, wherein the at least one processing module is separate from the 3D scanner and in communication with the 3D scanner over a communication link.

Example Embodiment 82. An apparatus according to any one of Example Embodiments 79 to 81, wherein determining the background intensity value for the compressed version of the first image comprises:
processing the compressed image data to identify a specific intensity value or a specific range of intensity values common in the compressed image data conveying the compressed version of the first image.

Example Embodiment 83. An apparatus according to Example Embodiment 82, wherein the specific intensity value or the specific range of intensity values appear more frequently than other intensity values or ranges of intensity values in the compressed image data conveying the compressed version of the first image.

Example Embodiment 84. An apparatus according to Example Embodiment 82, wherein identifying the specific intensity value or the specific range of intensity values is based on a weighting of pixels in the compressed version of the first image, whereby intensity values for pixels closer to a center region of the compressed version of the first image are weighted more heavily than intensity values for pixels further from the center region of the compressed version of the first image.

Example Embodiment 85. An apparatus according to any one of Example Embodiments 79 to 81, wherein determining a background intensity value for the compressed version of the first image comprises:
processing the compressed image data conveying the compressed version of the first image to generate a histogram of intensity data for the compressed version of the first image; and
determining the background intensity value for the compressed version of the first image based on the histogram of intensity data for the compressed version of the first image.

Example Embodiment 86. An apparatus according to Example Embodiment 85, wherein processing the compressed image data conveying the compressed version of the first image to generate a histogram of intensity data for the compressed version of the first image comprises weighting the histogram based on pixel position within the compressed version of the first image, wherein pixels closer to a region of interest in the compressed version of the image are weighted more heavily than pixels further from the region of interest.

Example Embodiment 87. An apparatus according to Example Embodiment 86, wherein the region of interest is a center region of the compressed version of the first image.

Example Embodiment 88. An apparatus according to Example Embodiment 87, wherein weighting the histogram based on pixel position within the compressed version of the first image comprises weighting the histogram according to a Gaussian function at the center region of the compressed version of the first image.

Example Embodiment 89. An apparatus according to any one of Example Embodiments 85 to 88, wherein processing the compressed image data to generate a histogram of intensity data for the compressed version of the first image comprises:
sampling a subset of less than all pixels within the compressed version of the first image; and
generating the histogram of intensity data for the compressed version of the first image at least in part by processing the compressed image data for the sampled subset of pixels in the compressed version of the first image.

Example Embodiment 90. An apparatus according to any one of Example Embodiments 85 to 88, wherein determining the background intensity value for the compressed version of the image based on the histogram of intensity data comprises identifying the background intensity value for the compressed version of the image as being an intensity value corresponding to a range of intensity values that appears more frequently than another range of intensity values identified in the histogram of intensity data.

Example Embodiment 91. An apparatus according to any one of Example Embodiments 79 to 90, wherein controlling an automatic exposure setting of at least a subset of the set of imaging modules of the 3D scanner at least in part by processing the determined background intensity value comprises:
normalizing the determined background intensity value to compensate for the exposure setting used when the image data conveying the first image was captured by the first camera; and
controlling the automatic exposure setting of at least the subset of imaging modules at least in part by processing the normalized background intensity value.

Example Embodiment 92. An apparatus according to Example Embodiment 91, wherein normalizing the determined background intensity value comprises:

determining the normalized background intensity value for the compressed version of the first image at least in part by processing: 1) the determined background intensity value; and 2) a value of the exposure setting used when the image data conveying the first image was captured by the first camera.

Example Embodiment 93. An apparatus according to Example Embodiment 92, wherein determining the normalized background intensity value for the compressed version of the first image comprises subtracting a correction factor from the determined background intensity value, wherein the correction factor is an increasing function of the value of the exposure setting used when the image data conveying the first image was captured by the first camera.

Example Embodiment 94. An apparatus according to Example Embodiment 93 when dependent on Example Embodiment 85, wherein the normalized background intensity value is determined in accordance with:

$$\text{Intensity}_{Normalized} = \text{Inensity}_{Histogram} - \sqrt{C * \text{Exposure}}$$

where $\text{Intensity}_{Normalized}$ is the normalized background intensity value, $\text{Intensity}_{Histogram}$ is the background intensity value determined based on the histogram of intensity data, Exposure is the value, expressed in units of milliseconds, of the exposure setting used when the image data conveying the first image was captured by the first camera, and C is a scaling factor.

Example Embodiment 95. An apparatus according to any one of Example Embodiments 92 to 94, wherein the value of the exposure setting used when the image data conveying the first image was captured by the first camera is a first value, and wherein controlling the automatic exposure setting of at least the subset of imaging modules of the 3D scanner at least in party by processing the normalized background intensity value comprises determining a second value for the automatic exposure setting for at least the subset of the imaging modules based on the normalized background intensity value.

Example Embodiment 96. An apparatus according to Example Embodiment 95, wherein controlling the automatic exposure setting of at least the subset of imaging modules of the 3D scanner at least in party by processing the normalized background intensity value further comprises:

switching the automatic exposure setting of at least the subset of imaging modules to the second value after a number of images captured using the first value for the automatic exposure setting has reached a predetermined threshold value.

Example Embodiment 97. An apparatus according to Example Embodiment 95, wherein controlling the automatic exposure setting of at least the subset of imaging modules of the 3D scanner at least in party by processing the normalized background intensity value further comprises:

determining whether the second value for the automatic exposure setting differs from the first value for the automatic exposure setting by more than a predetermined amount; and switching the automatic exposure setting of at least the subset of imaging modules to the second value after determining that the second value for the automatic exposure setting differs from the first value for the automatic exposure setting by more than the predetermined amount.

Example Embodiment 98. An apparatus according to Example Embodiment 97, wherein the predetermined amount corresponds to a change of at least +/−10 grayscale in the determined background intensity value.

Example Embodiment 99. An apparatus according to any one of Example Embodiments 95 to 98, wherein determining a second value for the automatic exposure setting for at least the subset of the imaging modules based on the normalized background intensity value comprises determining the second value using an exponentially decreasing function of the normalized background intensity value.

Example Embodiment 100. An apparatus according to Example Embodiment 99, wherein determining the second value using an exponentially decreasing function of the normalized background intensity value comprises determining the second value in accordance with:

$$\text{System Exposure} = \text{System Exposure}(0) \cdot e^{-B \cdot \text{intensity}_{Normalized}}$$

where System Exposure is the value of the automatic exposure setting of at least the subset of imaging modules, $\text{Intensity}_{Normalized}$ is the normalized background intensity value, System Exposure(0) is the value of System Exposure when $\text{Intensity}_{Normalized}=0$, and B is a scaling factor.

Example Embodiment 101. An apparatus according to any one of Example Embodiments 92 to 100, wherein the value of the automatic exposure setting is a function of at least one of shutter timing of the first camera, a matching projector timing of the light projector unit and a gain of an imaging sensor of the first camera, wherein controlling the automatic exposure setting of at least the subset of imaging modules of the 3D scanner comprises:

controlling at least one of: the shutter timing of the first camera; or the gain of the imaging sensor of the first camera; and controlling a projection timing of the light projector unit matching the shutter timing of the first camera.

Example Embodiment 102. An apparatus according to any one of Example Embodiments 79 to 101, wherein the set of at least one camera includes at least the first camera and a second camera, and wherein controlling the automatic exposure setting of at least the subset of imaging modules of the 3D scanner at least in party by processing the determined background intensity value comprises:

controlling an automatic exposure setting of at least the first camera and the second camera at least in party by processing the determined background intensity value that was determined at least in part by processing the compressed image data conveying the compressed version of the first image data captured by the first camera.

Example Embodiment 103. An apparatus according to any one of Example Embodiments 79 to 102, wherein the at least one processing module is further configured for:

detecting at least one feature of the structured light pattern projected onto the surface of the object at least in part by processing the compressed image data conveying the compressed versions of the images in the set of images, including compressed versions of the reflections of the structured light pattern projected onto the surface of the object, wherein lower intensity values are amplified and saturation of higher intensity values is limited in the compressed versions of the reflections of the structured light pattern included in the compressed versions of the images conveyed in the compressed image data.

Example Embodiment 104. An apparatus according to any one of Example Embodiments 79 to 103, wherein the at least one processing module is further configured for:
  relinearizing the compressed image data conveying the compressed versions of the images in the set of images, by at least partially undoing the nonlinearity introduced by the nonlinear conversion used to compress the image data conveying the set of images, to generate relinearized compressed image data conveying relinearized compressed versions of the images in the set of images, and
  determining, at least in part by processing the relinearized compressed image data, a measurement relating to the surface of the object.

Example Embodiment 105. An apparatus according to Example Embodiment 104, wherein determining the measurement relating to the surface of the object at least in part by processing the relinearized compressed image data comprises determining the measurement relating to the surface of the object based on relinearized compressed versions of the reflections of the structured light pattern included in the relinearized compressed versions of the images conveyed in the relinearized compressed image data.

Example Embodiment 106. An apparatus according to Example Embodiment 104 or Example Embodiment 105, wherein determining the measurement relating to the surface of the object comprises at least one of:
  determining, at least in part by processing the relinearized compressed image data, a location of maximum intensity of at least one feature of the structured light pattern projected onto the surface of the object; or
  determining, at least in part by processing the relinearized compressed image data, a contour of at least one visual target disposed on the surface of the object.

Example Embodiment 107. An apparatus according to Example Embodiment 106 when dependent on Example Embodiment 103, wherein determining the measurement relating to the surface of the object comprises:
  determining, at least in part by processing the relinearized compressed image data, a location of maximum intensity of the at least one of the features of the structured light pattern that was detected at least in part by processing the compressed image data.

Example Embodiment 108. An apparatus according to Example Embodiment 103 or Example Embodiment 107, wherein the at least one processing module is further configured for:
  detecting, at least in part by processing the compressed image data, at least one visual target disposed on the surface of the object.

Example Embodiment 109. An apparatus according to Example Embodiment 108, wherein determining the measurement relating to the surface of the object further comprises:
  determining, at least in part by processing the relinearized compressed image data, a contour of the at least one visual target that was detected at least in part by processing the compressed image data.

Example Embodiment 110. An apparatus according to any one of Example Embodiments 79 to 109, wherein:
  the image data conveying the set of images comprises N-bit resolution image data captured by the set of at least one camera;
  the compressed image data conveying the compressed versions of the images in the set of images comprises M-bit resolution image data; and
  compressing the image data to generate the compressed image data comprises compressing the N-bit resolution image data using a nonlinear N-bit-to-M-bit resolution conversion to generate the M-bit resolution image data, wherein M is less than N.

Example Embodiment 111. An apparatus according to Example Embodiment 110, wherein N=12 and M=8.

Example Embodiment 112. An apparatus according to any one of Example Embodiments 79 to 111, wherein the nonlinear conversion is based on a nonlinear conversion function that amplifies lower intensity values and limits saturation of higher intensity values in the compressed image data.

Example Embodiment 113. An apparatus according to Example Embodiment 112, wherein compressing the image data conveying the set of images comprises compressing the image data using a look-up table stored on the 3D scanner, the look-up table being configured to implement the nonlinear conversion function.

Example Embodiment 114. An apparatus according to Example Embodiment 112 or Example Embodiment 113, wherein the nonlinear conversion function is based on a gamma function in which the value of gamma is greater than one.

Example Embodiment 115. An apparatus according to Example Embodiment 114 when dependent on Example Embodiment 110, wherein the gamma function is of the form:

$$p_o = \left(\frac{p_i}{2^N - 1}\right)^{1/gamma} * (2^M - 1)$$

where $p_o$ is an output pixel value with an M-bit resolution, $p_i$ is an input pixel value with an N-bit resolution; and gamma $>1$.

Example Embodiment 116. An apparatus according to Example Embodiment 112 or Example Embodiment 113, wherein the nonlinear conversion function is based on a piecewise linear function, wherein a slope of a linear portion of the piecewise linear function for conversion of lower intensity values is greater than a slope of a linear portion of the piecewise linear function for conversion of higher intensity values.

Example Embodiment 117. An apparatus according to Example Embodiment 110 when dependent on Example Embodiment 104, wherein relinearizing the compressed image data is done using a nonlinear M-bit to M-bit conversion function configured to relinearize the M-bit resolution image data by at least partially undoing the nonlinearization introduced by the nonlinear conversion used to compress the image data.

Example Embodiment 118. An apparatus according to Example Embodiment 115 when dependent on Example Embodiment 104, wherein relinearizing the compressed image data is done using a nonlinear conversion function based on a gamma function of the form:

$$p_n = \left(\frac{p_o}{2^M - 1}\right)^{gamma} * (2^M - 1)$$

where $p_o$ is an output pixel value with an M-bit resolution, $p_i$ is an input pixel value with an M-bit resolution; and gamma >1, wherein a value of gamma matches a value of gamma in the gamma function used to compress the image data.

Example Embodiment 119. An apparatus according to any of Example Embodiments 79 to 118, wherein:
the 3D scanner is portable; and
the set of image modules are configured to project the structured light pattern onto the surface of the object and capture image data including reflections of the structured light pattern projected onto the surface of the object in real-time as the 3D scanner is moved over the surface of the object.

Example Embodiment 120. An apparatus for the three-dimensional (3D) measurement of a surface of an object, said apparatus comprising:
a. an input for receiving compressed image data conveying a set of images including reflections of a structured light pattern projected onto the surface of the object, the compressed image data having been generated by using a nonlinear conversion to compress image data captured by a set of imaging modules of the 3D scanner, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
b. a processing module in communication with said input, said processing module being configured for:
i. extracting, from the compressed image data conveying the set of images, the compressed image data for an image from a camera of the set of imaging modules of the 3D scanner;
ii. determining, at least in part by processing the compressed image data for the image, a background intensity value for the image; and
iii. controlling an automatic exposure setting of at least a subset of the set of imaging modules of the 3D scanner at least in part by processing the background intensity value; and
c. a display device in communication with said processing module for generating a graphical representation of a reconstructed surface for the object.

Example Embodiment 121. An apparatus according to Example Embodiment 120, wherein determining the background intensity value for the compressed version of the first image comprises:
processing the compressed image data to identify a specific intensity value or a specific range of intensity values common in the compressed image data conveying the compressed version of the first image.

Example Embodiment 122. An apparatus according to Example Embodiment 121, wherein the specific intensity value or the specific range of intensity values appear more frequently than other intensity values or ranges of intensity values in the compressed image data conveying the compressed version of the first image.

Example Embodiment 123. An apparatus according to Example Embodiment 121, wherein identifying the specific intensity value or the specific range of intensity values is based on a weighting of pixels in the compressed version of the first image, whereby intensity values for pixels closer to a center region of the compressed version of the first image are weighted more heavily than intensity values for pixels further from the center region of the compressed version of the first image.

Example Embodiment 124. An apparatus according to Example Embodiment 120, wherein determining a background intensity value for the compressed version of the first image comprises:
processing the compressed image data conveying the compressed version of the first image to generate a histogram of intensity data for the compressed version of the first image; and
determining the background intensity value for the compressed version of the first image based on the histogram of intensity data for the compressed version of the first image.

Example Embodiment 125. An apparatus according to Example Embodiment 124, wherein processing the compressed image data conveying the compressed version of the first image to generate a histogram of intensity data for the compressed version of the first image comprises weighting the histogram based on pixel position within the compressed version of the first image, wherein pixels closer to a region of interest in the compressed version of the image are weighted more heavily than pixels further from the region of interest.

Example Embodiment 126. An apparatus according to Example Embodiment 125, wherein the region of interest is a center region of the compressed version of the first image.

Example Embodiment 127. An apparatus according to Example Embodiment 126, wherein weighting the histogram based on pixel position within the compressed version of the first image comprises weighting the histogram according to a Gaussian function at the center region of the compressed version of the first image.

Example Embodiment 128. An apparatus according to any one of Example Embodiments 124 to 127, wherein processing the compressed image data to generate a histogram of intensity data for the compressed version of the first image comprises:
sampling a subset of less than all pixels within the compressed version of the first image; and
generating the histogram of intensity data for the compressed version of the first image at least in part by processing the compressed image data for the sampled subset of pixels in the compressed version of the first image.

Example Embodiment 129. An apparatus according to any one of Example Embodiments 124 to 127, wherein determining the background intensity value for the compressed version of the image based on the histogram of intensity data comprises identifying the background intensity value for the compressed version of the image as being an intensity value corresponding to a range of intensity values that appears more frequently than another range of intensity values identified in the histogram of intensity data.

Example Embodiment 130. An apparatus according to any one of Example Embodiments 120 to 129, wherein controlling an automatic exposure setting of at least a subset of the set of imaging modules of the 3D scanner at least in part by processing the determined background intensity value comprises:
normalizing the determined background intensity value to compensate for the exposure setting used when the image data conveying the first image was captured by the first camera; and controlling the automatic exposure setting of at least the subset of imaging modules at least in part by processing the normalized background intensity value.

Example Embodiment 131. An apparatus according to Example Embodiment 130, wherein normalizing the determined background intensity value comprises:
determining the normalized background intensity value for the compressed version of the first image at least in part by processing: 1) the determined background intensity value; and 2) a value of the exposure setting used when the image data conveying the first image was captured by the first camera.

Example Embodiment 132. An apparatus according to Example Embodiment 131, wherein determining the normalized background intensity value for the compressed version of the first image comprises subtracting a correction factor from the determined background intensity value, wherein the correction factor is an increasing function of the value of the exposure setting used when the image data conveying the first image was captured by the first camera.

Example Embodiment 133. An apparatus according to Example Embodiment 132 when dependent on Example Embodiment 124, wherein the normalized background intensity value is determined in accordance with:

$$\text{Intensity}_{Normalized} = \text{Inensity}_{Histogram} - \sqrt{C * \text{Exposure}}$$

where $\text{Intensity}_{Normalized}$ is the normalized background intensity value, $\text{Intensity}_{Histogram}$ is the background intensity value determined based on the histogram of intensity data, Exposure is the value, expressed in units of milliseconds, of the exposure setting used when the image data conveying the first image was captured by the first camera, and C is a scaling factor.

Example Embodiment 134. An apparatus according to any one of Example Embodiments 131 to 133, wherein the value of the exposure setting used when the image data conveying the first image was captured by the first camera is a first value, and wherein controlling the automatic exposure setting of at least the subset of imaging modules of the 3D scanner at least in party by processing the normalized background intensity value comprises determining a second value for the automatic exposure setting for at least the subset of the imaging modules based on the normalized background intensity value.

Example Embodiment 135. An apparatus according to Example Embodiment 134, wherein controlling the automatic exposure setting of at least the subset of imaging modules of the 3D scanner at least in party by processing the normalized background intensity value further comprises:
switching the automatic exposure setting of at least the subset of imaging modules to the second value after a number of images captured using the first value for the automatic exposure setting has reached a predetermined threshold value.

Example Embodiment 136. An apparatus according to Example Embodiment 134, wherein controlling the automatic exposure setting of at least the subset of imaging modules of the 3D scanner at least in party by processing the normalized background intensity value further comprises:
determining whether the second value for the automatic exposure setting differs from the first value for the automatic exposure setting by more than a predetermined amount; and
switching the automatic exposure setting of at least the subset of imaging modules to the second value after determining that the second value for the automatic exposure setting differs from the first value for the automatic exposure setting by more than the predetermined amount.

Example Embodiment 137. An apparatus according to Example Embodiment 136, wherein the predetermined amount corresponds to a change of at least +/−10 grayscale in the determined background intensity value.

Example Embodiment 138. An apparatus according to any one of Example Embodiments 134 to 137, wherein determining a second value for the automatic exposure setting for at least the subset of the imaging modules based on the normalized background intensity value comprises determining the second value using an exponentially decreasing function of the normalized background intensity value.

Example Embodiment 139. An apparatus according to Example Embodiment 138, wherein determining the second value using an exponentially decreasing function of the normalized background intensity value comprises determining the second value in accordance with:

$$\text{System Exposure} = \text{System Exposure}(0) \cdot e^{-B \cdot \text{intensity}_{Normalized}}$$

where System Exposure is the value of the automatic exposure setting of at least the subset of imaging modules, $\text{Intensity}_{Normalized}$ is the normalized background intensity value, System Exposure(0) is the value of System Exposure when $\text{Intensity}_{Normalized}=0$, and B is a scaling factor.

Example Embodiment 140. An apparatus according to any one of Example Embodiments 131 to 139, wherein the value of the automatic exposure setting is a function of at least one of shutter timing of the first camera, a matching projector timing of the light projector unit and a gain of an imaging sensor of the first camera, wherein controlling the automatic exposure setting of at least the subset of imaging modules of the 3D scanner comprises:
controlling at least one of: the shutter timing of the first camera; or the gain of the imaging sensor of the first camera; and
controlling a projection timing of the light projector unit matching the shutter timing of the first camera.

Example Embodiment 141. An apparatus according to any one of Example Embodiments 120 to 140, wherein the set of at least one camera includes at least the first camera and a second camera, and wherein controlling the automatic exposure setting of at least the subset of imaging modules of the 3D scanner at least in party by processing the determined background intensity value comprises:
controlling an automatic exposure setting of at least the first camera and the second camera at least in party by processing the determined background intensity value that was determined at least in part by processing the compressed image data conveying the compressed version of the first image data captured by the first camera.

Example Embodiment 142. An apparatus according to any one of Example Embodiments 120 to 141, wherein the at least one processing module is further configured for:
detecting at least one feature of the structured light pattern projected onto the surface of the object at least in part by processing the compressed image data conveying the compressed versions of the images in the set of images, including compressed versions of the reflections of the structured light pattern projected onto the surface of the object, wherein lower intensity values are amplified and saturation of higher intensity values is limited in the compressed versions of the reflections of the structured light pattern included in the compressed versions of the images conveyed in the compressed image data.

Example Embodiment 143. An apparatus according to any one of Example Embodiments 120 to 142, wherein the at least one processing module is further configured for:
relinearizing the compressed image data conveying the compressed versions of the images in the set of images, by at least partially undoing the nonlinearity introduced by the nonlinear conversion used to compress the image data conveying the set of images, to generate relinearized compressed image data conveying relinearized compressed versions of the images in the set of images; and
determining, at least in part by processing the relinearized compressed image data, a measurement relating to the surface of the object.

Example Embodiment 144. An apparatus according to Example Embodiment 143, wherein determining the measurement relating to the surface of the object at least in part by processing the relinearized compressed image data comprises determining the measurement relating to the surface of the object based on relinearized compressed versions of the reflections of the structured light pattern included in the relinearized compressed versions of the images conveyed in the relinearized compressed image data.

Example Embodiment 145. An apparatus according to Example Embodiment 143 or Example Embodiment 144, wherein determining the measurement relating to the surface of the object comprises at least one of:
determining, at least in part by processing the relinearized compressed image data, a location of maximum intensity of at least one feature of the structured light pattern projected onto the surface of the object; or
determining, at least in part by processing the relinearized compressed image data, a contour of at least one visual target disposed on the surface of the object.

Example Embodiment 146. An apparatus according to Example Embodiment 145 when dependent on Example Embodiment 142, wherein determining the measurement relating to the surface of the object comprises:
determining, at least in part by processing the relinearized compressed image data, a location of maximum intensity of the at least one of the features of the structured light pattern that was detected at least in part by processing the compressed image data.

Example Embodiment 147. An apparatus according to Example Embodiment 142 or Example Embodiment 146, wherein the at least one processing module is further configured for:
detecting, at least in part by processing the compressed image data, at least one visual target disposed on the surface of the object.

Example Embodiment 148. An apparatus according to Example Embodiment 147, wherein determining the measurement relating to the surface of the object further comprises:
determining, at least in part by processing the relinearized compressed image data, a contour of the at least one visual target that was detected at least in part by processing the compressed image data.

Example Embodiment 149. An apparatus according to any one of Example Embodiments 120 to 148, wherein:
the image data conveying the set of images comprises N-bit resolution image data captured by the set of at least one camera;
the compressed image data conveying the compressed versions of the images in the set of images comprises M-bit resolution image data; and
compressing the image data to generate the compressed image data comprises compressing the N-bit resolution image data using a nonlinear N-bit-to-M-bit resolution conversion to generate the M-bit resolution image data, wherein M is less than N.

Example Embodiment 150. An apparatus according to Example Embodiment 149, wherein N=12 and M=8.

Example Embodiment 151. An apparatus according to any one of Example Embodiments 120 to 150, wherein the nonlinear conversion is based on a nonlinear conversion function that amplifies lower intensity values and limits saturation of higher intensity values in the compressed image data.

Example Embodiment 152. An apparatus according to Example Embodiment 151, wherein compressing the image data conveying the set of images comprises compressing the image data using a look-up table stored on the 3D scanner, the look-up table being configured to implement the nonlinear conversion function.

Example Embodiment 153. An apparatus according to Example Embodiment 151 or Example Embodiment 152, wherein the nonlinear conversion function is based on a gamma function in which the value of gamma is greater than one.

Example Embodiment 154. An apparatus according to Example Embodiment 153 when dependent on Example Embodiment 149, wherein the gamma function is of the form:

$$p_o = \left(\frac{p_i}{2^N - 1}\right)^{1/gamma} * (2^M - 1)$$

where $p_o$ is an output pixel value with an M-bit resolution, $p_i$ is an input pixel value with an N-bit resolution; and gamma $>1$.

Example Embodiment 155. An apparatus according to Example Embodiment 151 or Example Embodiment 152, wherein the nonlinear conversion function is based on a piecewise linear function, wherein a slope of a linear portion of the piecewise linear function for conversion of lower intensity values is greater than a slope of a linear portion of the piecewise linear function for conversion of higher intensity values.

Example Embodiment 156. An apparatus according to Example Embodiment 149 when dependent on Example Embodiment 143, wherein relinearizing the compressed image data is done using a nonlinear M-bit to M-bit conversion function configured to relinearize the M-bit resolution image data by at least partially undoing the nonlinearization introduced by the nonlinear conversion used to compress the image data.

Example Embodiment 157. An apparatus according to Example Embodiment 154 when dependent on Example Embodiment 143, wherein relinearizing the compressed image data is done using a nonlinear conversion function based on a gamma function of the form:

$$p_n = \left(\frac{p_o}{2^M - 1}\right)^{gamma} * (2^M - 1)$$

where $p_o$ is an output pixel value with an M-bit resolution, $p_i$ is an input pixel value with an M-bit resolution; and gamma >1, wherein a value of gamma matches a value of gamma in the gamma function used to compress the image data.

Example Embodiment 158. An apparatus according to any of Example Embodiments 120 to 157, wherein:
the 3D scanner is portable; and
the set of image modules are configured to project the structured light pattern onto the surface of the object and capture image data including reflections of the structured light pattern projected onto the surface of the object in real-time as the 3D scanner is moved over the surface of the object.

In some embodiments, any feature of any embodiment described herein may be used in combination with any feature of any other embodiment described herein.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

In describing embodiments, specific terminology has been resorted to for the sake of description, but this is not intended to be limited to the specific terms so selected, and it is understood that each specific term comprises all equivalents. In case of any discrepancy, inconsistency, or other difference between terms used herein and terms used in any document incorporated by reference herein, meanings of the terms used herein are to prevail and be used.

Although various embodiments of the disclosure have been described and illustrated, it will be apparent to those skilled in the art in light of the present description that numerous modifications and variations can be made. The scope of the invention is defined more particularly in the appended claims.

The invention claimed is:

1. A method for obtaining three-dimensional (3D) measurements of a surface of an object, the method comprising:
projecting a structured light pattern onto the surface of the object using a light projector of a 3D scanner;
capturing image data using a camera of the 3D scanner, the image data conveying an image including reflections of the structured light pattern projected onto the surface of the object;
compressing the image data conveying the image using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
detecting at least one feature of the structured light pattern projected onto the surface of the object at least in part by processing the compressed image data conveying the compressed version of the image, including a compressed version of the reflections of the structured light pattern projected onto the surface of the object, wherein lower intensity values are amplified and saturation of higher intensity values is limited in the compressed version of the reflections of the structured light pattern included in the compressed version of the image;
determining a background intensity value for the compressed version of the image at least in part by processing the compressed image data for the image; and
controlling the automatic exposure setting of the 3D scanner at least in part by processing the determined background intensity value.

2. A method according to claim 1, wherein determining the background intensity value for the compressed version of the image comprises:
processing the compressed image data to identify a specific intensity value or a specific range of intensity values common in the compressed image data.

3. A method according to claim 2, wherein identifying the specific intensity value or the specific range of intensity values is based on a weighting of pixels in the compressed version of the image, whereby intensity values for pixels closer to a center region of the compressed version of the image are weighted more heavily than intensity values for pixels further from the center region of the compressed version of the image.

4. A method according to claim 1, wherein determining the background intensity value for the compressed version of the image comprises:
processing the compressed image data to generate a histogram of intensity data for the compressed version of the image; and
determining the background intensity value for the compressed version of the image based on the histogram of intensity data for the compressed version of the image.

5. A method according to claim 4, wherein processing the compressed image data to generate the histogram of intensity data for the compressed version of the image comprises weighting the histogram based on pixel position within the compressed version of the image, wherein pixels closer to a region of interest in the compressed version of the image are weighted more heavily than pixels further from the region of interest.

6. A method according to claim 4, wherein processing the compressed image data to generate the histogram of intensity data for the compressed version of the image comprises:

sampling a subset of less than all pixels within the compressed version of the image; and generating the histogram of intensity data for the compressed version of the image at least in part by processing the compressed image data for the sampled subset of pixels in the compressed version of the image.

7. A method according to claim 1, wherein controlling the automatic exposure setting of the 3D scanner at least in part by processing the determined background intensity value comprises:

normalizing the background intensity value to compensate for the exposure setting used when the image data conveying the image was captured by the camera; and controlling the automatic exposure setting of the 3D scanner based on the normalized background intensity value.

8. A method for the three-dimensional (3D) measurement of a surface of an object, the method comprising:

projecting a structured light pattern onto the surface of the object using a light projector of a 3D scanner;

capturing image data using a camera of the 3D scanner, the image data conveying an image including reflections of the structured light pattern projected onto the surface of the object;

compressing the image data conveying the image using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;

determining a background intensity value for the compressed version of the image at least in part by processing the compressed image data for the image;

controlling the automatic exposure setting of the 3D scanner at least in part by processing the determined background intensity value, the controlling comprising:

normalizing the background intensity value to compensate for the exposure setting used when the image data conveying the image was captured by the camera, the normalizing comprising determining the normalized background intensity value for the compressed version of the image at least in part by processing:

1) the determined background intensity value; and
2) a value of the automatic exposure setting used when the image data was captured by the camera; and controlling the automatic exposure setting of the 3D scanner based on the normalized background intensity value.

9. A method according to claim 8, wherein determining the normalized background intensity value for the compressed version of the image comprises subtracting a correction factor from the determined background intensity value, wherein the correction factor is an increasing function of the value of the automatic exposure setting used when the image data was captured by the camera.

10. A method according to claim 8, wherein the value of the exposure setting used when the image data was captured by the camera is a first value, and wherein controlling the automatic exposure setting of the 3D scanner at least in part by processing the normalized background intensity value comprises determining a second value for the automatic exposure setting for the 3D scanner based on the normalized background intensity value.

11. A method according to claim 10, wherein determining the second value for the automatic exposure setting based on the normalized background intensity value comprises determining the second value using an exponentially decreasing function of the normalized background intensity value.

12. A method according to claim 8, wherein the value of the automatic exposure setting of the 3D scanner is a function of at least one of shutter timing of the camera, a projection timing of the light projector and a gain of an imaging sensor of the camera, wherein controlling the automatic exposure setting of the 3D scanner comprises:

controlling at least one of: the shutter timing of the camera; the gain of the imaging sensor of the camera; or the projection timing of the light projector.

13. A method for obtaining three-dimensional (3D) measurements of a surface of an object, the method comprising:

projecting a structured light pattern onto the surface of the object using a light projector of a 3D scanner that comprises a first camera and one or more other cameras for capturing images of the object;

capturing image data using the first camera of the 3D scanner, the image data conveying an image including reflections of the structured light pattern projected onto the surface of the object;

compressing the image data conveying the image using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;

determining a background intensity value for the compressed version of the image at least in part by processing the compressed image data for the image; and controlling an automatic exposure setting of at least one of the one or more other cameras of the 3D scanner at least in part by processing the determined background intensity value that was determined at least in part by processing the compressed image data conveying the compressed version of the image captured by the first camera of the 3D scanner.

14. A method for obtaining three-dimensional (3D) measurements of a surface of an object, the method comprising:

projecting a structured light pattern onto the surface of the object using a light projector of a 3D scanner;

capturing image data using a camera of the 3D scanner, the image data conveying an image including reflections of the structured light pattern projected onto the surface of the object;

compressing the image data conveying the image using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;

determining a background intensity value for the compressed version of the image at least in part by processing the compressed image data for the image;

controlling an automatic exposure setting of the 3D scanner at least in part by processing the determined background intensity value;

relinearizing the compressed image data, by at least partially undoing the nonlinearity introduced by the nonlinear conversion used to compress the image data, to generate relinearized compressed image data conveying a relinearized compressed version of the image; and determining, at least in part by processing the relinearized compressed image data, a measurement relating to the surface of the object.

15. A method according to claim 14, wherein determining the measurement relating to the surface of the object at least in part by processing the relinearized compressed image data comprises determining the measurement relating to the surface of the object based on a relinearized compressed version of the reflections of the structured light pattern conveyed in the relinearized compressed version of the image.

16. A method according to claim 14, wherein determining the measurement relating to the surface of the object comprises at least one of:

determining, at least in part by processing the relinearized compressed image data, a location of maximum intensity of at least one feature of the structured light pattern projected onto the surface of the object; or determining, at least in part by processing the relinearized compressed image data, a contour of at least one visual target disposed on the surface of the object.

17. A method for obtaining three-dimensional (3D) measurements of a surface of an object, the method comprising:

projecting a structured light pattern onto the surface of the object using a light projector of a 3D scanner;

capturing image data using a camera of the 3D scanner, the image data conveying an image including reflections of the structured light pattern projected onto the surface of the object;

compressing the image data conveying the image using a nonlinear conversion to generate compressed image data conveying a compressed version of the image, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;

determining a background intensity value for the compressed version of the image at least in part by processing the compressed image data for the image; and controlling the automatic exposure setting of the 3D scanner at least in part by processing the determined background intensity value, wherein:

the image data conveying the image comprises N-bit resolution image data captured by the camera of the 3D scanner;

the compressed image data conveying the compressed version of the image comprises M-bit resolution image data; and compressing the image data to generate the compressed image data comprises compressing the N-bit resolution image data using a nonlinear N-bit-to-M-bit resolution conversion to generate the M-bit resolution image data, wherein M is less than N.

18. A method according to claim 1, wherein the nonlinear conversion is based on a nonlinear conversion function that amplifies lower intensity values and limits saturation of higher intensity values in the compressed image data.

19. A scanning system for obtaining three-dimensional (3D) measurements of a surface of an object, the scanning system comprising:

a. a 3D scanner having
  i. a scanner frame on which is mounted a set of imaging modules including:
    1) a light projector unit comprising a light source and a pattern generator for projecting a structured light pattern onto the surface of the object;
    2) a camera positioned alongside the light projector unit for capturing image data conveying a set of images including reflections of the structured light pattern projected onto the surface of the object;
    3) one or more processors implementing at least one image data compression module in communication with the camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
  ii. a communication module in communication with the set of imaging modules, said communication module being configured for transmitting the compressed image data conveying the compressed versions of the images in the set of images to external devices for processing; and
b. a computing system in communication with said 3D scanner, the computing system including one or more processors programmed for:
  i. receiving the compressed image data conveying the compressed versions of the images in the set of images including the reflections of the structured light pattern;
  ii. extracting, from the compressed image data conveying the compressed versions of the images in the set of images, the compressed image data conveying a compressed version of a first image from the camera of the 3D scanner;
  iii. detecting at least one feature of the structured light pattern projected onto the surface of the object at least in part by processing the compressed image data conveying the compressed versions of the images in the set of images, including compressed versions of the reflections of the structured light pattern projected onto the surface of the object, wherein lower intensity values are amplified and saturation of higher intensity values is limited in the compressed versions of the reflections of the structured light pattern included in the compressed versions of the images conveyed in the compressed image data;

iii. determining a background intensity value for the compressed version of the first image at least in part by processing the compressed image data conveying the compressed version of the first image; and iv. controlling an automatic exposure setting of at least a subset of the set of imaging modules of the 3D scanner at least in part by processing the determined background intensity value.

20. A system according to claim 19, wherein determining the background intensity value for the compressed version of the first image comprises:

processing the compressed image data to identify a specific intensity value or a specific range of intensity values common in the compressed image data conveying the compressed version of the first image.

21. A system according to claim 20, wherein identifying the specific intensity value or the specific range of intensity values is based on a weighting of pixels in the compressed version of the first image, whereby intensity values for pixels closer to a center region of the compressed version of the first image are weighted more heavily than intensity values for pixels further from the center region of the compressed version of the first image.

22. A system according to claim 19, wherein determining the background intensity value for the compressed version of the first image comprises: processing the compressed image data conveying the compressed version of the first image to generate a histogram of intensity data for the compressed version of the first image; and determining the background intensity value for the compressed version of the first image based on the histogram of intensity data for the compressed version of the first image.

23. A system according to claim 22, wherein processing the compressed image data conveying the compressed version of the first image to generate the histogram of intensity data for the compressed version of the first image comprises weighting the histogram based on pixel position within the compressed version of the first image, wherein pixels closer to a region of interest in the compressed version of the image are weighted more heavily than pixels further from the region of interest.

24. A system according to claim 22, wherein processing the compressed image data to generate the histogram of intensity data for the compressed version of the first image comprises:

sampling a subset of less than all pixels within the compressed version of the first image; and generating the histogram of intensity data for the compressed version of the first image at least in part by processing the compressed image data for the sampled subset of pixels in the compressed version of the first image.

25. A system according to claim 19, wherein controlling the automatic exposure setting of at least a subset of the set of imaging modules of the 3D scanner at least in part by processing the determined background intensity value comprises:

normalizing the determined background intensity value to compensate for the exposure setting used when the image data conveying the first image was captured by the camera; and controlling the automatic exposure setting of at least the subset of imaging modules at least in part by processing the normalized background intensity value.

26. A scanning system for obtaining three-dimensional (3D) measurements of a surface of an object, the scanning system comprising:

a. a 3D scanner having
 i. a scanner frame on which is mounted a set of imaging modules including:
  1) a light projector unit comprising a light source and a pattern generator for projecting a structured light pattern onto the surface of the object;
  2) a camera positioned alongside the light projector unit for capturing image data conveying a set of images including reflections of the structured light pattern projected onto the surface of the object;
  3) one or more processors implementing at least one image data compression module in communication with the camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
 ii. a communication module in communication with the set of imaging modules, said communication module being configured for transmitting the compressed image data conveying the compressed versions of the images in the set of images to external devices for processing; and
b. a computing system in communication with said 3D scanner, the computing system including one or more processors programmed for:
 i. receiving the compressed image data conveying the compressed versions of the images in the set of images including the reflections of the structured light pattern;
 ii. extracting, from the compressed image data conveying the compressed versions of the images in the set of images, the compressed image data conveying a compressed version of a first image from the camera of the 3D scanner;
 iii. determining a background intensity value for the compressed version of the first image at least in part by processing the compressed image data conveying the compressed version of the first image; and
 iv. controlling an automatic exposure setting of at least a subset of the set of imaging modules of the 3D scanner at least in part by processing the determined background intensity value, the controlling of the automatic exposure setting comprising:
  normalizing the determined background intensity value to compensate for the exposure setting used when the image data conveying the first image was captured by the camera, the normalizing comprising determining the normalized background intensity value for the compressed version of the first image at least in part by processing:
   1) the determined background intensity value; and
   2) a value of the exposure setting used when the image data conveying the first image was captured by the camera; and
  processing the normalized background intensity value.

27. A system according to claim 26, wherein determining the normalized background intensity value for the compressed version of the first image comprises subtracting a correction factor from the determined background intensity value, wherein the correction factor is an increasing function of the value of the exposure setting used when the image data conveying the first image was captured by the camera.

28. A system according to claim 26, wherein the value of the exposure setting used when the image data conveying the first image was captured by the camera is a first value, and wherein controlling the automatic exposure setting of at least the subset of imaging modules of the 3D scanner at least in part by processing the normalized background intensity value comprises determining a second value for the automatic exposure setting for at least the subset of the imaging modules based on the normalized background intensity value.

29. A system according to claim 28, wherein determining the second value for the automatic exposure setting for at least the subset of the imaging modules based on the normalized background intensity value comprises determining the second value using an exponentially decreasing function of the normalized background intensity value.

30. A system according to claim 26, wherein the value of the automatic exposure setting is a function of at least one of shutter timing of the camera, a matching projector timing of the light projector unit and a gain of an imaging sensor of the camera, wherein controlling the automatic exposure setting of at least the subset of imaging modules of the 3D scanner comprises:
  controlling at least one of: the shutter timing of the camera; or the gain of the imaging sensor of the camera; and
  controlling a projection timing of the light projector unit matching the shutter timing of the camera.

31. A scanning system for obtaining three-dimensional (3D) measurements of a surface of an object, the scanning system comprising:
  a. a 3D scanner having
    i. a scanner frame on which is mounted a set of imaging modules including:
      1) a light projector unit comprising a light source and a pattern generator for projecting a structured light pattern onto the surface of the object;
      2) a first camera and a second camera positioned alongside the light projector unit for capturing image data conveying a set of images including reflections of the structured light pattern projected onto the surface of the object; and
      3) one or more processors implementing at least one image data compression module in communication with the first camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
    ii. a communication module in communication with the set of imaging modules, said communication module being configured for transmitting the compressed image data conveying the compressed versions of the images in the set of images to external devices for processing; and
  b. a computing system in communication with said 3D scanner, the computing system including one or more processors programmed for:
    i. receiving the compressed image data conveying the compressed versions of the images in the set of images including the reflections of the structured light pattern;
    ii. extracting, from the compressed image data conveying the compressed versions of the images in the set of images, the compressed image data conveying a compressed version of a first image from the first camera;
    iii. determining a background intensity value for the compressed version of the first image from the first camera at least in part by processing the compressed image data conveying the compressed version of the first image; and
    iv. controlling an automatic exposure setting of the first camera and the second camera at least in part by processing the determined background intensity value that was determined at least in part by processing the compressed image data conveying the compressed version of the first image data captured by the first camera.

32. A scanning system for obtaining three-dimensional (3D) measurements of a surface of an object, the scanning system comprising:
  a. a 3D scanner having
    i. a scanner frame on which is mounted a set of imaging modules including:
      1) a light projector unit comprising a light source and a pattern generator for projecting a structured light pattern onto the surface of the object;
      2) a camera positioned alongside the light projector unit for capturing image data conveying a set of images including reflections of the structured light pattern projected onto the surface of the object;
      3) one or more processors implementing at least one image data compression module in communication with the camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
    ii. a communication module in communication with the set of imaging modules, said communication module being configured for transmitting the compressed image data conveying the compressed versions of the images in the set of images to external devices for processing; and b. a computing system in communication with said 3D scanner, the computing system including one or more processors programmed for:
  i. receiving the compressed image data conveying the compressed versions of the images in the set of images including the reflections of the structured light pattern;
  ii. extracting, from the compressed image data conveying the compressed versions of the images in the set of images, the compressed image data conveying a compressed version of a first image from the camera of the 3D scanner;
  iii. determining a background intensity value for the compressed version of the first image at least in part by processing the compressed image data conveying the compressed version of the first image;
  iv. controlling an automatic exposure setting of at least a subset of the set of imaging modules of the 3D scanner at least in part by processing the determined background intensity value;
  v. relinearizing the compressed image data conveying the compressed versions of the images in the set of images, by at least partially undoing the nonlinearity introduced by the nonlinear conversion used to compress the image data conveying the set of images, to generate relinearized compressed image data conveying relinearized compressed versions of the images in the set of images; and
  vi. determining, at least in part by processing the relinearized compressed image data, a measurement relating to the surface of the object.

33. A system according to claim 32, wherein determining the measurement relating to the surface of the object at least in part by processing the relinearized compressed image data comprises determining the measurement relating to the surface of the object based on relinearized compressed versions of the reflections of the structured light pattern included in the relinearized compressed versions of the images conveyed in the relinearized compressed image data.

34. A system according to claim 32, wherein determining the measurement relating to the surface of the object comprises at least one of:
  determining, at least in part by processing the relinearized compressed image data, a location of maximum intensity of at least one feature of the structured light pattern projected onto the surface of the object; or
  determining, at least in part by processing the relinearized compressed image data, a contour of at least one visual target disposed on the surface of the object.

35. A scanning system for obtaining three-dimensional (3D) measurements of a surface of an object, the scanning system comprising:
a. a 3D scanner having
  i. a scanner frame on which is mounted a set of imaging modules including:
    1) a light projector unit comprising a light source and a pattern generator for projecting a structured light pattern onto the surface of the object;
    2) a camera positioned alongside the light projector unit for capturing image data conveying a set of images including reflections of the structured light pattern projected onto the surface of the object;
  3) one or more processors implementing at least one image data compression module in communication with the camera, the at least one image data compression module being configured for compressing the image data conveying the set of images using a nonlinear conversion to generate compressed image data conveying compressed versions of the images in the set of images, wherein the nonlinear conversion compresses a dynamic range of intensity values in the compressed image data relative to the uncompressed image data such that lower intensity values in the uncompressed image data are amplified and mapped to a larger portion of the compressed dynamic range of the compressed image data while amplification of higher intensity values is limited;
  ii. a communication module in communication with the set of imaging modules, said communication module being configured for transmitting the compressed image data conveying the compressed versions of the images in the set of images to external devices for processing; and
b. a computing system in communication with said 3D scanner, the computing system including one or more processors programmed for:
  i. receiving the compressed image data conveying the compressed versions of the images in the set of images including the reflections of the structured light pattern;
  ii. extracting, from the compressed image data conveying the compressed versions of the images in the set of images, the compressed image data conveying a compressed version of a first image from the camera of the 3D scanner;
  iii. determining a background intensity value for the compressed version of the first image at least in part by processing the compressed image data conveying the compressed version of the first image;
  iv. controlling an automatic exposure setting of at least a subset of the set of imaging modules of the 3D scanner at least in part by processing the determined background intensity value, wherein:
  the image data conveying the images comprises N-bit resolution image data captured by the at least one camera;
  the compressed image data conveying the compressed versions of the images in the set of images comprises M-bit resolution image data; and
  compressing the image data to generate the compressed image data comprises compressing the N-bit resolution image data using a nonlinear N-bit-to-M-bit resolution conversion to generate the M-bit resolution image data, wherein M is less than N.

36. A system according to claim 19, wherein the nonlinear conversion is based on a nonlinear conversion function that amplifies lower intensity values and limits saturation of higher intensity values in the compressed image data.

* * * * *